United States Patent [19]

Miyaoku et al.

[11] Patent Number: 5,828,860
[45] Date of Patent: Oct. 27, 1998

[54] DATA PROCESSING DEVICE EQUIPPED WITH CACHE MEMORY AND A STORAGE UNIT FOR STORING DATA BETWEEN A MAIN STORAGE OR CPU CACHE MEMORY

[75] Inventors: Hitoshi Miyaoku; Atsuhiro Suga; Koichi Sasamori; Kazuhide Yoshino, all of Kawasaki, Japan

[73] Assignee: Fujitsu Limited, Kawasaki, Japan

[21] Appl. No.: 739,062

[22] Filed: Oct. 28, 1996

Related U.S. Application Data

[63] Continuation of Ser. No. 363,547, Dec. 23, 1994, abandoned, which is a continuation of Ser. No. 137,357, Oct. 18, 1993, abandoned.

[30] Foreign Application Priority Data

Oct. 16, 1992 [JP] Japan .................................. 4-278238
Oct. 16, 1993 [JP] Japan .................................. 5-281759

[51] Int. Cl.⁶ ........................................... G06F 12/08
[52] U.S. Cl. ........................... 395/383; 711/122; 711/137
[58] Field of Search ................................. 395/250, 123, 395/137, 138, 381, 383; 711/122, 123, 125, 137, 138, 140

[56] References Cited

U.S. PATENT DOCUMENTS

| | | | |
|---|---|---|---|
| 4,737,908 | 4/1988 | Shinohara et al. | 395/383 |
| 4,774,654 | 9/1988 | Pomerene et al. | 711/122 |
| 4,851,993 | 7/1989 | Chen et al. | 711/138 |
| 5,027,270 | 6/1991 | Riordan et al. | 711/140 |
| 5,113,515 | 5/1992 | Fite et al. | 711/125 |
| 5,146,573 | 9/1992 | Sato et al. | 711/206 |
| 5,170,476 | 12/1992 | Laakso et al. | 711/140 |
| 5,222,223 | 6/1993 | Webb, Jr. et al. | 711/140 |
| 5,265,212 | 11/1993 | Bruce, II | 395/293 |
| 5,317,718 | 5/1994 | Jouppi | 711/137 |
| 5,371,870 | 12/1994 | Goodwin et al. | 395/872 |
| 5,410,653 | 4/1995 | Macon, Jr. et al. | 711/137 |

FOREIGN PATENT DOCUMENTS

| | | |
|---|---|---|
| 0 449 540 A2 | 10/1991 | European Pat. Off. . |
| 4025876 A1 | 2/1991 | Germany . |

OTHER PUBLICATIONS

German Official Action in Application No. P 43 35 444.5–53, mailed Dec. 16, 1997.

*Primary Examiner*—Parshotam S. Lall
*Assistant Examiner*—Viet Vu
*Attorney, Agent, or Firm*—Staas & Halsey

[57] ABSTRACT

A data processing device includes a cache memory, a load buffer primary (LBP) for storing 1-line instruction data including an instruction requested to be transmitted by an instruction processing unit and transmitted from a main storage or a secondary cache memory, and a load buffer secondary (LBS) for storing 1-line instruction data preceded by the above described 1-line data. With this configuration, the device may determine the validity of prefetched data in the LBP using lower order bits of the addresses of the data. If the data are determined to be valid, the data stored in the LBS are stored in the cache memory. A cache storage device, hierarchically provided between a central processing unit a n d a main storage device, includes a cache memory, a storage buffer, a write-in buffer and a cache storage control unit. The cache storage device fast writes storage data into a write-in buffer instead of directly into cache memory. In the case of a miss in an access to a cache tag during the execution of a load command, move-in data are read out from the main storage device or a cache storage device of a different hierarchy, for storage into a write-in buffer. The data stored in the write-in buffer are then written into cache memory when the central processing unit executes another store command.

33 Claims, 75 Drawing Sheets

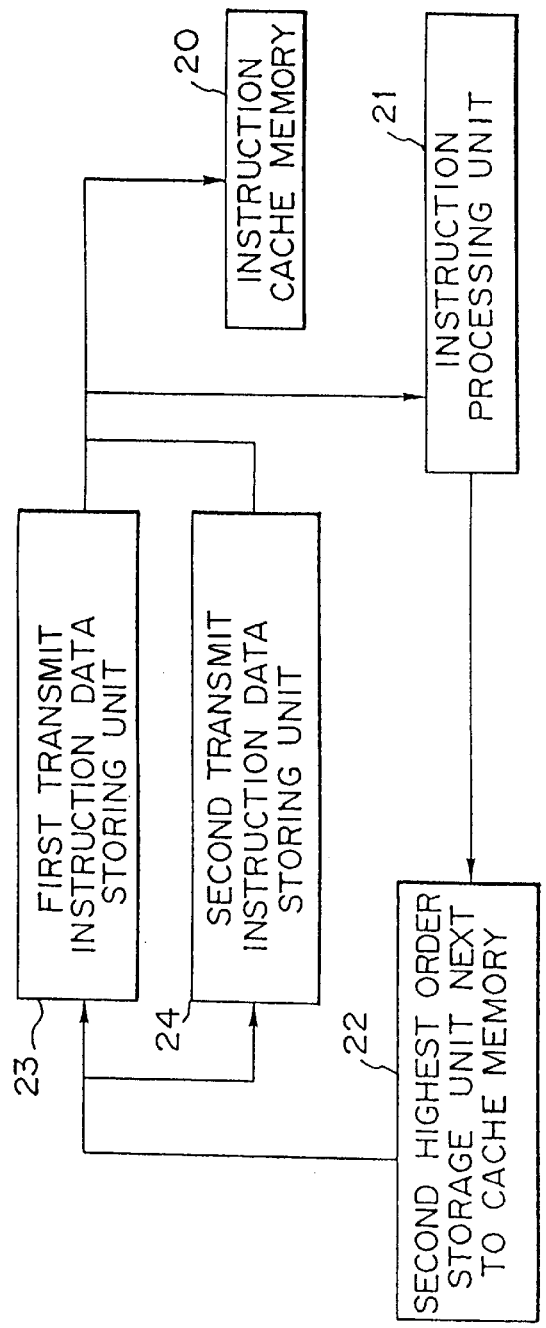
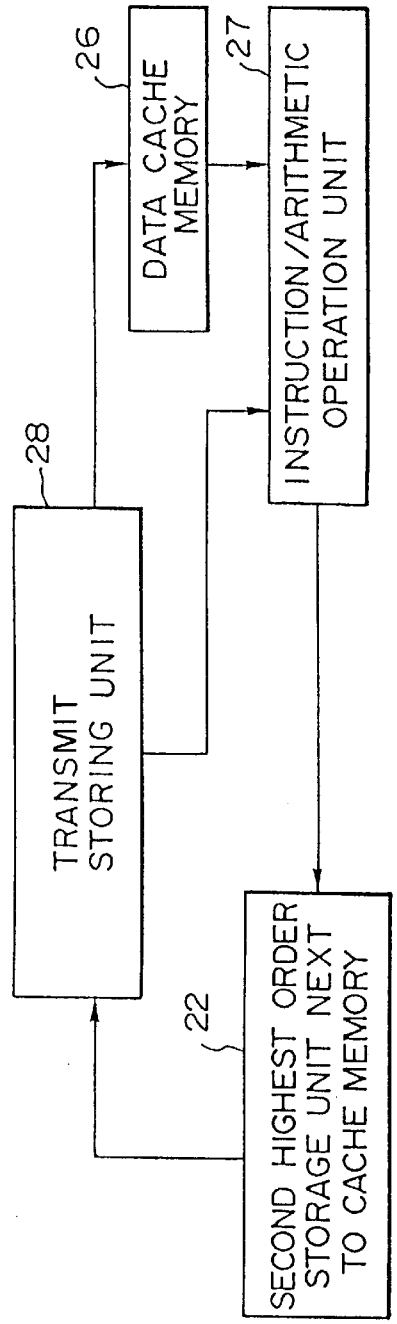
Fig. 4A
Fig. 4B

```
LOAD A1, 0100  ···  READ VALUE (ADDRESS VALUE)
                    0100 TO A1
LOAD D1, A1    ···  READ DATA OF ADDRESS POINTED
  :                 BY A1 TO D1

INC_W A1       ···  INCREMENT VALUE SUCH THAT
                    A1 POINTS NEXT DATA
LOAD D2, A1    ···  READ DATA OF ADDRESS
  :                 POINTED BY A1 TO D2

A1 ····· ADDRESS REGISTER 1
         D1 ····· DATA REGISTER 1
         D2 ····· DATA REGISTER 2
```

Fig. 17

```
S = 0;
FOR(I = 0; <5; I++) {
    S = S + DATA(I);
}
    :
```

Fig. 19

```
① LOAD   A1,0300  ···  READ ADDRESS VALUE 0300 TO A1
② PLOAD  A1       ···  SOFT WARE-PREFETCH DATA AT
                       ADDRESS POINTED BY A1
③ LOAD   D2, 0
④ LOAD   D1, A1   ···  READ TO D1 DATA AT ADDRESS
                       POINTED BY A1
⑤ ADD    D2, D1   ···  ADD UP D1 AND D2, AND STORE
                       SOM AT D2
  LOAD   D1, A1
  ADD    D2, D1

LOAD   D1, A1
  ADD    D2, D1

LOAD   D1, A1
  ADD    D2, D1

LOAD   D1, A1
⑥ ADD    D2, D1
```

Fig. 20

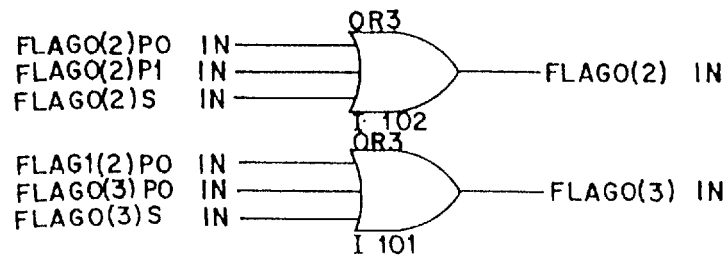
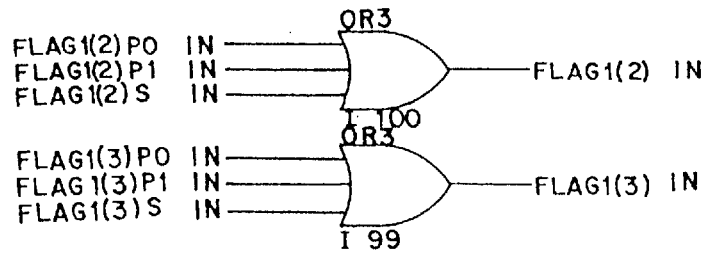
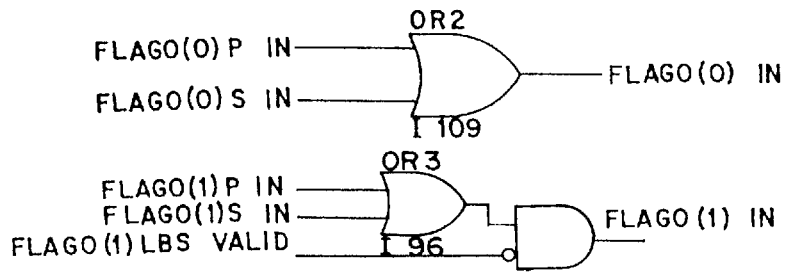
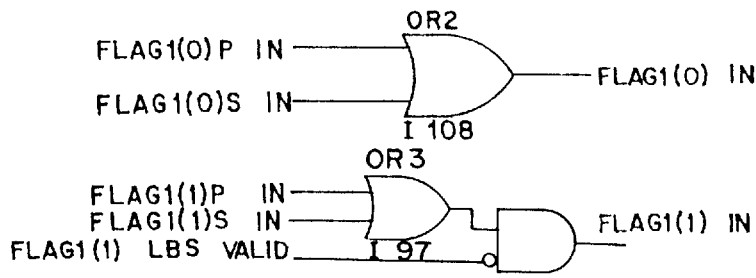
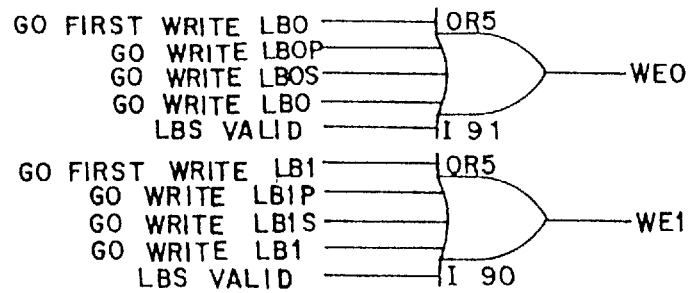
Fig. 27G

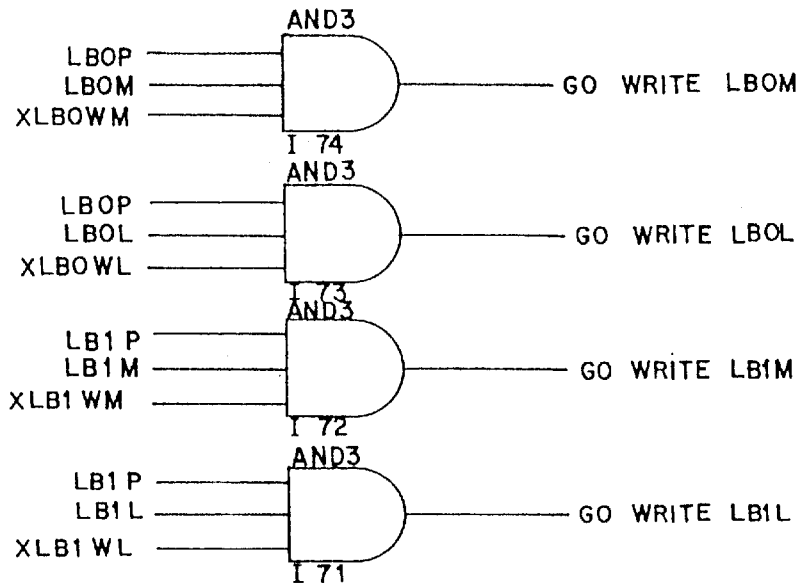
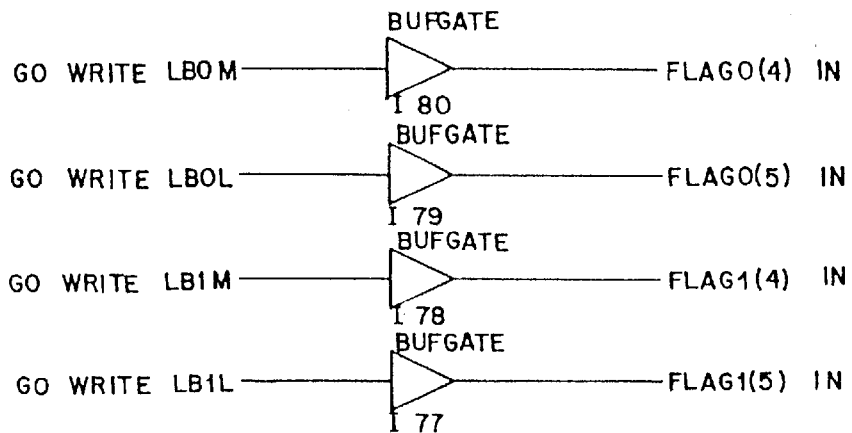
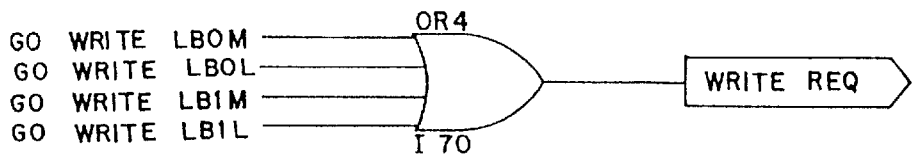
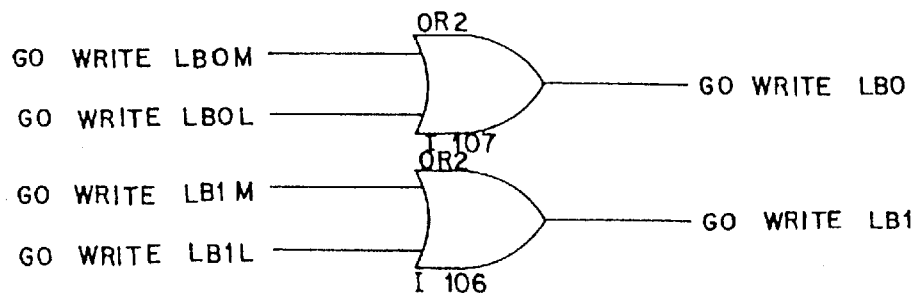
Fig. 27H

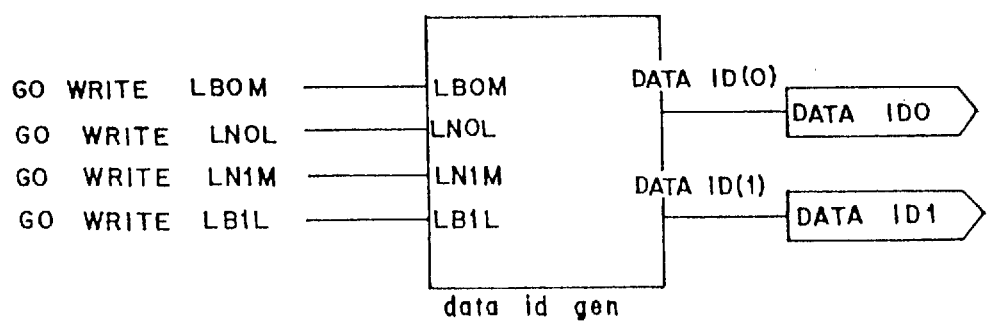
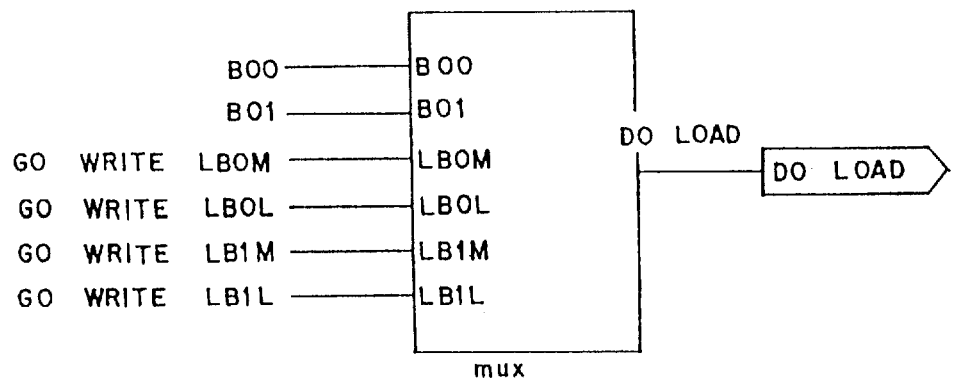
Fig. 27I

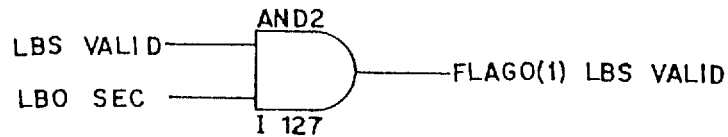
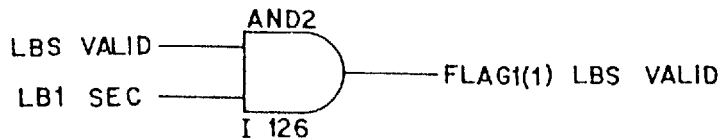
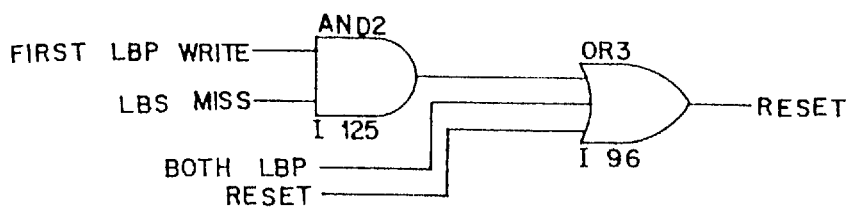
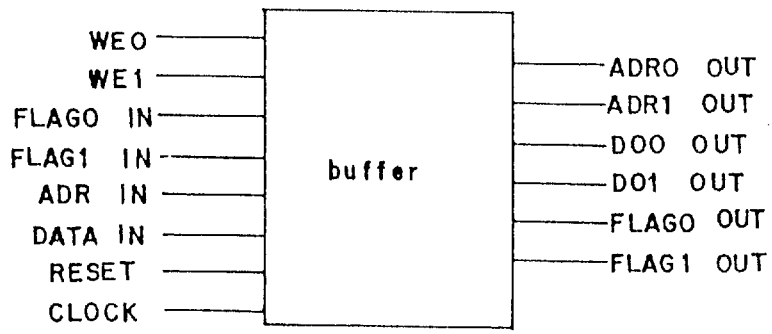
Fig. 27K

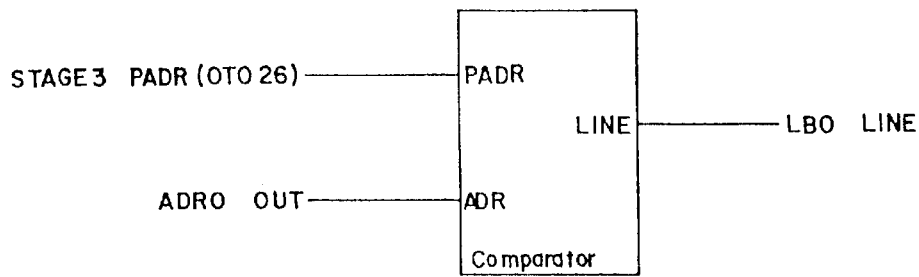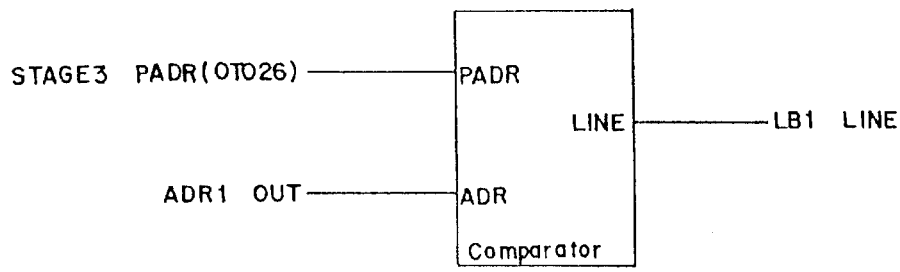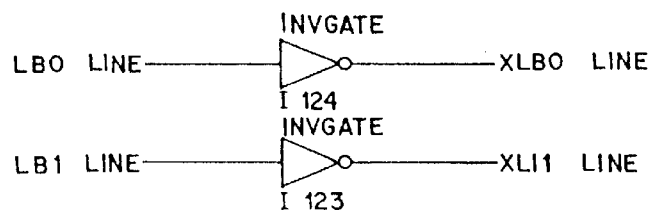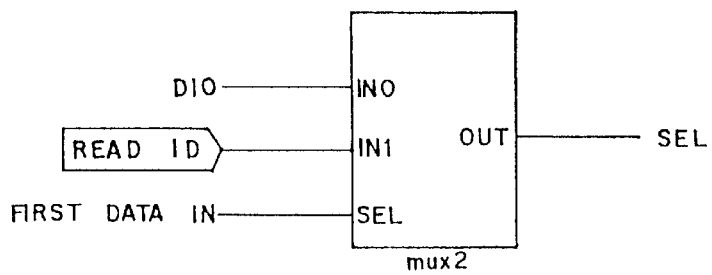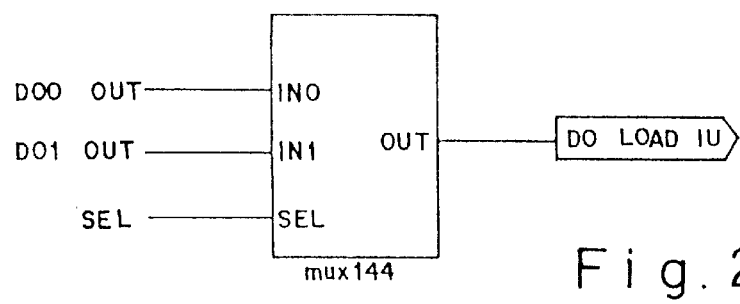
Fig. 27L

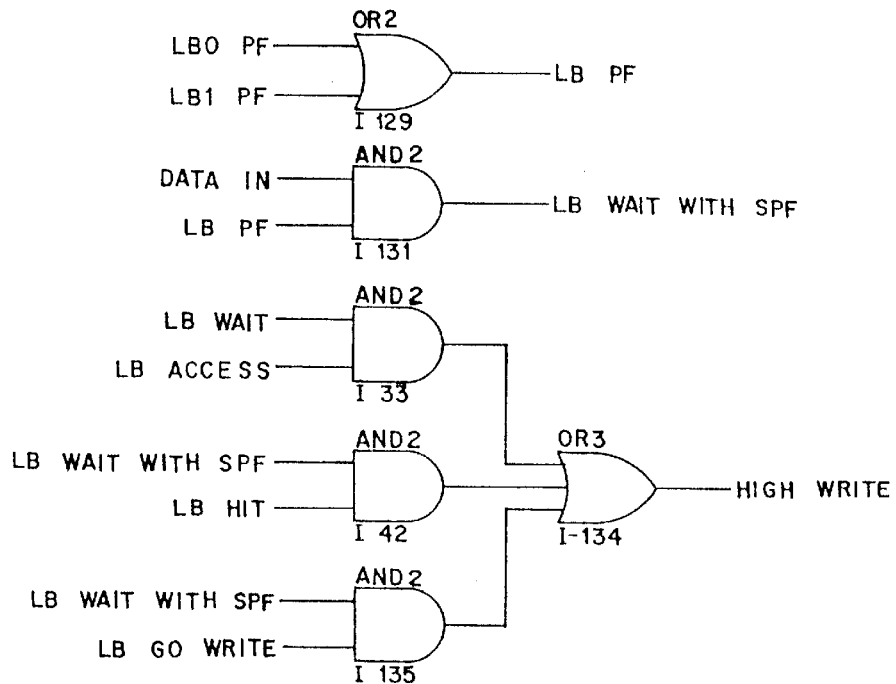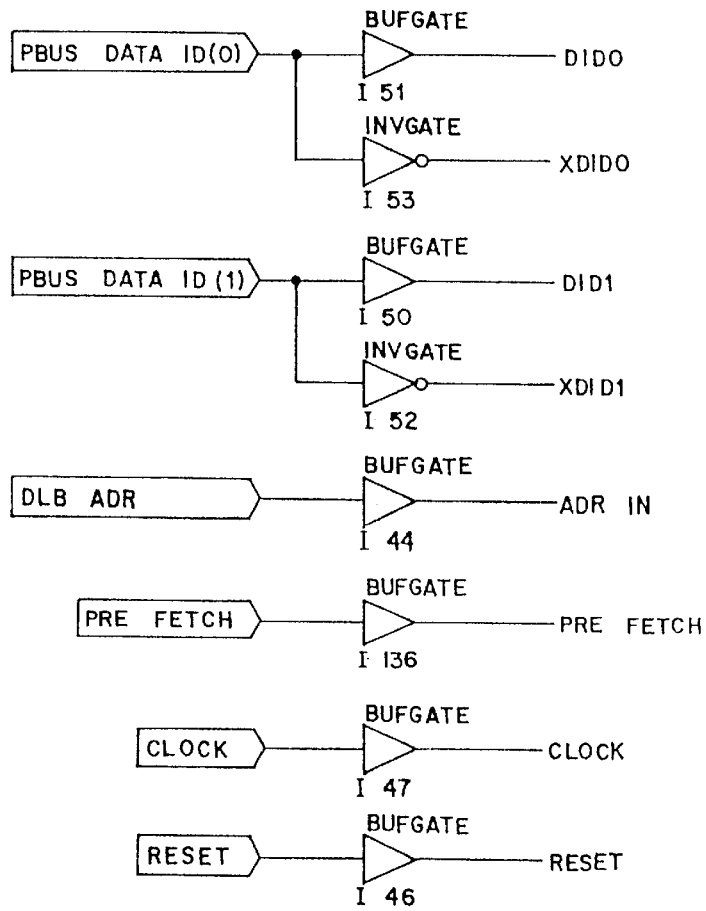
Fig. 28C

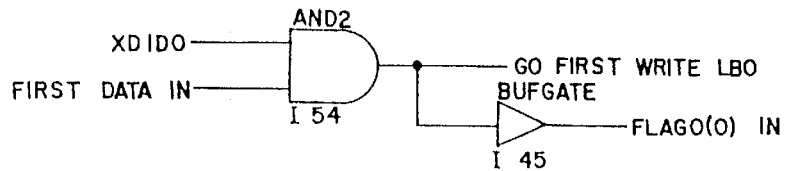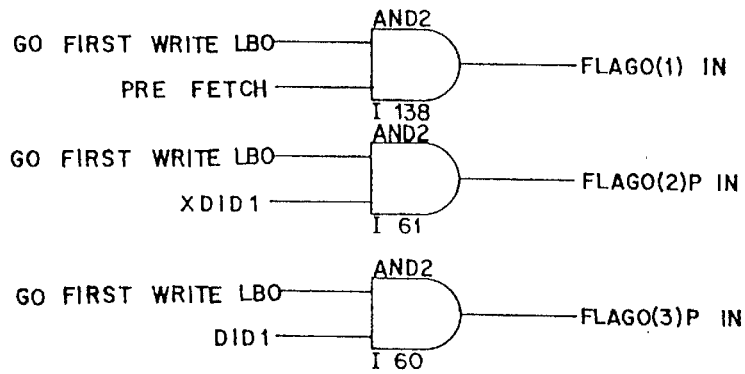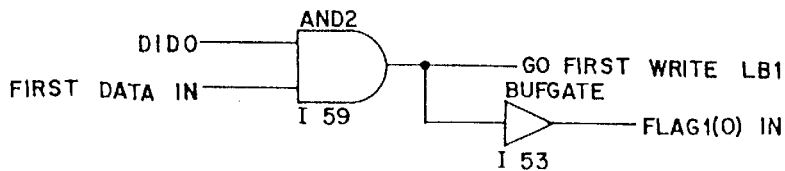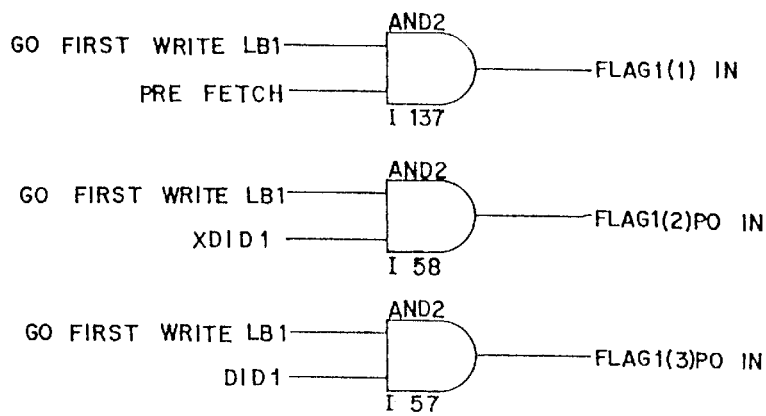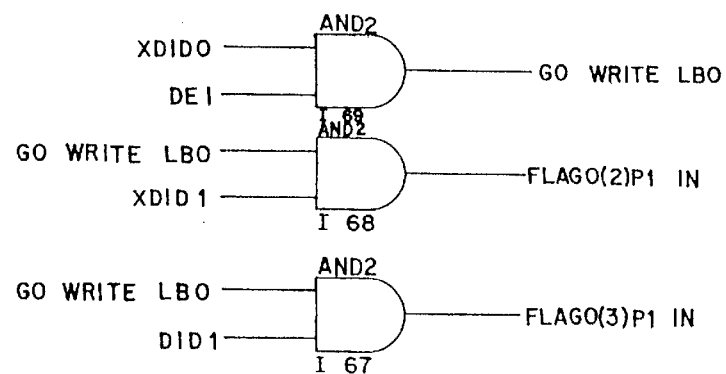
Fig. 28D

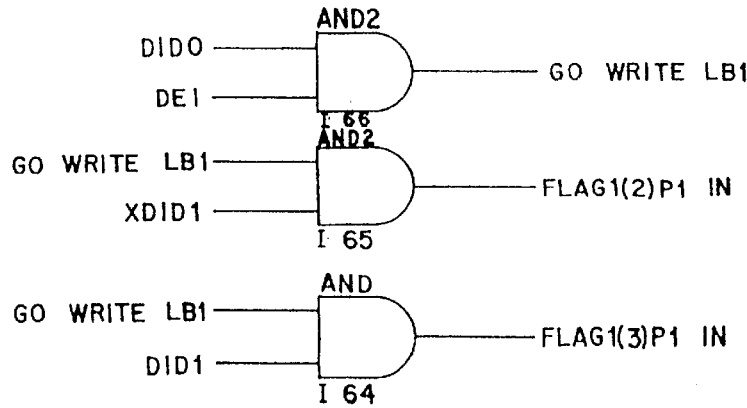
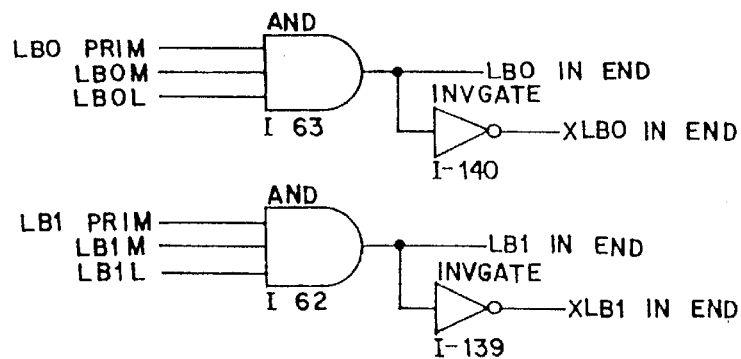
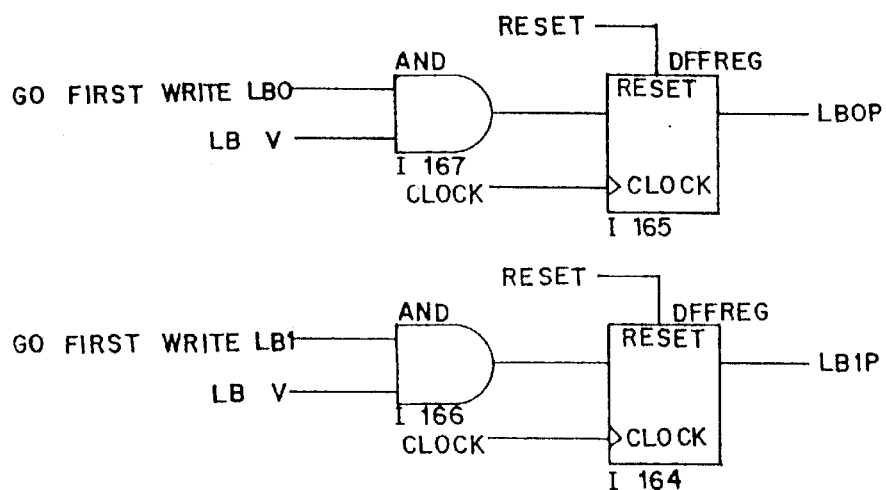
Fig. 28E

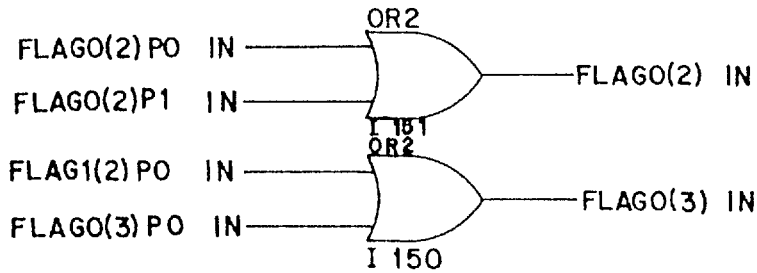
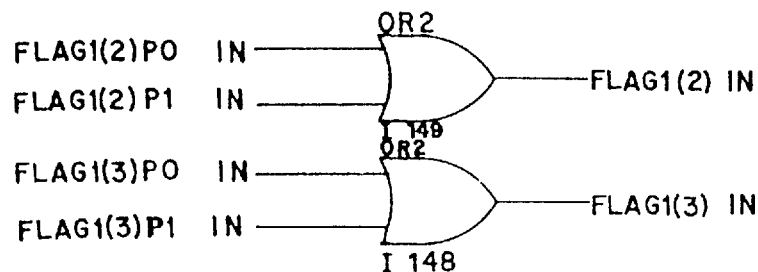
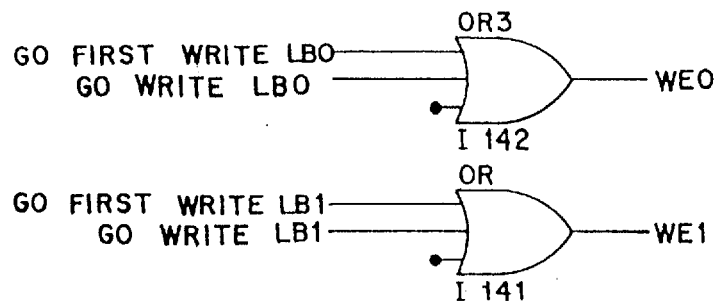
Fig. 28F

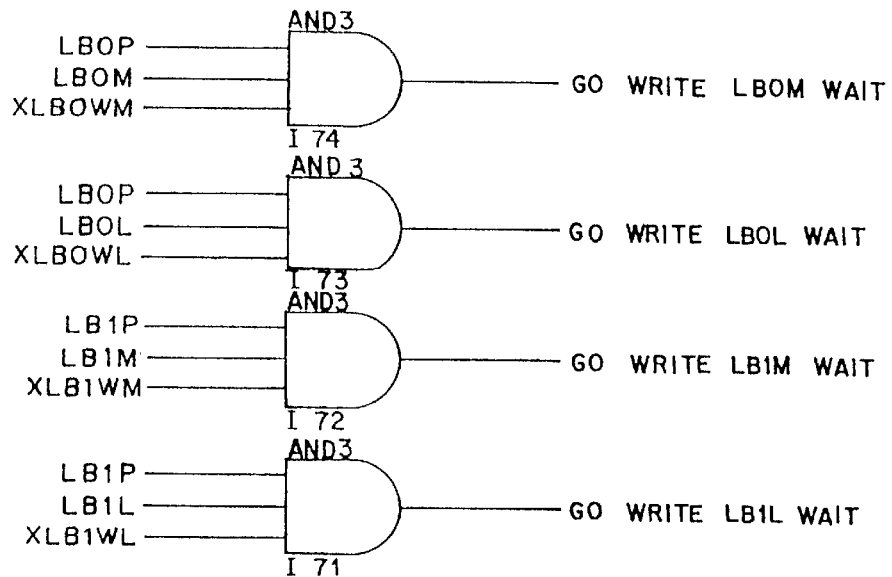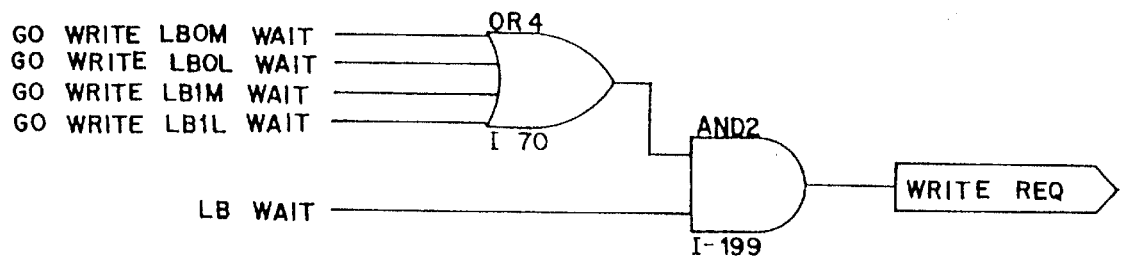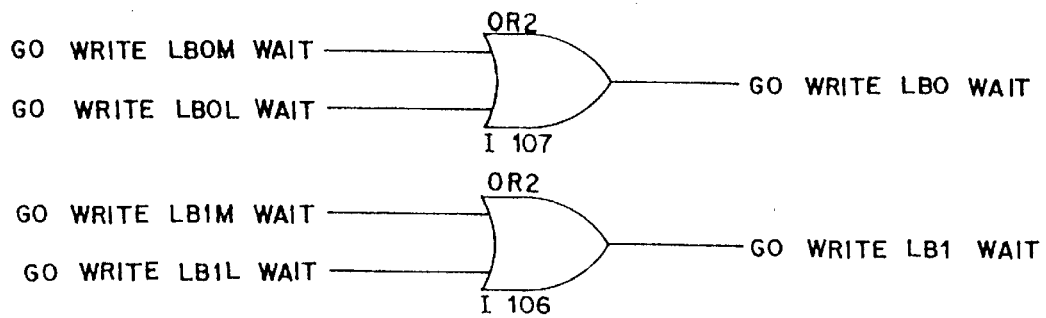
Fig. 28G

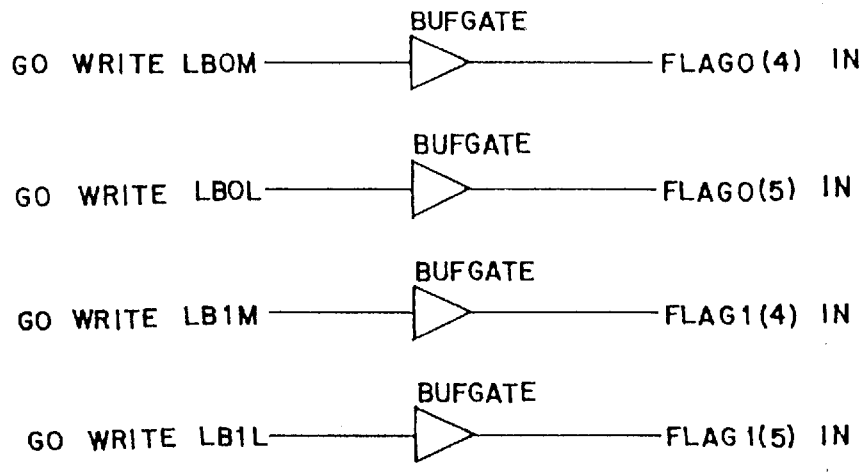
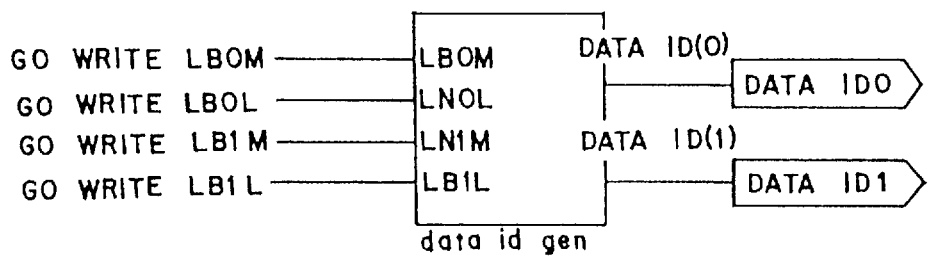
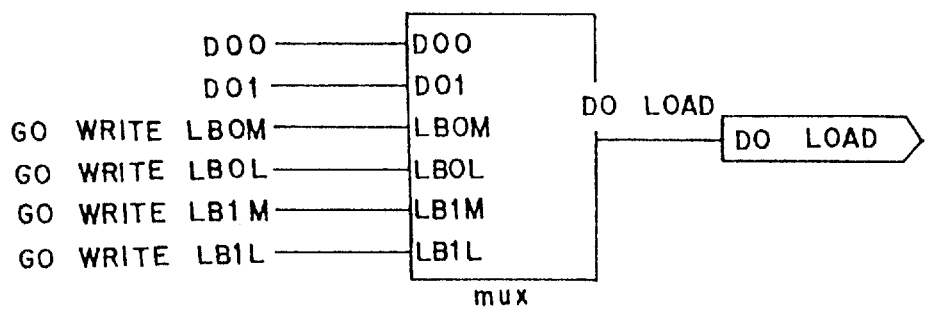
Fig. 28K

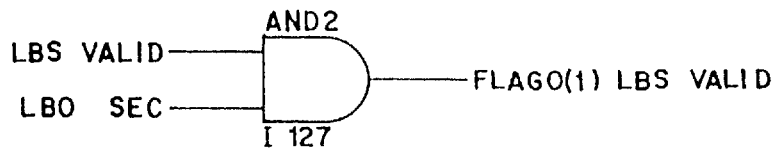
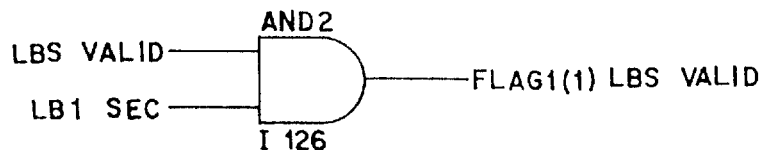
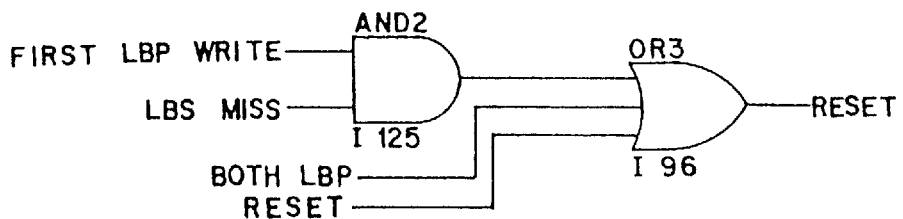
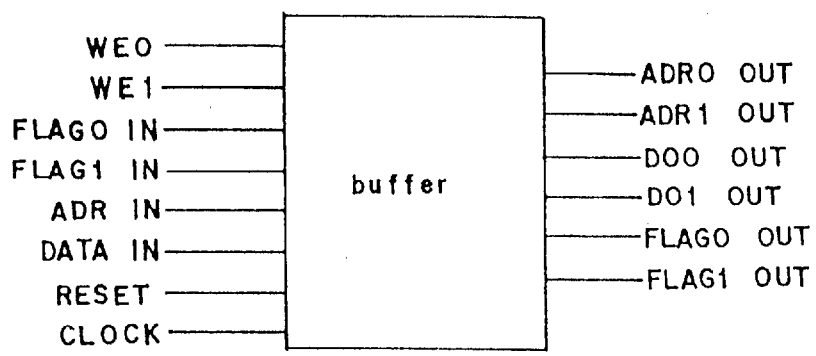
Fig. 28M

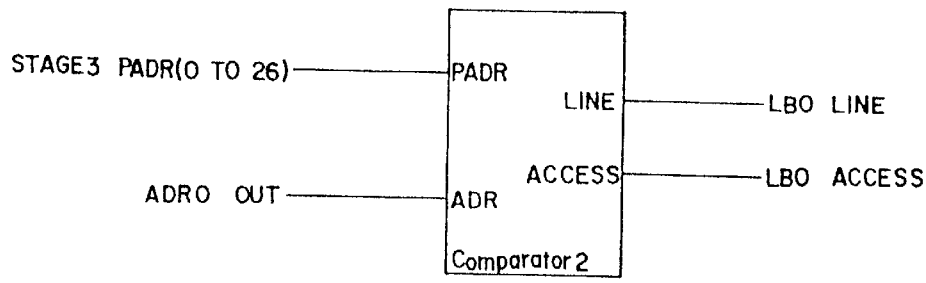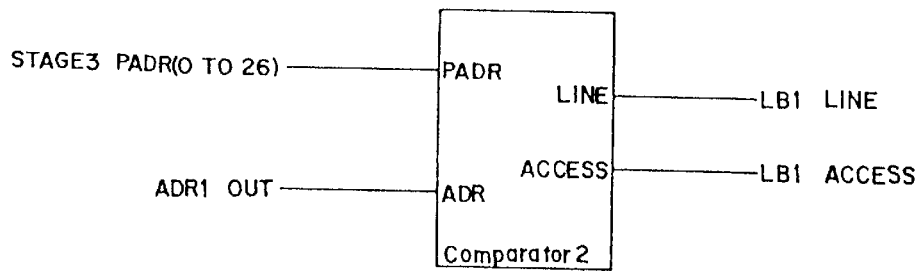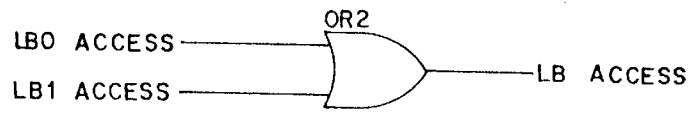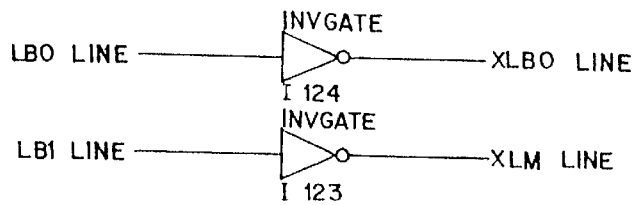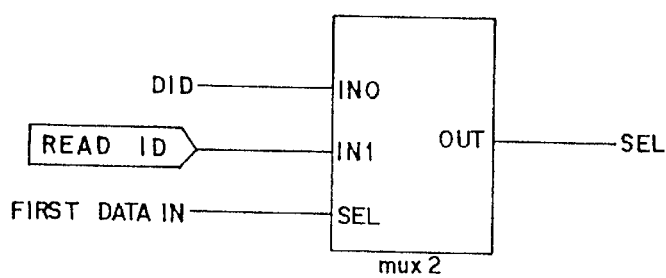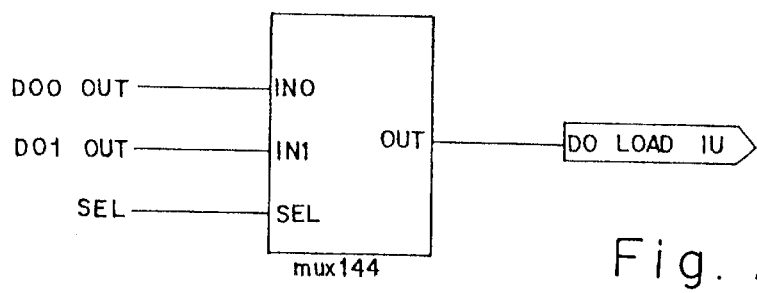
Fig. 28N

DATA PROCESSING DEVICE EQUIPPED WITH CACHE MEMORY AND A STORAGE UNIT FOR STORING DATA BETWEEN A MAIN STORAGE OR CPU CACHE MEMORY

This application is a continuation of application Ser. No. 08/363,547, filed Dec.23, 1994, now abandoned, which is a continuation of application Ser. No. 08/137,357, filed Oct. 18, 1993, now abandoned.

BACKGROUND OF THE INVENTION

1. Field of the Invention

The present invention relates to a data processing device provided with a cache memory, and more specifically to a data processing device for improving the performance of a cache memory by providing a storage unit for storing an instruction or data between a main storage and the cache memory or between the CPU and the cache memory.

2. Description of the Prior Art

Recently, a plurality of arithmetic operation units, a concurrent processing mechanism, etc. are provided to speed up processes performed through a computer system. To efficiently operate these units, it is necessary to incessantly transmit executable instructions and requisite data to a data processing device from a main storage, etc., that is, a second lowest order storage unit next to a cache memory. The lowest order storage unit next to the cache memory is determined from a point view of a central processing unit (CPU), and refers to, for example, a secondary cache memory, a main storage, etc.

A widely used cache memory (buffer storage unit) stores a copy of a part of the contents of a main storage and operates faster than the main storage so as to speed up processes performed through a data processing device.

A main storage device ordinarily uses an SRAM (Static Random Access Memory) of a large capacity.

First, the operation of a cache memory is explained below by referring to the operation of a central processing unit (CPU) of a data processing device. FIG. 1 shows the general configuration of the central processing unit (CPU).

In FIG. 1, a CPU 1 comprises an integer execution unit 2, general purpose registers, etc. 3, a program counter 4, an instruction buffer 5, an instruction decoder 6, and a memory control unit 7. A CPU can be referred to as a microprocessor (MPU) if it is a relatively small size data processing device. The CPU 1 is a central arithmetic operation unit, and has the most important function in a computer.

A main storage 9 stores an instruction to be executed by the CPU 1 and data after it has been encoded. A memory of the main storage 9 is segmented with addresses, and the CPU 1 specifies a memory address in the main storage 9 when reading and writing data. Normally, the main storage 9 is assigned an address sequentially from the head in byte units (in 8-bit units). For example, if a 32-bit architecture is used, an address can be specified with a multiple of 32. Therefore, byte positions of 0 through 429496729 ($=2^{32}$) are provided.

When the computer starts its operation, an instruction stored in the main storage 9 from the address specified by the program counter (PC) 4 is read to the instruction buffer 5. The process is an "instruction fetch". The instruction buffer 5 can store a plurality of instructions. The instruction decoder reads an encoded instruction from the instruction buffer 5 and decodes it. The decoded instruction is directed to the integer execution unit 2, or one of the various registers 3 or control units. The specified arithmetic operation unit or control unit executes the instruction. Normally, a process of fetching an instruction is abbreviated to "F", a process of decoding an instruction to"D", a process of executing an instruction to "E", and a process of writing the execution result to "W". Thus, a pipeline control in the order F-D-E-W is performed. The number of pipelines and the number of instructions to be simultaneously executed depends on each architecture.

The CPU 1 can issue a request to read or write an instruction or data to the main storage 9 (memory) or to a lower order storage unit either by fetching an instruction or according to the designation of an instruction (load/store). An instruction fetch is necessarily executed when the CPU 1 is operated. The address of a fetched instruction is normally an address specified by the program counter 4 as described above. However, if an instruction is issued to change the flow of a process (a branch or jump instruction, etc.), then the address of a fetched instruction is calculated by a target adder, etc.

If a request is issued according to an instruction (that is, a load/store instruction), data used in executing an operation specified by the instruction are read (loaded), or an operation result executed by the instruction are written (stored). A request for access to data is issued in an instruction decoding step or an executing step. For example, the address of a request for a read is calculated by the integer execution unit 2.

A cache memory stores a copy of the contents of the main storage, operates at a speed higher than the main storage, and replaces the contents dynamically.

A cache memory forms a layer or a memory as shown in FIG. 2.

A cache memory can comprise a plurality of cache memory layers to improve the performance of the cache memory.

A cache memory normally comprises two parts, that is, cache tag (i.e. cache directory) and a cache random access memory (RAM). The cache RAM is divided into a number of lines of equal size. The cache tag is normally an association memory comprising an address tag and a control bit.

An address tag stores the address of a line currently in a cache memory. A control bit is used to control a cache memory. Therefore, the cache memory contains a set of address and data, each set having a line address of a main storage and a copy of the contents of the main storage corresponding to the address.

A cache tag performs the retrieval of a tag and data concurrently or sequentially. In a sequential process, specified data are read from the cache RAM after successfully retrieving a corresponding tag. On the other hand, in a concurrent process, data associated with an address tag can be simultaneously retrieved. However, the determination as to whether or not the data of a requested line exists in the cache cannot be obtained until the end of a cache cycle.

FIG. 3A is the block diagram of the configuration of a general cache memory. A conventional data processing apparatus comprises an address register ADR_REG, data registers DR1 and DR2, a cache memory 2, a cache tag 1, a comparator COMP and a selector SEL. The address register ADR_REG has a tag field, an index field and a field for other address data which is not used to access cache memory. The conventional cache storage device is of a four-way construction, enabling a selective readout by the match of a tag address among four [4] simultaneous data access. The address of data requested in a cache memory comprises 3 portions, that is, an offset, an index, and a tag. Since an offset is an address bit used to specify the position in a line in a cache memory, it is not used to access the cache memory. An index refers to an address used to retrieve the cache tag 1 and the cache RAM 2. A line of the tag or the RAM can be specified with the index. A tag occupies the same number of bits as a line address in the tag 1, and can be used to determine whether or not a line is necessary by comparing the tag to the address using the comparator 3.

If the determination indicates a cache miss, data are read or written from or to the main storage 9 or a lower order cache memory.

If a cache miss is detected in reading data, the cache memory issues a request to read data to the main storage or a lower order cache memory. A reading of data from the main storage to the cache memory is referred to as a "move-in". As described above, the move-in is dynamically performed normally by hardware when a cache miss has been detected. Generally, the cache miss and the move-in greatly affect the performance of the CPU. Therefore, a cache memory must be designed such that a cache miss and the number of cycles required for the move-in should be reduced to the smallest possible extent. A rate of cash miss can be reduced if the capacity and the number of ways is increased. However, in this method, the size of an area required on a chip is enlarged. If a cache memory is built in a CPU as a single chip, the cache memory normally occupies an area larger than other hardware resources. Accordingly, the cache memory should be designed to occupy the smallest possible area while maintaining high performance.

The reduction of the number of cache miss can be realized by, for example, storing in a cache memory a line to probably be used later after being fetched separately from a line of request to read data to a cache memory. This is referred to as a "prefetch". Prefetched data are stored in place of a line currently existing in a cache memory. If prefetched data stored in a cache memory are not used, the number of cache miss increases. Therefore, the data to be stored in a cache memory should be limited to the smallest possible amount when a prefetch process is performed.

A prefetch process is automatically performed by hardware at a request to fetch an instruction issued by an instruction processing unit in a CPU. On the other hand, a request to prefetch arithmetic operation data (operand) can also be specified in a program. Since the prefetch process is designated by software, it is referred to as a software prefetch. The contents of register number 0 in a general-purpose register in a CPU is normally fixed to zero. Therefore, prefetched data are stored in a cache memory by setting address 0 as the destination of the prefetched data, but the prefetched data are not actually stored in a register, and a software prefetch used in specifying a prefetch of data to probably be used later can be realized.

FIGS. 3B and 3C are flowcharts respectively illustrating operations for executing a load command and a store command pursuant to a prior art.

FIG. 3B shows the flow of operations when a conventional cache storage device executes a load command upon a hit.

An address selection stage (step S1) is for the issuance of a load command and for an address selection. A cache tag and cache memory access stage (step S2) is for a data readout through an access to a cache memory 2 and a cache tag 1. Finally, a hit check stage (step S3) is for a hit check of the read-out data. Thus, these steps consummate operations for executing a load command upon a hit.

FIG. 3C shows the flow of operations when a conventional cache storage device executes a store command upon a hit.

An address selection stage (step S11) is for the issuance of a store command and for an address selection. A cache tag access stage (step S12) is for an access to the cache tag 1 only. A hit check stage (step S13) is for a hit check of the read-out data. Lastly, a data write-in stage (step S14) is for a data write-in to the cache memory 2.

That is, while a conventional data processing apparatus executes a load command by causing an access to both the cache memory 2 and the cache tag 1 in a single stage, it executes a store command by causing a data readout from the cache tag 1 and a data write-in to the cache 2 in separate stages. Because of the differences in the number of stages of operations for executing a load command and a store command, it cannot execute a store command and a successive load command due to an interference in accesses to a cache memory.

FIG. 3D is a timing chart illustrating the timings of operations when a cache storage device executes a store command and a successive load command pursuant to a prior art.

A T0 cycle is for the issuance of a store command, a T1 cycle is for an access to the cache tag 1, a T2 cycle is for a hit check, and a T3 cycle is for a data-write-in to the cache memory 2.

Additionally, the T1 cycle is for the issuance of a load command, the T2 cycle is for an access to the cache tag 1 and the cache memory 2, and the T3 cycle is for a hit check and the output of data BB.

However, when an attempt is made to issue a load command in the next T2 cycle, the T3 cycle has an interference between a data write-in to the cache memory 2 by the preceding issuance of a store command and a readout from the cache memory 2 by the succeeding issuance of a load command. Accordingly, the cache storage device cannot execute a load command in the T2 cycle but must do so in the next T3 cycle.

The number of cycles during which the preceding issuance of a store command causes a delay in executing the succeeding issuance of a load command does not have to be one [1] as in this example.

With a conventional data processing device, instructions or data transmitted by the second lower order storage unit, for example, a secondary cache memory or a main storage, are all stored in a cache memory. Therefore, if prefetched data stored in a cache memory are not used as described above, the number of cache miss undesirably increases. Normally, a prefetch process can be realized by moving in a plurality of lines when a cache miss has been detected. However, if an instruction accompanying a necessary instruction moved in when an instruction is fetched is a branch instruction, then prefetched instruction data become unnecessary. Thus, the conventional method has the problem that a cache memory may undesirably store unnecessary instruction and data.

When data are prefetched according to the above described software prefetch instruction in a conventional method, a software prefetch instruction is not executed as being distinguished from another instruction, for example, a load instruction. That is, in executing instructions, data transmitted from a main storage are immediately stored in a data cache memory. Normally, when data are prefetched according to a software prefetch instruction, they are prefetched before the data are actually used in an arithmetic operation. Therefore, the software prefetch instruction attains its purpose of supplying data smoothly. However, the execution of the instruction interferes with the execution of another instruction, for example, a load instruction to immediately load necessary data for an arithmetic operation, etc. In this case, a pipeline in a data cache memory falls into disorder, thereby deteriorating the entire performance of a data processing device.

When a software prefetch instruction is issued, it is executed before it actually processes data, thus discarding data in a cache memory by the amount of the prefetched data. Additionally, this results in the problem that data likely to be hit before data which is processed by the software prefetch instruction are practically stored in, for example, a register for an arithmetic operation, are deleted from the cache memory.

Furthermore, a cache storage device of a conventional data processing apparatus has a problem in that it cannot execute a store command and a successive load command due to the difference in the numbers of stages for executing a load command and a store command. That is, there is a problem that a delay in executing a successive load command caused by an interference in accesses to a cache memory greatly affects the performance of a cache storage device and a data processing apparatus loaded therewith.

In addition, upon executing a load command and a successive store command, a miss in an access to the cache tag 1 by a preceding load command causes necessary data to be read from a main storage device or a cache storage device of a different hierarchy for a move-in to the cache memory 2. Because the cache memory 2 inhibits another access during the write-in of the readout data into the cache memory 2, a succeeding store command cannot be executed.

This presents a problem that a miss in the access to the cache tag 1 by a preceding load command causes a delay in executing a succeeding store command, thereby causing an interlock.

SUMMARY OF THE INVENTION

The present invention aims at raising a rate of hit of a cache memory and improving the entire performance of a data processing device by storing probably significant data in an instruction cache memory for storing instructions and a data cache memory for storing data.

This invention further aims at providing a high performance cache storage apparatus by solving the interference in accesses to a cache memory by executions of a load command and a successive store command.

A first feature of the present invention resides in a data processing device having an instruction cache memory for storing an instruction and an instruction processing unit for instructing a lower order storage unit than the instruction cache memory to transmit a necessary instruction to the instruction cache memory when the necessary instruction is not stored in the instruction cache memory, the data processing device comprising first transmit instruction data storage means for storing 1-line instruction data containing an instruction required by the instruction processing unit in the data processing device and transmitted from the second highest order storage unit next to the instruction cache memory and second transmit instruction data storage means formed of one or more stages for storing one or more lines or prefetched instruction data transmitted after said 1-line instruction data, wherein prefetched instructions are executed at a higher speed.

The second feature of the present invention resides in a data processing device having a data cache memory for storing data and an instruction/arithmetic operation unit for instructing a lower order storage unit than the data cache memory to transmit necessary data to the data cache memory when the necessary instruction is not stored in said data cache memory, said data processing device comprising transmission data storing means, comprising plural stages of buffers, for storing 1-line data, containing data required by the instruction/arithmetic operation unit in the data processing device and transmitted from the second highest order storage unit next to the data cache memory, and one or more lines of prefetched data preceded by the 1-line data, wherein data are supplied at a higher speed.

The third feature of the present invention resides in a data processing device having an instruction cache memory for storing an instruction and an instruction processing unit for instructing a lower order storage unit than said instruction cache memory to transmit a necessary instruction to the instruction cache memory when the necessary instruction is not stored in the instruction cache memory, said data processing device comprising first transmit instruction data storage means for storing 1-line instruction data containing an instruction required by the instruction processing unit in the data processing device and transmitted from the lower order storage unit than said instruction cache memory and second transmit instruction data storage means formed of one or more stages for storing one or more lines of prefetched instruction data transmitted after said 1-line instruction data, wherein during a period from the moment the necessary instruction is requested to be transmitted to the lower storage unit than the instruction cache memory to the moment the necessary instruction has been stored by the first transmit instruction data storage means in the in instruction cache memory, said instruction cache memory can be accessed by processes not associated with the transmission of said necessary instruction.

The fourth feature of the invention resides in a data processing device having a data cache memory for storing data and an instruction/arithmetic operation unit for instructing a lower order storage unit than the data cache memory to transmit necessary data to the data cache memory when the necessary data are not stored in the data cache memory the data processing device comprising transmission data storing means comprising plural stages of buffers for storing 1-line data containing data required by said instruction/ arithmetic operation unit in the data processing device and transmitted from the lower order storage unit than the data cache memory, and one or more lines of prefetched data preceded by said 1-line data, wherein during a period from the moment the necessary data are requested to be transmitted to the lower order storage unit than the data cache memory to the moment said necessary data have been stored by said transmit data storage means in the data cache memory, the data cache memory can be accessed by processes not associated with the transmission of the necessary data.

The fifth feature of the present invention resides in a cache storage device provided between a central processing unit and a cache storage device of a different hierarchy comprising a cache memory for storing data, a cache write buffer, provided between the central processing unit and the cache memory, for storing a cache write address and a cache write data and a cache storage control means for controlling operations of said cache storage device by having write-in data written first into the write-in buffer instead of directly into the cache memory when the central processing unit executes a store command and having the write-in data written into the cache memory at any time allowed by the cache storage device.

The sixth feature of the present invention resides in a cache storage device provided between a main storage device and a cache storage device of a different hierarchy comprising a cache memory for storing data and a write-in buffer, provided between the central processing unit and the cache memory for storing a write-in address and write-in data and a cache storage control means for controlling operations of the cache storage device by having write-in data written first into the write-in buffer instead of directly into the cache memory when the central processing unit executes a store command and having the write-in data written into the cache memory at any time allowed by the cache storage device.

The seventh feature of the present invention resides in a cache memory device provided between a central processing unit and a storage device in a lower order layer comprising a cache memory for storing a copy of a part of contents of the storage device in a lower order layer and store data storage means provided between the central processing unit and the cache memory, for storing store data of a store instruction when the cache memory is successfully accessed by the central processing unit during the execution of the store instruction and merging means for reading line data accessed according to a load instruction from the cache memory when the central processing unit executes a load instruction to load store data stored in the store data storage means, merging the line data with the store data stored in the store data storage means to generate new line data by replacing a corresponding portion in the line data with the store data and outputting the new line data to the central processing unit.

The eighth feature of the present invention resides in a cache memory device provided between a central processing unit and a storage device in a lower order layer comprising a cache memory for storing a copy of a part of contents of the storage device in a lower order layer and store data storage means, provided between the central processing unit and the cache memory for storing store data of a store instruction when said cache memory is successfully accessed by the central processing unit during the execution of the store instruction and merging means for reading line data accessed according to a load instruction from the cache memory when the central processing unit executes a load instruction to load store data stored in the store data storage means, merging the line data with the store data stored in the store data storage means to generate new line data by replacing a corresponding portion in the line data with the store data, and outputting the new line data to the central processing unit and move-in data storage means, provided between the storage device in the lower order layer and the cache memory, for storing move-in data transmitted from the storage device in said lower order layer when the central processing unit has failed in accessing the cache memory during the execution of a load instruction and data write means for storing the move-in data in the cache memory after the merging means has accessed the cache memory to perform the merging process when the move-in data have been transmitted to and stored in the move-in data storage means during the merging process performed by the merging means.

The ninth feature of the present invention resides in a cache memory device provided between a central processing unit and a storage device in a lower order layer comprising a cache memory for storing a copy of a part of contents of the storage device in a lower order layer and store data storage means, provided between the central processing unit and the cache memory, for storing store data of a store instruction when the cache memory is successfully accessed by the central processing unit during the execution of the store instruction and move-in data storage means, provided between the storage device in the lower order layer and the cache memory, for storing move-in data transmitted from the storage device in the lower order layer when the central processing unit has failed in accessing the cache memory during the execution of a load instruction and merging means for merging the store data with said move-in data at the position of the move-in data when the line data, to which the store data stored in the store data storage means are written, have been transmitted as move-in data to the move-in data storage means, and for writing said line data obtained by said merging process at a corresponding position in said cache memory.

BRIEF EXPLANATION OF THE DRAWINGS

One skilled in the art can easily understand additional features and objects of this invention from the description of the preferred embodiments and some of the attached drawings. In the drawings:

FIGS. 4A and 4B are the block diagrams showing the principle of the first and second embodiments of the present invention;

FIG. 17 shows an example of a program in which data are effectively prefetched according to the second embodiment;

FIG. 19 shows an example of a program in which a software prefetch instruction works effectively (in a high-level language);

FIG. 20 shows an example of a program in which a software prefetch instruction works effectively (in an assembly language);

FIG. 27G shows an example (7) of a control circuit of an instruction load buffer;

FIG. 27H shows an example (8) of a control circuit of an instruction load buffer;

FIG. 27I shows an example (9) of a control circuit of an instruction load buffer;

FIG. 27K shows an example (11) of a control circuit of an instruction load buffer;

FIG. 27L shows an example (12) of a control circuit of an instruction load buffer;

FIG. 28C shows an example (3) of a control circuit of a data load buffer;

FIG. 28D shows an example (4) of a control circuit of a data load buffer;

FIG. 28E shows an example (5) of a control circuit of a data load buffer;

FIG. 28E shows an example (5) of a control circuit of a data load buffer;

FIG. 28F shows an example (6) of a control circuit of a data load buffer;

FIG. 28G shows an example (7) of a control circuit of a data load buffer;

FIG. 28K shows an example (11) of a control circuit of a data load buffer;

FIG. 28M shows an example (13) of a control circuit of a data load buffer;

FIG. 28N shows an example (14) of a control circuit of a data load buffer;

DESCRIPTION OF THE PREFERRED EMBODIMENTS

Figure 1:
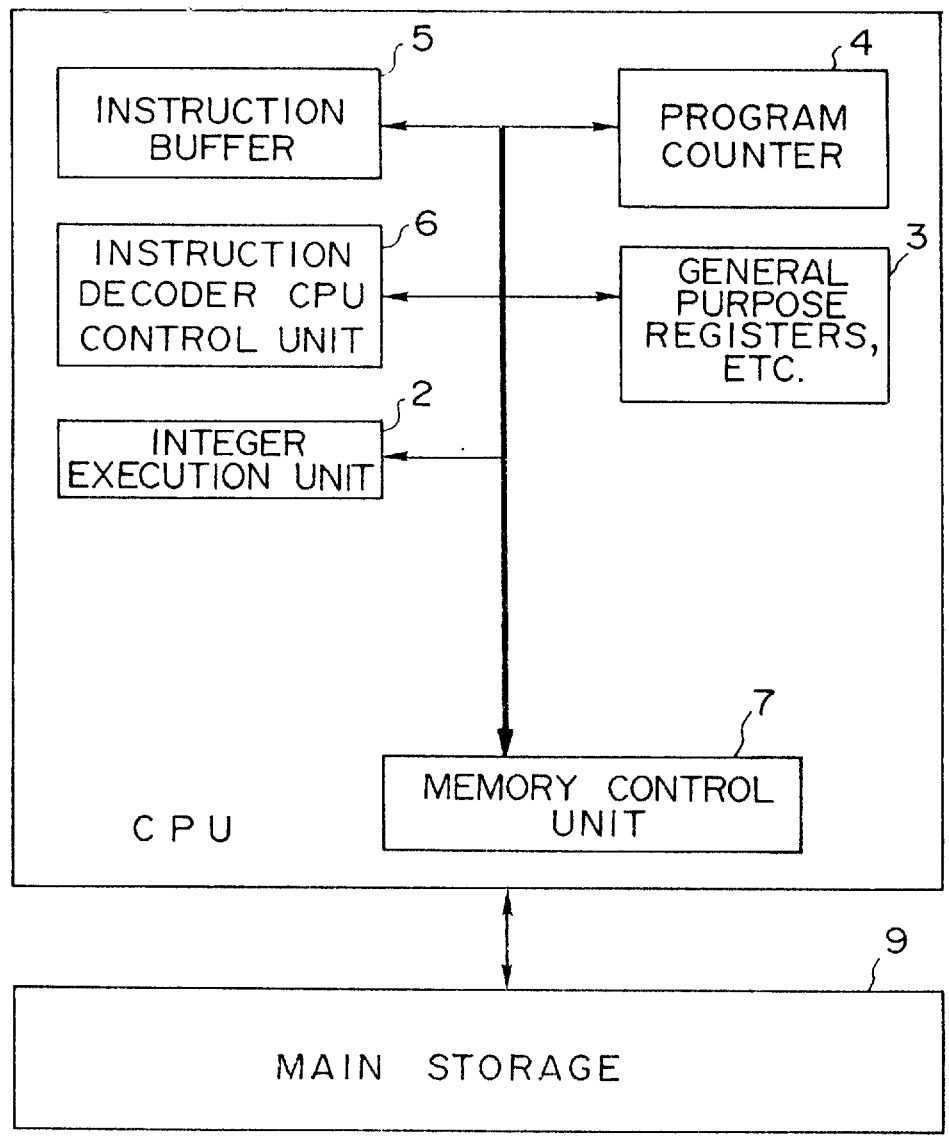
FIG. 1 is the block diagram showing the outline of the configuration of the central processing unit (CPU)
Figure 2:
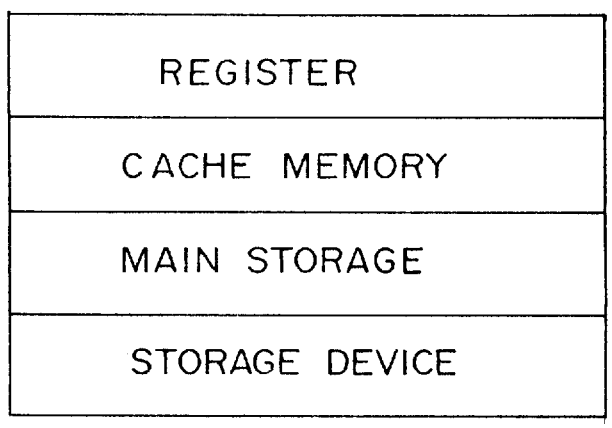
FIG. 2 shows the hierarchical structure of the storage unit.

FIGS. 4A and 4B are the block diagrams showing the principle of the first and the second embodiments of the present invention. FIG. 4A is the block diagram showing the principle of the first embodiment in a data processing device comprising an instruction cache memory 20 for storing an instruction and an instruction processing unit 21 for issuing a request to transmit a necessary instruction when the necessary instruction is not stored in the instruction cache memory.

In the block diagram showing the principle of the first embodiment shown in FIG. 4A, a first transmit instruction data storing unit 23 is, for example, a load buffer primary (LBP) for temporarily storing 1-line instruction data which are transmitted by a second highest order storage unit 22, for example a main storage, next to the instruction cache memory 20 containing an instruction to be transmitted at the request of the instruction processing unit 21. A second transmit instruction data storing unit 24 is, for example, a load buffer secondary (LBS) and comprises one or more load buffers for prefetching and temporarily storing one or more lines of instruction data following 1-line data containing an instruction which the instruction processing unit 21 requested to transmit.

FIG. 4B is the block diagram showing the principle of the second embodiment. Instruction data are prefetched in the first embodiment whereas, in the second embodiment, data following moved-in data are prefetched when a load/store instruction and the above described software prefetch instruction are executed.

FIG. 4B shows a data processing device comprising a data cache memory 26 for storing data and an instruction/arithmetic operation unit 27 for issuing a request to transmit necessary data to the second highest order storage unit 22 next to the highest order cache memory when the necessary data are not stored in the data cache memory 26. A transmit data storing unit 28 prefetches and stores, together with 1-line data containing the data requested by the instruction/arithmetic operation unit 27, one or more lines of data following the 1-line data. The unit can be a data load buffer.

According to the first embodiment whose principle is shown in FIG. 4A, 1-line data containing an instruction to be transmitted at the request of the instruction processing unit 21, that is, instruction data to be moved in, are stored in the first transmit instruction data storing unit 23, for example, a load buffer primary (LBP), and one or more lines of the prefetched lines following the 1-line data are stored in the second transmit instruction data storing unit 24, for example, a load buffer secondary (LBS). An instruction stored in the LBP and moved in is immediately outputted to the instruction cache memory 20, and also transmitted to the instruction processing unit 21 through a bypass without using the instruction cache memory 20.

If the 1-line data stored in the LBP correspond to, for example, 4 instructions with 3 pieces of instruction data stored after an instruction to be moved in, and if the instruction to be moved in is not the one to change the flow of the instructions such as a branch instruction, a jump instruction, etc., then the next instruction should be stored in the instruction cache memory 20 as significant data. On the other hand, if an instruction to be moved in is a branch instruction or a jump instruction, then it is not appropriate to store the next instruction in the instruction cache memory 20 and it should be determined whether or not the instruction data are significant.

According to the present invention, the LBP and the LBS perform, as instruction data significance determining units, two determining processes, that is, a hit determination and an access determination. A hit determination is to determine the significance of data by comparing all corresponding addresses of instruction data. An access determination is to determine the significance of data by comparing only the lower order bits of addresses although it is rather an incomplete method. That is, an instruction stored in an LBS can be stored in the instruction cache memory 20: when an instruction after the instruction to be moved in is accessed in the LBP; when it is determined that the access to the instruction stored in the LBS is significant after an instruction stored in the LBP has been stored in the instruction cache memory 20; and when it is determined that a successful hit has been detected in the LBP when data stored in the LBP are accessed.

In FIG. 4B showing the principle of the second embodiment, data prefetched by hardware (that is, prefetched by an instruction other than a software prefetch instruction) are stored in the data cache memory 26 as in the first embodiment. For example, the data are transmitted from the second highest order storage unit 22 following the highest-order cache memory, for example a main storage, and then the data to be moved in (data required by an instruction/arithmetic operation unit 27) in the data stored in the transmit data storing unit 28 are stored in the data cache memory 26 and simultaneously transmitted to the instruction/arithmetic operation unit 27. An access or hit determination is made as in the first embodiment on prefetched data after the data to be moved in, and the data are transmitted to the data cache memory 26 based on the result.

On the other hand, if data are moved in according to a software prefetch instruction, the prefetched data are stored with the lowest priority according to the present invention. For example, the process is performed under the control of a priority control unit while an instruction requiring the immediate transmission of data, for example, a load/store instruction, etc., is not being executed so as to prevent the interference in the pipeline of a data cache memory, and to extend the residence of existing significant data to the farthest possible extent.

As described above, the present invention prevents unnecessary instructions or data from being stored in an instruction cache memory and a data cache memory.

In FIGS. 4A and 4B, when a cache miss has been detected in the cache memories 20 and 26, instructions and data can be processed without suspending the cache memories 20 and 26 in a wait state while necessary instructions or data are moved in from the storage unit 22 to the data storing unit 23, 24, 28.

Figure 5:
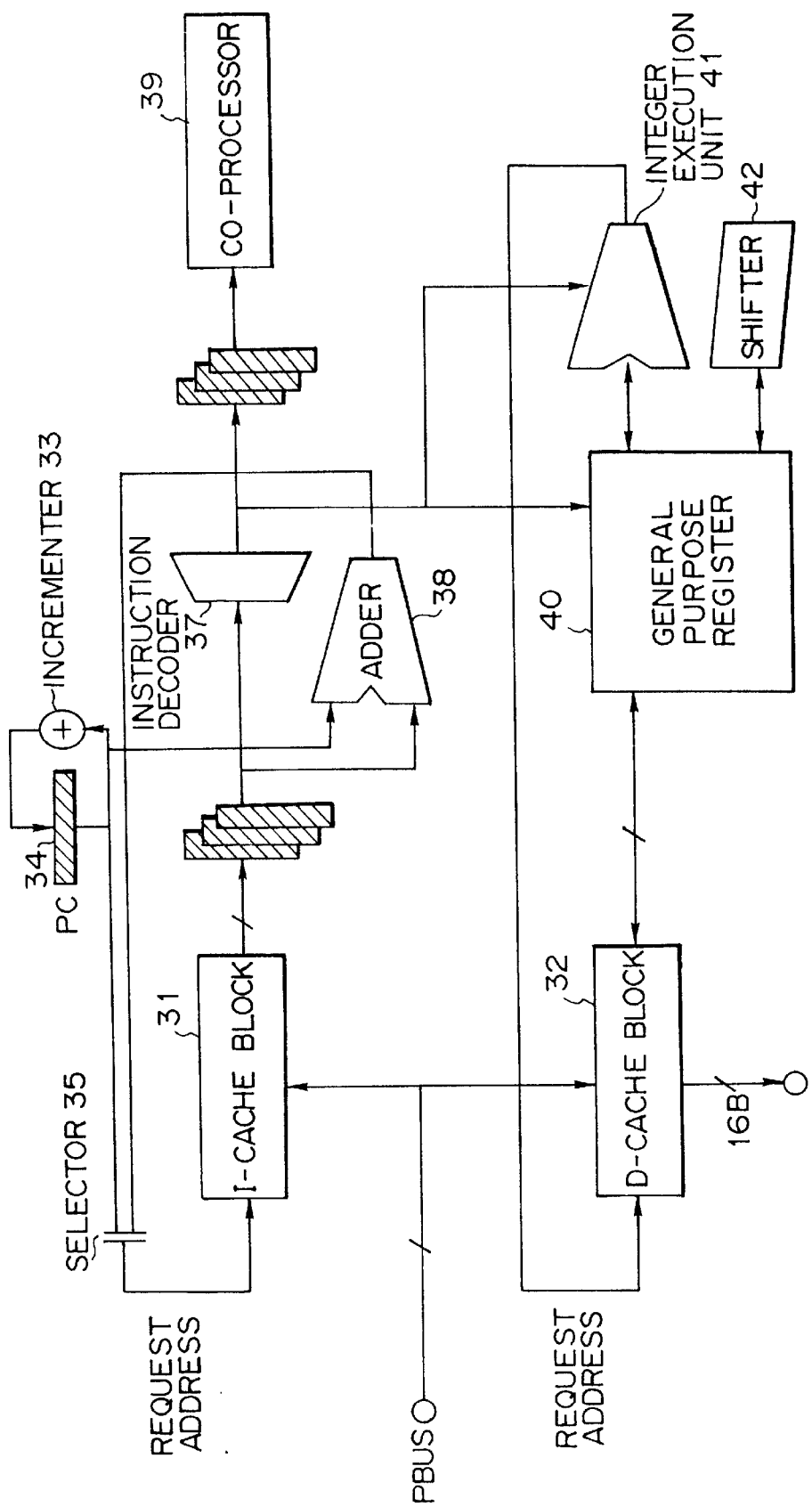
FIG. 5 is the block diagram showing the general configuration of the central processing unit (CPU) according to the present invention.

FIG. 5 is the block diagram showing the general configuration of the central processing unit (CPU) of the data processing device according to the present invention. In FIG. 5, an instruction load buffer and a data load buffer specific to the present invention are provided in an instruction cache block 31 and a data cache block 32 respectively.

In FIG. 5, an incrementer 33 increments the contents of a program counter 34 when an instruction other than branch or jump instructions is executed. The contents are provided for the instruction cache block 31 as a request address through a selector 35. An instruction read from the instruction cache block 31 is provided for an instruction decoder 37 through an instruction buffer 36. The instruction decoded by the instruction decoder 37 is provided for a co-processor 39 such as a floating point arithmetic operation unit, etc., a general purpose register 40, or an integer execution unit 41. For example, when a jump instruction is issued, the contents of the program counter 34 and the output of the instruction buffer 36 are applied to an adder 38, and the sum obtained by the adder 38 is provided as an address for the instruction cache block 31 through the selector 35.

A request address in the data cache block 32 is assigned by the integer execution unit 41, the output data of the data cache block 32 are applied to the general purpose register 40 to be used in an arithmetic operation by the integer execution unit 41. The shifter 42 is connected to the general purpose register 40.

A PBUS is connected, as an interface bus to the main storage, to the instruction cache block 31 and the data cache block 32. Data are exchanged in n byte units between the main storage and the cache memory. For example, if an instruction is n/4 bytes in length, then data are exchanged for 4 instructions simultaneously between the main storage and a cache memory. However, it is obvious that the relationship between the length of these instructions or data and the amount of exchange data is not limited to this application.

When each unit shown in FIG. 5 is associated with a corresponding unit shown in FIGS. 4A and 4B, each of the incrementer 33, the program counter 34, the selector 35, the instruction buffer 36, the instruction decoder 37, and the adder 38 corresponds to the instruction processing unit 21 shown in FIG. 4A. The combination of the instruction processing unit 21, the co-processor 39, the general purpose register 40, the integer execution unit 41, and a shifter 42 (these units form an arithmetic operation unit) corresponds to the instruction/arithmetic operation unit 27 in FIG. 4A.

Figure 6A:
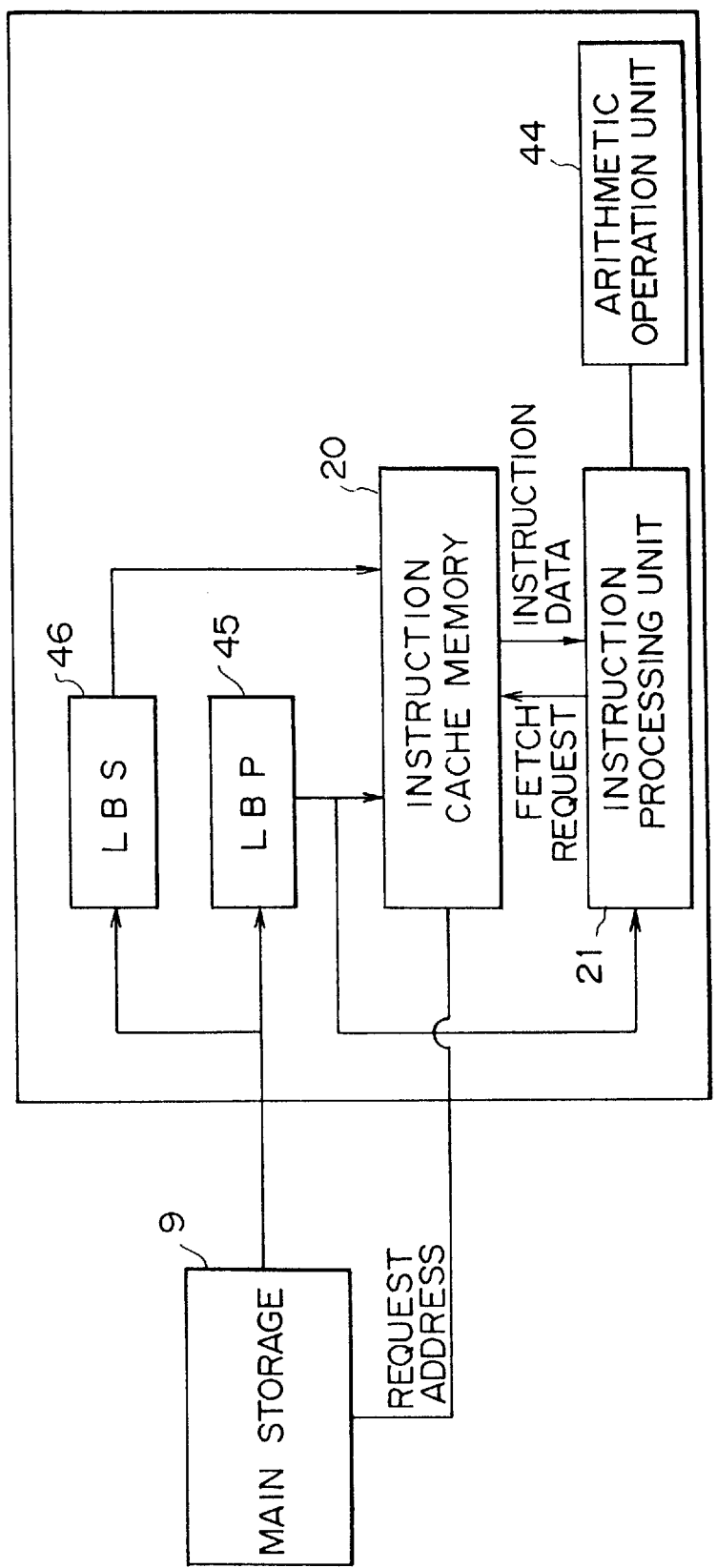
FIG. 6A is the block diagram showing the configuration of the data processing device and illustrates the first embodiment of the present invention.

FIG. 6A is the block diagram showing the configuration of the data processing device and illustrates the first embodiment of the present invention. FIG. 6A shows the relationship among the instruction cache memory 20, the instruction load buffer (LBP 45 and LBS 46), the instruction processing unit 21 in the instruction cache block 31 show in FIG. 5, and the main storage 9. As described above, the instruction load buffer comprises a load buffer primary (LBP) 45 forming the first transmit instruction data storing unit 23 shown in FIG. 4A and a load buffer secondary (LBS) 46 forming the second transmit instruction data storing unit 24.

Figure 8:
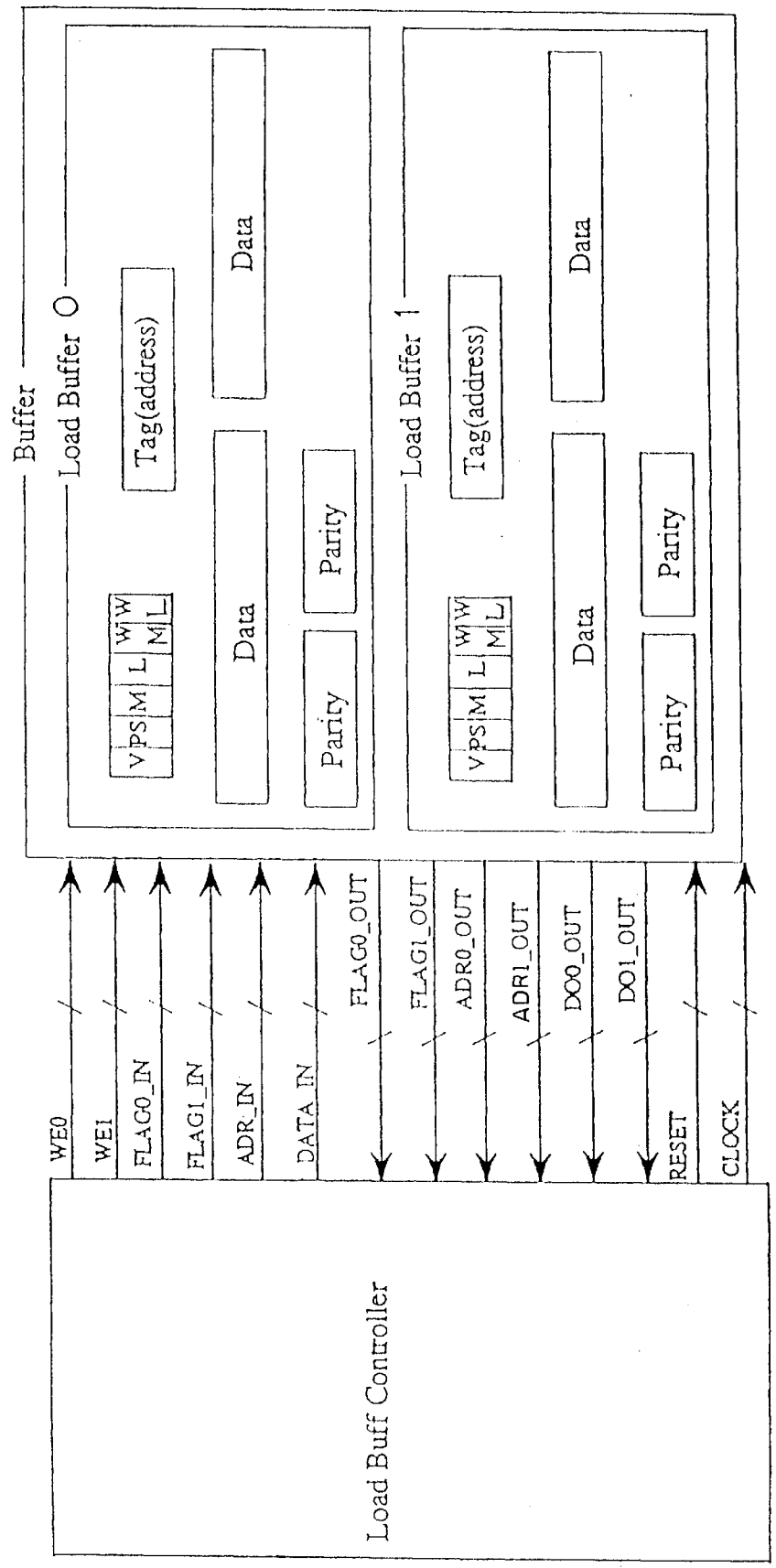
FIG. 8 is the block diagram showing the configuration of the instruction load buffer.

As described by referring to FIG. 8, the LBP 45 and the LBS 46 actually have the same configuration, and can be identified only by the contents of the PS flag indicating a primary or secondary. When the flag is active, the corresponding buffer indicates a secondary.

In FIG. 6A when an instruction fetch request from the instruction processing unit 21 is applied to the instruction cache memory 20, the contents of the instruction cache memory 20 are retrieved at the request. If the requested instruction data are not stored in the instruction cache memory 20, that is, if a cache miss has been detected, then a request address is notified by the instruction cache memory 20 to the main storage 9, and a move-in process is started.

The data transmitted from the main storage 9 are contained in two lines. One line containing the instruction data to be fetched is stored in the LBP 45, and the succeeding line is stored in the LBS 46. The instruction data stored in the LBP 45 to be fetched are immediately written in the instruction cache memory 20 and directly outputted to the instruction processing unit. Writing the data stored in the LES 46 into the instruction cache memory 20 is described in detail by referring to FIGS. 10 through 15.

Figure 6B:
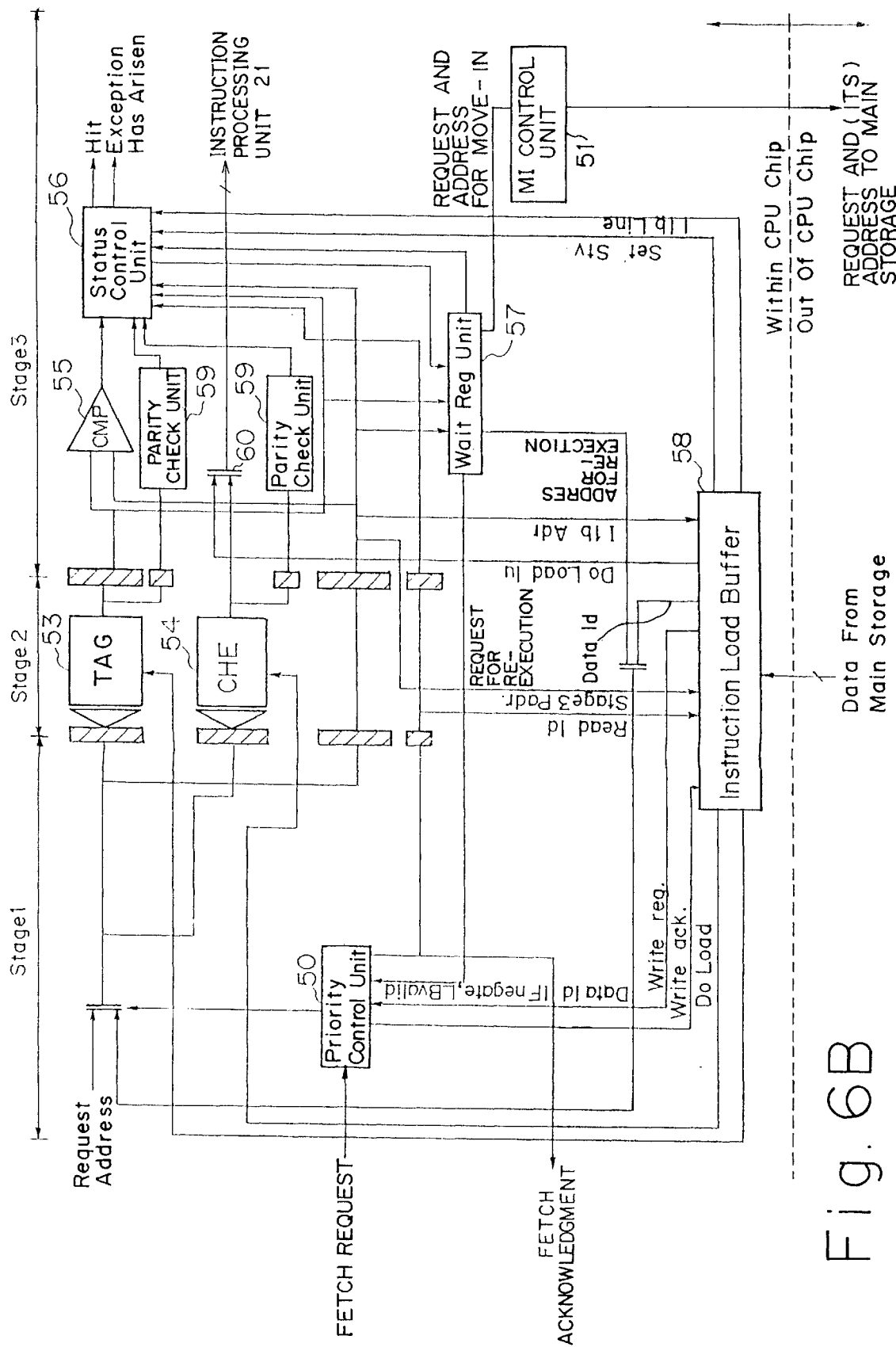
FIG. 6B is the block diagram showing the detailed configuration of the instruction cache block.

FIG. 6B shows the configuration of the instruction cache block 31 shown in FIG. 5. The cache block realizes an n-byte direct map with a 3-stage pipeline configuration. A pair of lines in FIG. 6B indicates a selector; a box with diagonals indicates an FF; and a triangle containing the characters CMP indicates a comparator. Stage 1 comprises a priority control unit 50.

The priority control unit 50 determines, according to the priority assigned to each request, whether or not an instruction fetch request from an instruction processing unit, a request from a wait register (described later), a re-execution, etc. should be performed.

Stage 2 comprises the cache tag 53 and the cache RAM 54. When data are read, they are stored in the instruction buffer 36 shown in FIG. 5 in the current stage.

Stage 3 is formed of a comparator 55 for determining a cache hit, a parity check unit 59, a status control unit 56, etc. The status control unit controls various states such as the existence of an exception (interruption, etc.). An instruction cache memory further comprises as important components a wait register 57, an instruction load buffer 58 and MI (move-in) control unit 51.

The wait register unit 57 is a buffer for storing a request address for a fetch to be executed again due to a cache miss, a move-in request, and their respective addresses. The instruction load buffer 58 stores move-in data and prefetched data, and is specific to the present invention. The meaning of each control signal shown in FIG. 6B is described later by referring to FIG. 8.

When a request for a fetch is issued to the instruction cache block 31, the instruction processing unit 21 sets an instruction fetch request signal in an active state, and notifies the instruction cache block 31 of the address of the request. When the instruction cache block 31 receives a request for a fetch, it sets a fetch acknowledgement signal to be applied to the instruction processing unit 21 in an active state. The request for a fetch is applied to the priority control unit 50, and the priority of the request is determined by, for example, a priority circuit. The request can be accepted only if the priority is the highest in all the requests in a cycle. If the request has been accepted, the entry in cache tag 53 having the corresponding address and the line of the cache RAM 54 are retrieved. The comparator 55 compares the address read from the cache tag 53 with a request address (a virtual address or a physical address depending on each system). In a system shown in FIG. 6B, addresses are compared and a parity check is performed on cache RAM 54 by a parity check unit 59. All the results are applied to the status control unit 56. If a line of data requested by a fetch of an instruction are stored in the cache memory, that is, a cache hit has been detected, then a hit signal is issued and a series of instruction fetching operations are completed.

However, if a cache miss has been detected, the corresponding line and a prefetched line are read from the main storage. When a cache miss has been detected, the status control unit 56 notifies the wait register unit 57 of the existence of the cache miss. The wait register unit 57 stores a request and its address to be re-executed and moved-in due to a cache miss or etc. On receiving a notice of a cache miss, the wait register 57 stores the address. Then, the wait register unit 57 outputs a move-in request and its address to the MI control unit 51. Then, the MI control unit 51 issues to the main storage a request to read the corresponding line. Data read from the main storage are stored in the instruction load buffer 58. Then, the instruction load buffer 58 outputs, to the instruction processing unit 21, the data associated with the request to fetch an instruction, and stores the data in the cache memory.

When data are outputted from the instruction load buffer 58 to the cache memory, the instruction buffer 58 outputs a write request signal (described later) to the priority control unit 50, receives a write acknowledgement signal in response to the request, and outputs the address portion in the instruction to the cache tag 53 and the data portion to the cache RAM 54. As described in detail below, if a request to fetch data subsequently is issued to the instruction load buffer 58, a comparator in the instruction load buffer 58 compares stored address(es) with the address in the request, and if the data in the instruction load buffer 58 indicate a hit, then the corresponding data in the instruction load buffer 58 are stored in the cache memory and outputted to the instruction process unit 21 through a bypass route via a selector 60.

Figure 7:
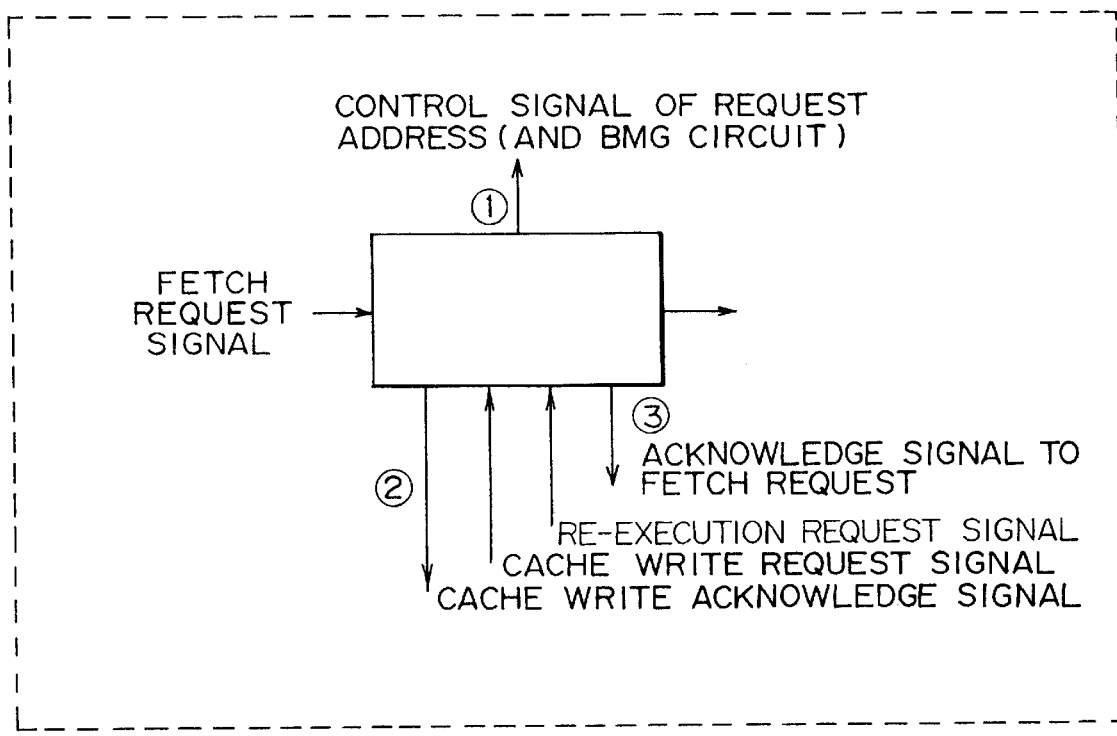
FIG. 7 shows in detail the operation of the priority control unit 50 shown in FIG. 6B.

The important components of the configuration of the instruction cache block shown in FIG. 6B are explained further in detail. FIG. 7 shows in detail the operation of the priority control unit 50 shown in FIG. 6B. The priority control unit 50 is a circuit comprising a plurality of gates and determines which one of a plurality of requests should be accepted as being assigned the highest priority.

As shown in FIG. 7, the priority control unit receives three request signals, that is, an instruction fetch request, a re-execution request, and a write-to-cache request. Each of these requests is assigned priority. For example a write-to-cache request is assigned the first priority; a re-execution request is assigned the second priority; and a fetch request is assigned the third priority. Based on the priority, the priority encoder encodes three signals. The three requests can be encoded in two bits.

If a request refers to a write-to-cache request, the control signal (output signal 1) of a request address is turned to an active state so as to switch a cache access address to an address output from the instruction load buffer 58. Furthermore, since data can be written to an instruction cache memory, a cache write acknowledge signal (output signal 2) is simultaneously turned to an active state. At this time, the instruction load buffer 58 writes data to an instruction cache memory and sets a WM/WL flag to an active state.

Next, when a re-execution request is issued, the control signal of a request address (output signal 1) is turned to an active state, and the address outputted by the wait register unit 57 is output as a request address.

Furthermore, when a fetch request is issued, an acknowledge signal to the fetch request (output signal 3) is turned to an active state, the instruction processing unit 21 is provided with a notification that the fetch request has been accepted, output signals 1 and 2 are turned to an inactive state, and then an instruction fetching operation is performed. The operation is a normal operation of an instruction cache memory, and performed almost regardless of the instruction load buffer 58.

Next, the wait register unit 57 is actually an address holding circuit, and comprises only a flip flop. That is, the wait register unit 57 holds a request address when a cache miss has been detected, and provides a necessary address when a move-in request is issued, and can be, or should be, included in the status control unit 56.

Thus, the configuration of the instruction cache block shown in FIG. 6B is rather a common configuration, and includes the contents not directly associated with the operation of the instruction load buffer according to the present invention. For example, the cache memory (TAG 53 and RAM 54), the comparator 55, the parity checking unit 59, etc. are absolutely common units. Furthermore, although the operation of the status control unit 56 depends on the configuration of each cache block, it is a commonly required unit.

The instruction load buffer 58 comprises a buffer unit for storing data and a control unit for controlling a write of data to the buffer unit, a write of data from the instruction load buffer 58 to the cache memory, etc. FIG. 8 shows an example of the configuration of the instruction load buffer 58. The buffer unit conceptually comprises 2 blocks, that is, a load buffer primary (LBP) and a load buffer secondary (LBS). The LBP stores a line containing an instruction necessarily stored in a cache memory. Therefore, the LBP normally stores a line containing the data associated with a request for a fetch which has caused a move-in. On the other hand, the LBS stores the data associated with a prefetching operation performed when a cache miss has been detected. As a result, the LBS stores data which may or may not be used in a succeeding instruction. The instruction load buffer 58 actually comprises two buffers (referred to as load buffers 0 and 1) having the same circuit design. That is, the LBP and the LBS are not clearly distinguished in an actual circuit configuration. The LBP can be distinguished from the LBS only by using a control flag.

The instruction load buffer 58 is designed to include two lines of data (each comprising n bytes in the cache memory shown in FIG. 6B). Therefore, each of the LBP and the LBS comprises an n-byte FF. However, the data from the main storage have a parity bit per byte. The LBP and the LBS contain an address corresponding to stored data and control flags. The control flags in each load buffer comprise 6 bits, that is, V, PS, M, L, WM, and WL. The meanings of the flags are listed as follows:

V: An entry is valid when the flag is in an active state.

PS: A load buffer secondary is operative when the flag is in an active state.

M: n/2 bytes of an entry in the MSB are valid when the flag is in an active state.

L: n/2 bytes of an entry in the LSB are valid when the flag is in an active state.

WM: n/2 bytes of an entry in the MSB are stored in a cache memory when the flag is in an active state.

WL: n/2 bytes of an entry in the LSB are stored in a cache memory when the flag is in an active state.

The following interfaces are used in the transmission of data between the control unit and the buffer unit.

WE0: indicates a write to load buffer 0.

WE1: indicates a write to load buffer 1.

FLAG0_IN: written data according to a control flag of load buffer 0

FLAG1_IN: written data according to a control flag of load buffer 1

ADR_IN: address of stored data

DATA_IN: stored data

FLAG0_OUT: output data according to a control flag of load buffer 1

FLAG1_OUT: output data according to a control flag of load buffer 1

ADR0_OUT: output of the address of the data stored in LB0

ADR1_OUT: output of the address of the data stored in LB1

DO0_OUT: output of the data stored in LB0

D01_OUT: output of the data stored in LB1

RESET: a reset signal

CLOCK: a clock signal

Figure 9:
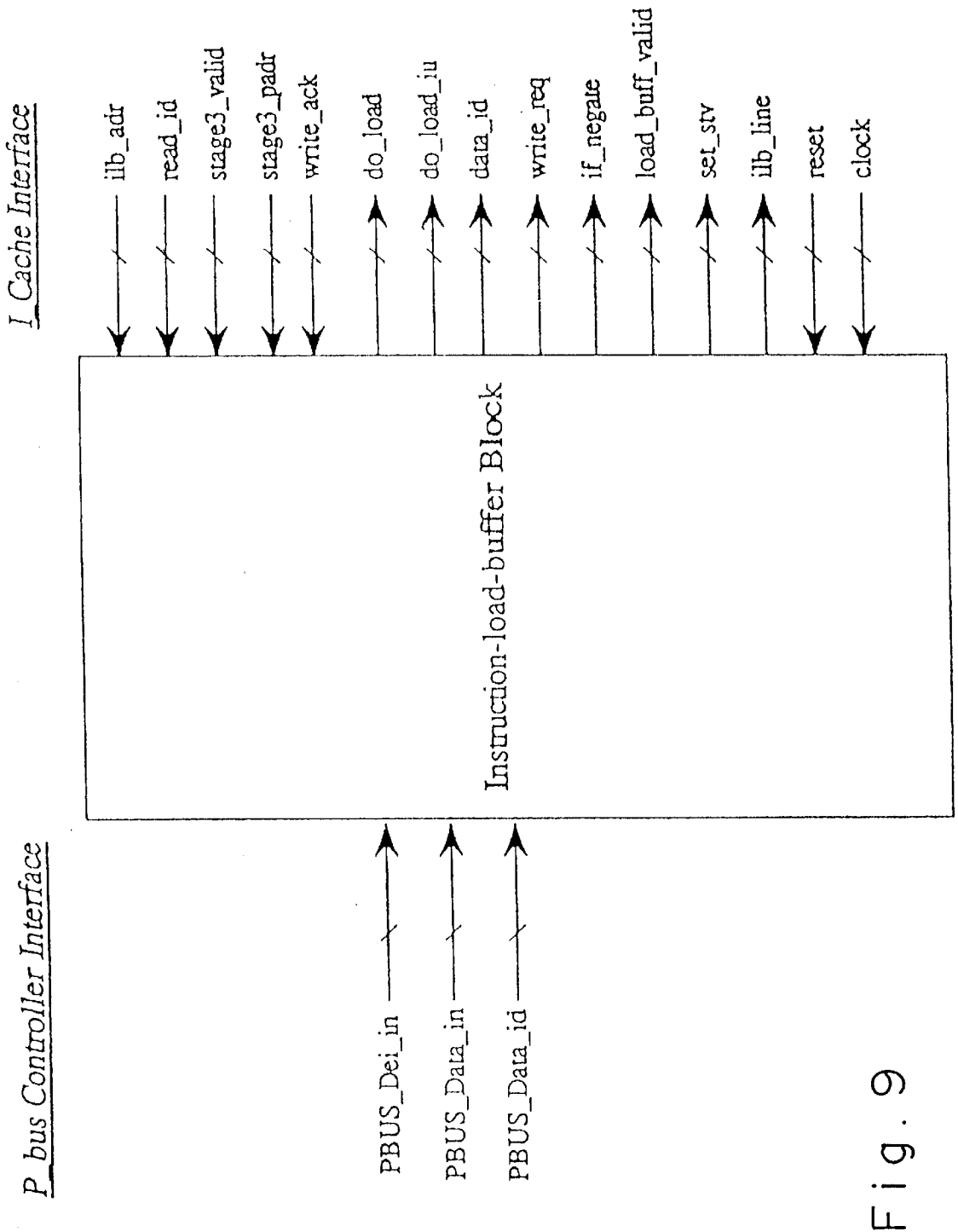
FIG. 9 shows the interface of the instruction load buffer.

FIG. 9 shows an example of an interface among the instruction load buffer, the instruction cache memory, and a PBUS. The meaning of each signal is listed below.

ILB_ADR: an address of data associated with a request for a fetch which has caused a move-in.

READ-ID: a selection signal within 2 lines and 2n bytes when an instruction is fetched (designation of data).

STAGE3_VALID: STAGE3 in the cache block is valid.

STAGE3_PADR: a physical address of a request to fetch an instruction; can be the same as ILB ADR.

WRITE_ACK: an acknowledgement from a cache memory in response to a request for a write to the cache memory D0_LOAD: written data in a cache RAM D0_LOAD_IU: written data in an instruction buffer DATA_ID: an ID of data written in a cache memory WRITE_REQ: a request for a write in a cache memory IF_NEGATE: data are stored in the PLB and the PLB is in the state of accepting a request for a fetch LOAD_BUFF_VALID: data in a load buffer are valid.

SET_STV: a hit signal in a move-in process

ILB_LINE: a hit determination signal when a request to fetch an instruction is issued to a load buffer (a determination signal indicating the comparison result of addresses by a comparator in a load buffer)

PBUS_DEI_IN : arrival of data from PBUS at the next cycle.

PBUS_DATA_IN: data from PBUS

PBUS_DATA_ID: a position of data from PBUS within 2 lines and 2n bytes

RESET: a reset signal

CLOCK: a clock signal

Figure 10:
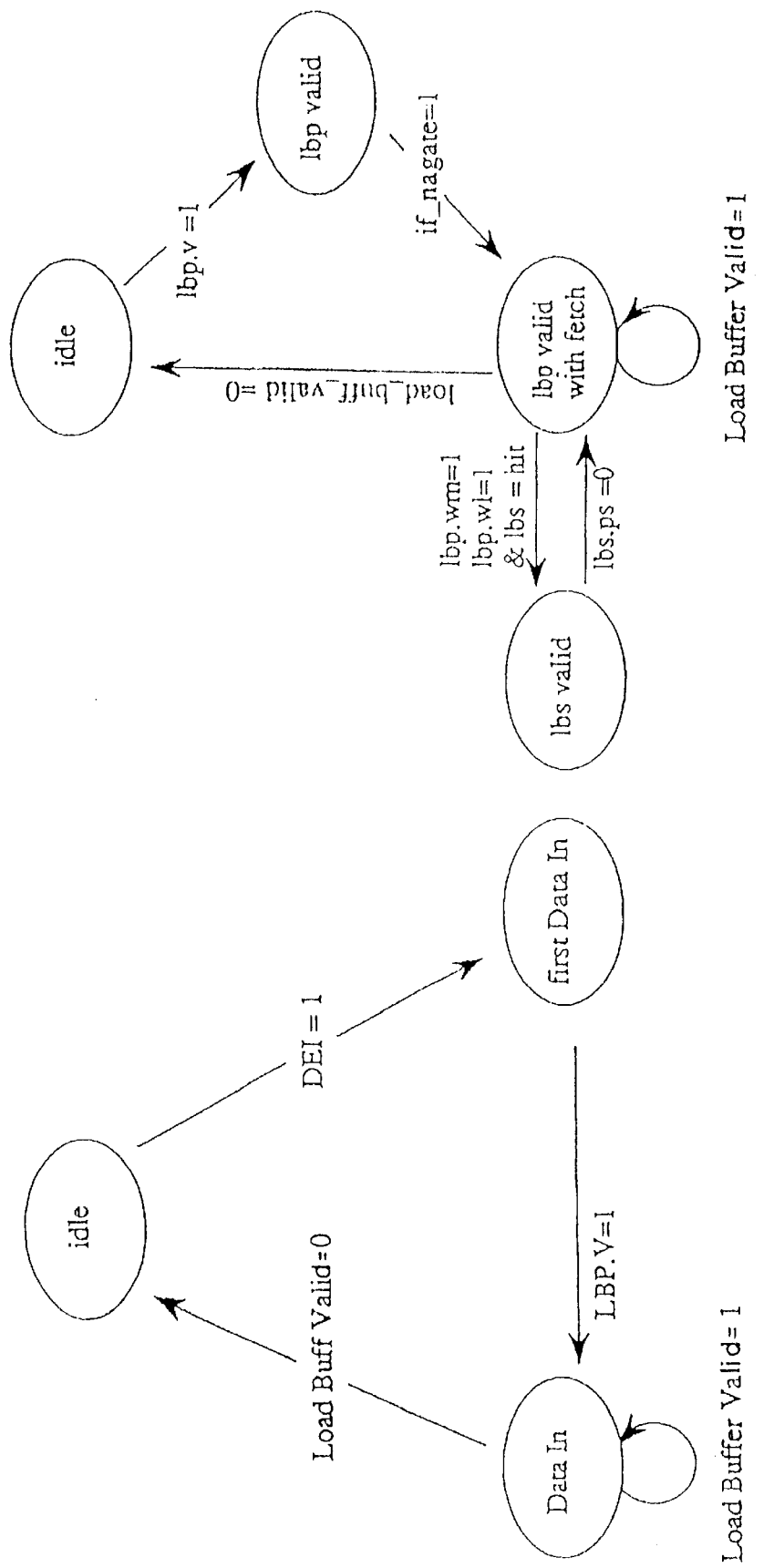
FIG. 10 shows the state machine of the instruction load buffer.

FIG. 10 shows a state machine of the load buffer. In this example, signals indicated using small letters are equivalent to those indicated using capital letters, i.e. lbp.V is equivalent to LBP.V. In FIG. 10, a state machine of a load buffer is shown on the left, and a state machine of "Data In", one of the load buffer states, is shown on the right. The load buffer maintains an idle state when no operations are performed. However, when a DEI signal indicating that data are being transmitted turns active at the next cycle, the buffer changes to a First Data In state. In this state, a series of operations, performed until the first move-in data transmitted from the main storage are stored, are controlled. When the first data are stored, each control flag of LB0 is set in an active state. That is, a bit corresponding to M or L is set to 1 together with the flag V indicating a valid entry. When an active DEI signal is entered and LBP.V turns active, the state changes from the First Data In state to the Data In state. The Data In state is maintained while the load buffer valid is active.

FIG. 10 shows on the right the state machine in the Data In state. When it is changed to the data-in state, the state machine in the Data In state changes from the idle state to the LBP Valid state. In this state, while prefetched data following the requested data to be fetched and to be moved in are stored, valid data already stored in the LBP are written in a cache memory. At this time, a flag indicating that the data have been stored in the cache memory, that is, the flag WM or WL, is set in an active state. The present system controls the whole process such that the data associated with the address of a request to fetch an instruction which has caused a move-in can be first moved-in from the main storage. That is, the data first stored in the LBP after the LBP Valid state was entered are those associated with the request to fetch an instruction. Therefore, since the corresponding data stored in the LBP Valid state are stored in an instruction buffer, the data are outputted to "Do Load Iu", a signal line to an instruction buffer. At this time, the signal IF_NEGATE is set in an active stage together with the signal SET_STV indicating a cache hit. An instruction cache memory turns into a state in which a new request to fetch an instruction can be accepted if the signal IF_NEGATE has turned active. Simultaneously, the LBP Valid state in a data-in state is changed to the LBP Valid With Fetch state. In the LBP Valid With Fetch state, while new move-in data, that is, prefetched data, are stored in a load buffer, the data stored in the LBP but not yet stored in a cache memory are stored in the cache memory. An instruction cache block in this state accepts a request to fetch an instruction. For a request to fetch an instruction accepted while the load buffer Valid is active, a load buffer is searched for an instruction issued after an instruction fetched by a cache miss. If the subsequent instruction is a jump instruction, the instruction is not stored in the load buffer in most cases.

The operation performed to store in a cache memory the data in the LBP after a cache miss has been detected is explained further in detail as follows. If a cache miss has been detected in the instruction cache memory, no subsequent instructions can be executed, the entire data processing device falls in an interlocked state, and the priority control unit 50 accepts no requests at all. Since the load buffer is first notified by the entry of a signal DEI that data are transmitted from the main storage, it sets LBP.V to the value of an active state and notifies the priority control unit 50 using the signal NEGATE that the data have been transmitted. Thus, the interlocked state is released and the priority control unit 50 can accept a request.

Thus, the first requested data stored in the LBP are outputted to the instruction buffer 36 through a bypass route via the selector 60 as described above. To notify the instruction processing unit 21 of the output of the data, a signal SET_STV is outputted from the load buffer to the status control unit 56. Thus, the status control unit 56 notifies the instruction processing unit of the entry of the data. When instruction data are stored in the instruction buffer 36, then the next request to fetch an instruction is issued, and the load buffer in an LBP Valid With Fetch state stores data in the LBS and continues storing data not stored in an instruction cache memory in all data stored in the LBP.

As described above, an effective method of storing prefetched data in a cache memory is to store only the data to be prefetched and used in the subsequent instructions. The state machine shown in FIG. 10 is a practical example of the method. In the LBP Valid With Fetch state, when data are retrieved in the load buffer at the request to fetch an instruction (when stage3_valid is active, the address of the request is provided by stage3_padr) issued by the instruction processing unit 21, the load buffer control unit compares the address of the stored data with the address of the request using a comparator. If there is a hit with the data in the LBP, the load buffer stores the data in the instruction buffer.

That is, retrieval of data in response to a request to fetch an instruction indicates an address comparison by a comparator of the instruction load buffer controller described later by referring to FIG. 11. A request address is applied to the controller according to the address-in signal, and the comparator of the controller compares the request address with the address of the instruction data in the load buffer.

If data in the LBS show a hit, the current state turns to the LBS Valid state if the flags WM and WL of the LBP are active. If the flags WM and WL of the LBP are not active, then the data in the LBP not yet stored in a cache memory are stored in the cache memory. In the LBS Valid state, the LBS is immediately changed to the LBP by setting the PS flag of the LBS to 0. As shown in FIG. 7, in the present buffer, the LBS can be changed to the LBP with only the PS flag changed. When the change has been made, that is, when LBS.PS=0, the state machine changes from the LBS Valid state to the LBP Valid With Fetch status. As described above, in the LBP Valid With Fetch state, the data in the LBP not yet stored in the cache memory are stored in the cache memory. Thus, all move-in data including the prefetched data are stored in the cache memory. When all data are stored in the cache memory, the load buffer control unit sets the load buffer Valid to 0. When the load buffer indicates Valid=0, the state machine turns to the idle state.

If there is a miss with the data in the LBS, then the data in the LBS are invalidated because prefetched data are invalid. Then, the state machine turns to the idle state when the load buffer indicates Valid=0.

Figure 11:
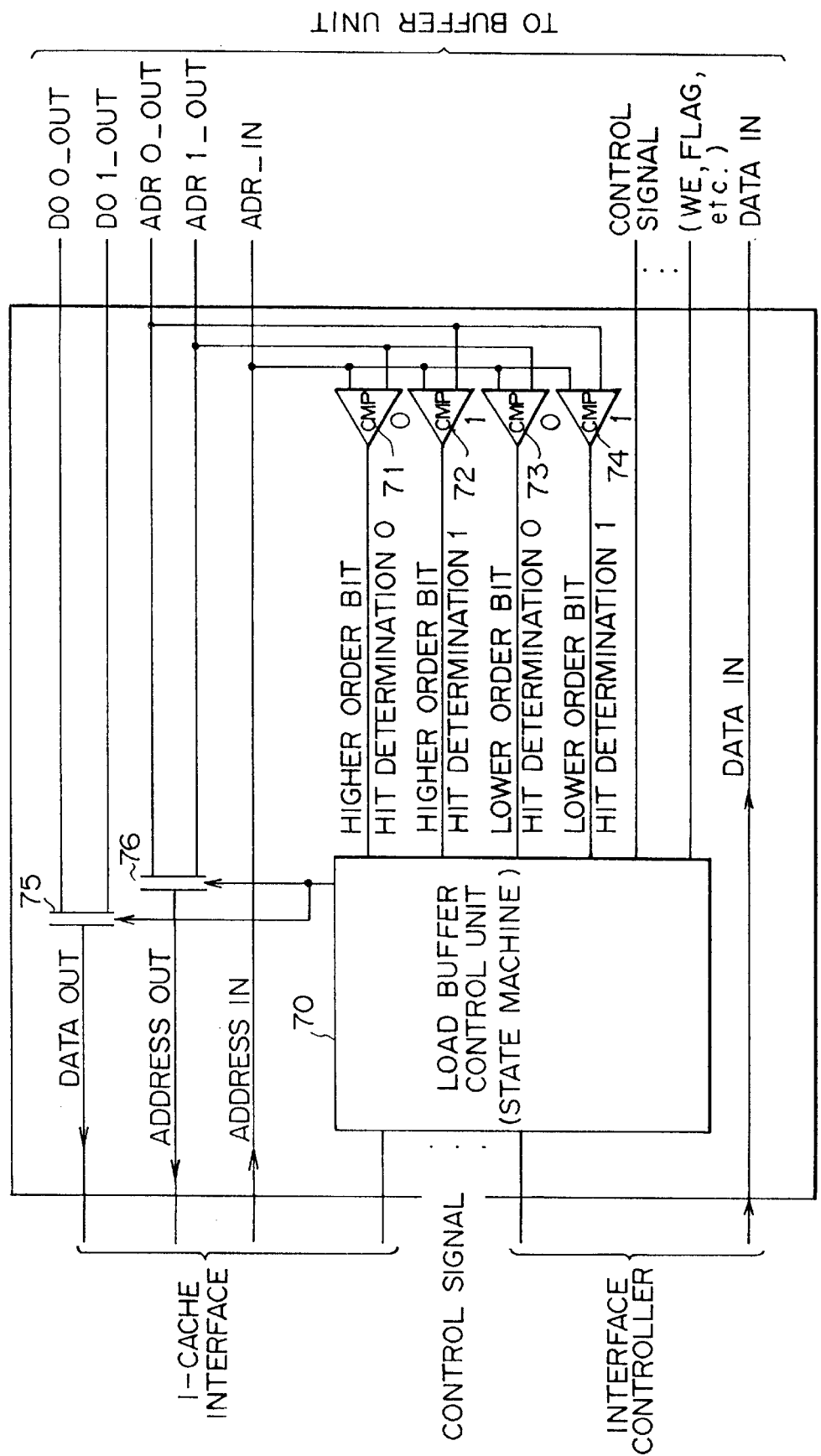
FIG. 11 shows the outline of the configuration of the load buffer controller of the instruction load buffer.

The operation of the instruction load buffer according to the present invention is explained further in detail by referring to FIGS. 11 through 14. FIG. 11 shows the outline of the configuration of the load buffer controller of the instruction load buffer described by referring to FIG. 8. In FIG. 11, the load buffer controller comprises comparators 71 through 74 and selectors 75 and 76. The comparator 71 compares higher order bits of the address of an accessed instruction with higher order bits of the address of an instruction in the load buffer 0 when the load buffer control unit 70 corresponding to the state machine explained by referring to FIG. 10 accesses the load buffer 0, for example, when the contents of the load buffer 0 are retrieved according to a request to fetch an instruction preceded by another instruction moved in at a request of the instruction processing unit. The comparator 72 compares lower order bits of the above-described addresses. Likewise, the comparator 73 compares higher order bits of the addresses when the load buffer 1 has been accessed. The comparator 74 compares lower order bits of the addresses. The selector 75 selects data either of the load buffer 0 or the load buffer 1 and outputs them to an instruction cache memory. Likewise, the selector 76 selects an address and outputs it to the instruction cache memory.

Figure 15:
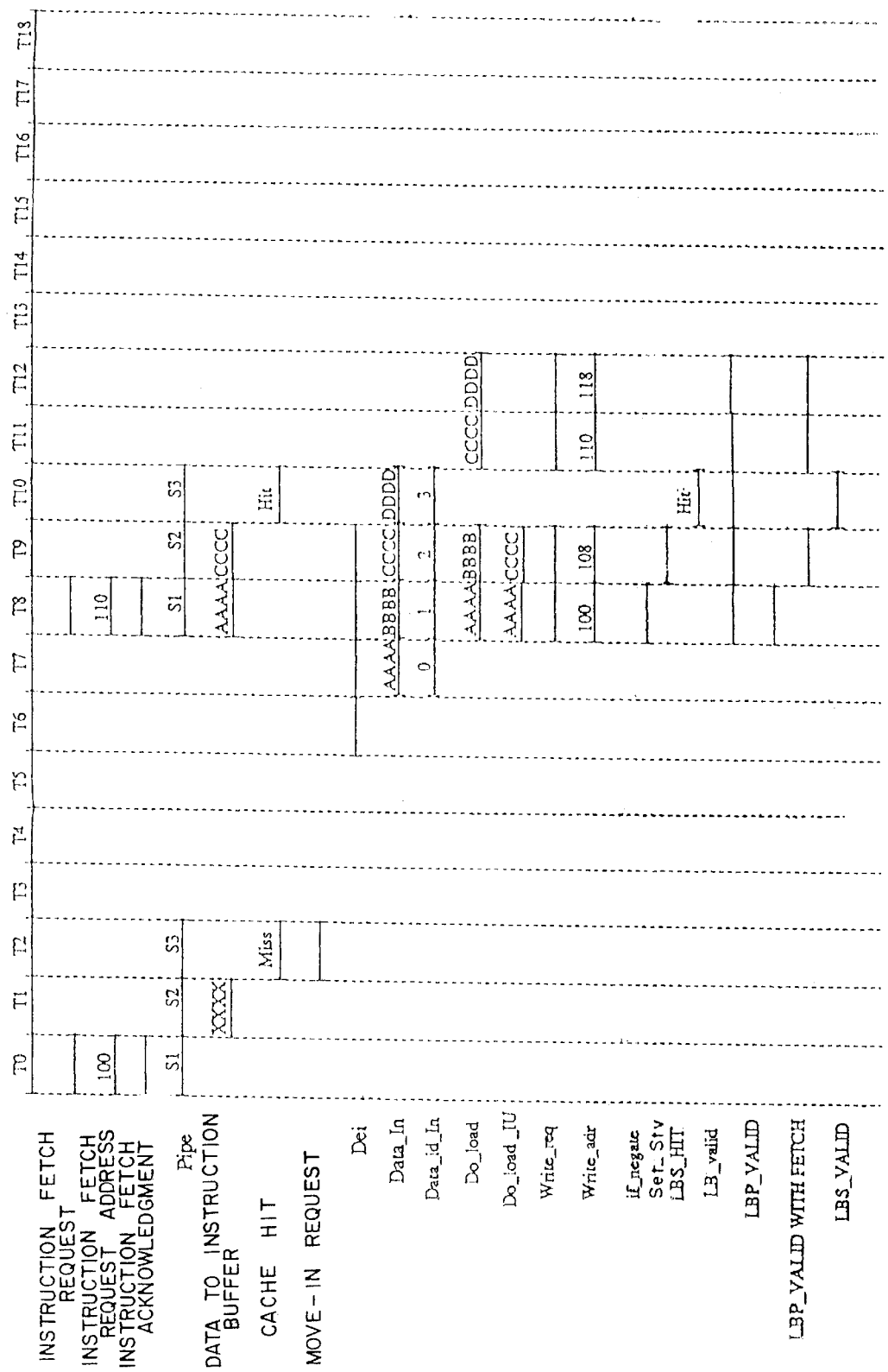
FIG. 15 is the time chart (1) indicating a process of fetching an instruction in the instruction load buffer.

In the embodiment shown on the right in FIG. 10 and in and after FIG. 15, an instruction stored in the LBS is stored in the instruction cache memory 20 only when the instruction stored in the LBS has passed a hit determination made by comparing all bits of the address of the instruction when the instruction stored in the LBS is stored in the instruction cache memory after the instruction stored in the LBS has been stored in the instruction cache memory 20. That is, on the right in FIG. 10, the condition of a change from an LBP valid with fetch state to an LBS valid state is that all data in the LBP are stored in a cache memory and the result of a hit/miss determination indicates a hit. In FIG. 11, the comparators 73 and 74 output 1, the AND gate provided in the load buffer control unit 70 receives the outputs of the comparators, and the output of the AND gate is 1. Thus, the data can be processed as having passed the hit/miss determination.

Figure 12:
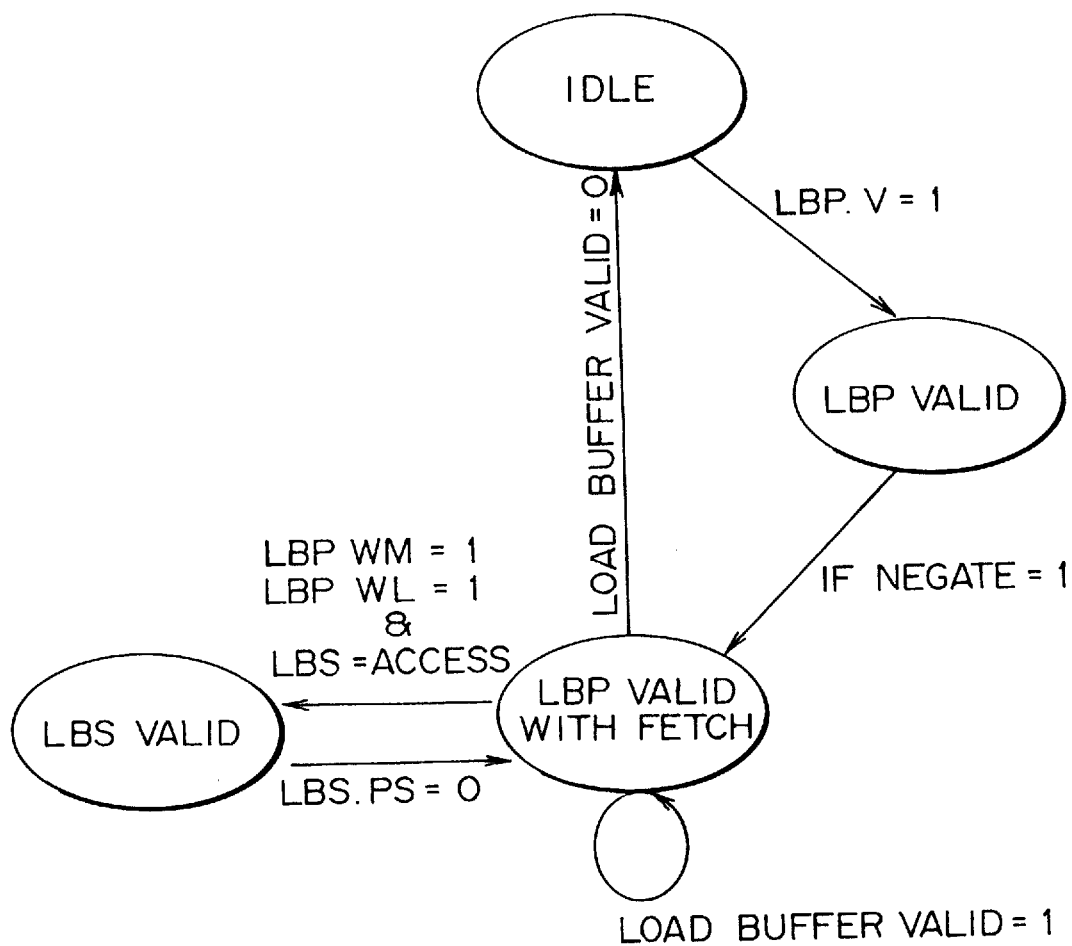
FIG. 12 shows an example (1) of a different change of states than the one shown in FIG. 10.

According to the present invention, a change of states is not limited to the case shown in FIG. 10, but other changes of states can be performed. FIG. 12 shows an example (1) of a different change of states than the one shown in FIG. 10. In FIG. 12, only the state machine in a data-in state shown on the right in FIG. 10 is illustrated. The conditions of a change from the LBP valid with fetch state to the LBS valid state of the state machine are different from those for the above-described case. That is, an LBS access replaces an LBS hit. In this case, a determination is made only to lower order bits of an address in response to access to instruction data stored in the LBS after all the data in the LBP have been stored in the instruction cache memory. That is, the instruction data stored in the LBS are stored in the instruction cache memory only if an access determination is made and the data have passed the determination. In FIG. 11, data are processed as having passed an access determination if the comparator 74 outputs 1.

Figure 13:
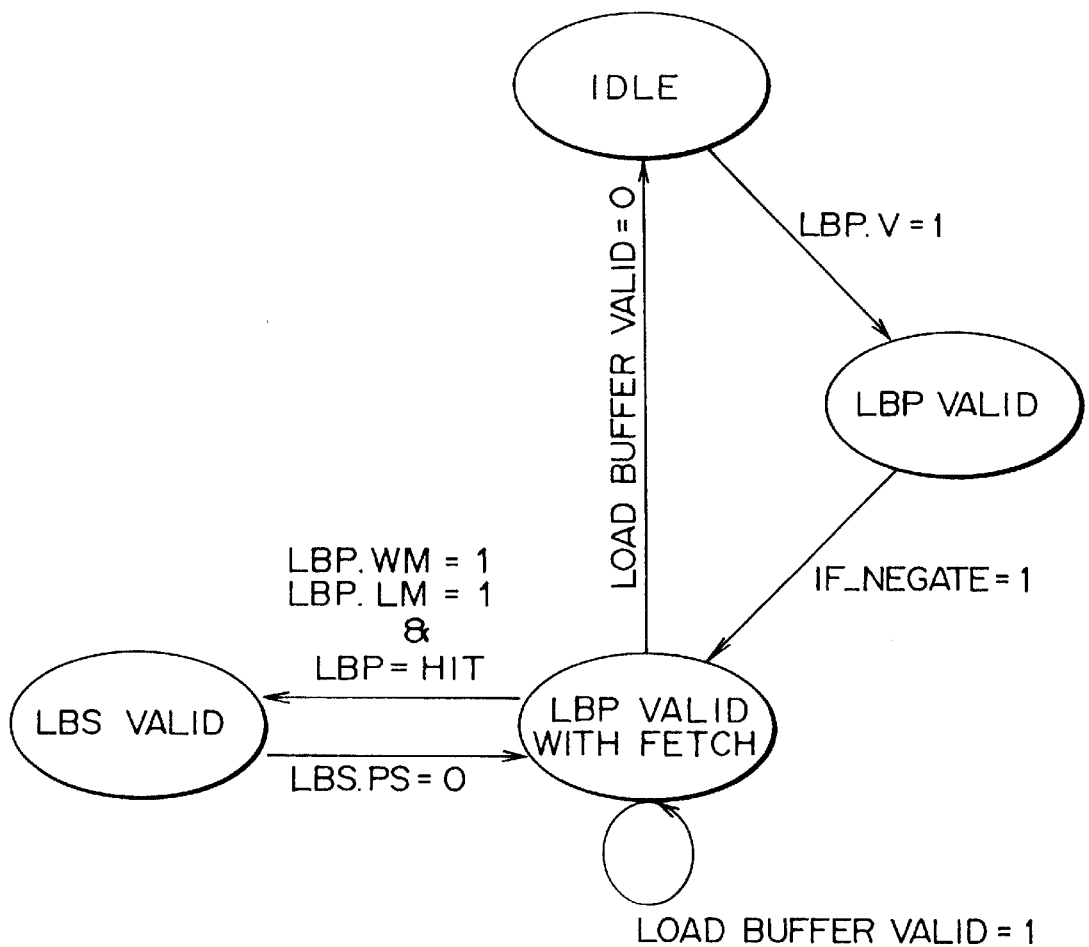
FIG. 13 shows a second example (2) of a change of states different than the case shown in FIG. 10.

FIG. 13 shows another example (2) of a different change of states than the case shown in FIG. 10. In FIG. 13, unlike the case shown in FIG. 10, determination as to whether or not the data stored in the LBS should be stored in the instruction cache memory after all the instruction data stored in the LBP have been stored in the instruction cache memory is made according to a result of a hit/miss determination on the instruction data stored in the LBP. That is, when an instruction, among the instructions stored in the LBP, preceded by the instruction data moved in according to a request from the instruction processing unit is accessed, a hit/miss determination is made by comparing all bits of addresses. The instruction data stored in the LBS are stored in the instruction cache memory only if the instruction has passed the determination. In FIG. 11, a determination result of a hit corresponds to the output of 1 from both comparators 71 and 72.

Figure 14:
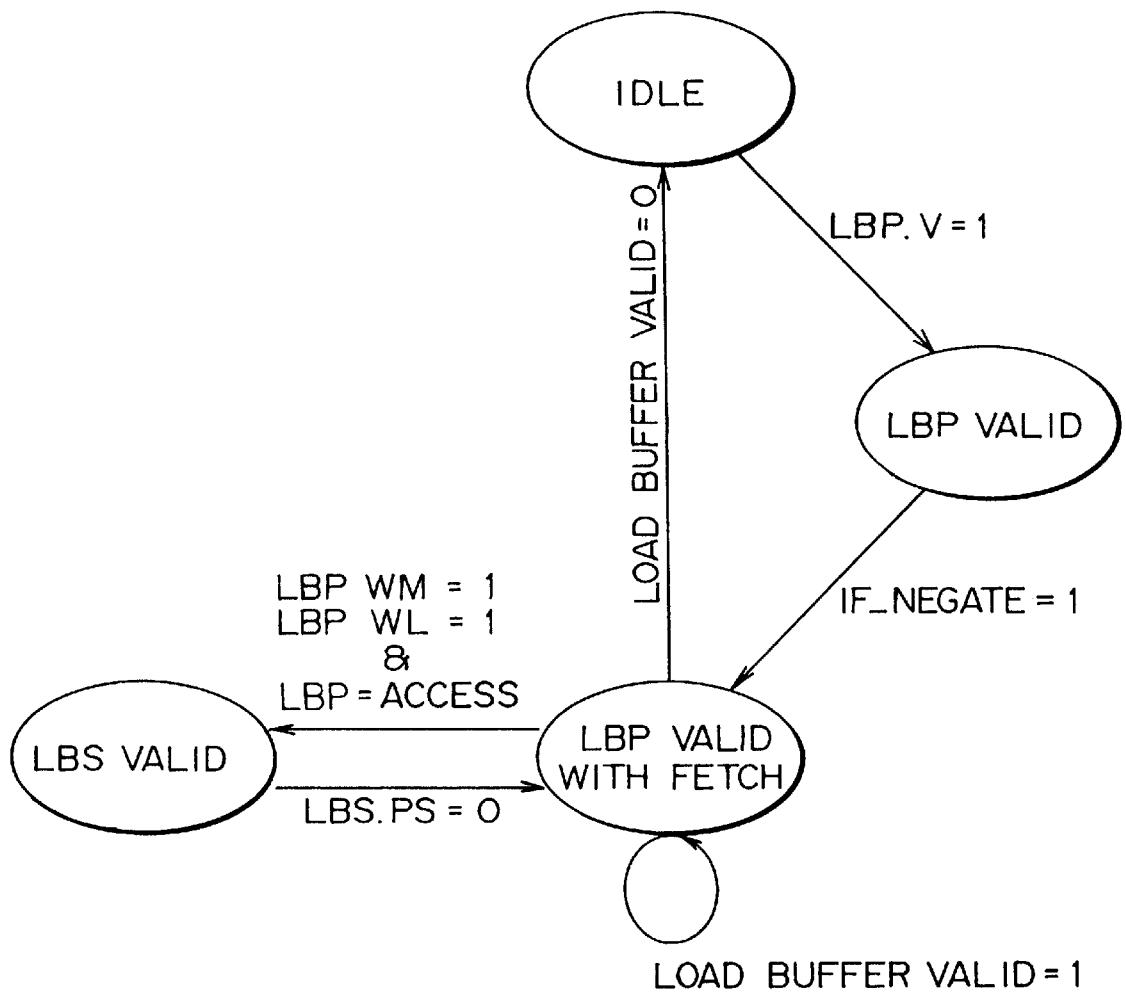
FIG. 14 shows an example (3) of a different change of states than the case shown in FIG. 10.

FIG. 14 shows an example (3) of a different change of states than the case shown in FIG. 10, and determination as to whether or not the instruction data stored in the LBS should be stored is made according to a result of an access determination made to the instruction data stored in the LBP. That is, when the instruction data preceded by the instruction data moved in at a request are accessed in the LBP, the instruction data stored in the LBS are stored in the instruction cache memory only if the comparator 72 outputs 1 as a result of the access determination made by comparing lower order bits of addresses. According to the descriptions based on FIGS. 10 through 14 in explaining change of states, the load buffer 0 initially corresponds to the LBP, and the load buffer 1 corresponds to the LBS.

FIG. 15 is a time chart indicating a hit with the data in the LBS. In FIG. 15, a request to fetch an instruction into an instruction cache memory is issued at T0. The instruction cache memory informs in an instruction fetch acknowledgement that the request can be accepted. Then, at T1, some data are stored in the instruction buffer. However, since the data are not requested data, a cache miss is detected at T2, and a move-in operation is started by the MI control unit by setting the move-in request in an active state. The state DEI is notified at T6, and data are transmitted from the main storage during 4 cycles from T7 to T10. Data to be transmitted first, that is, data AAAA transmitted at T7, are stored in the instruction buffer at T8 through the bypass route. Simultaneously, IF_NEGATE turns active, and the instruction cache memory can accept a request to fetch an instruction in the subsequent cycle. In response to the request to fetch an instruction at T8, the associated data CCCC entered in the load buffer at T9 are immediately outputted to the instruction buffer. Then, at T10, a hit with the data in the LBS turns LBS_HIT to an active state. At this time, the state temporarily turns to LBS_VALID, the PS flag is updated, and the LBS is changed to the LBP. The prefetched data are stored in the cache memory at T11 and T12, and changed to the Idle state at T13. Thus, a series of operations are completed. A request to fetch data at address 110, not at address 108, is issued at T8 because the addresses of requests are not always sequential.

In FIG. 15, it is assumed that no operations are performed in a cache memory portion during the period from T2 at which a move-in request is issued to T7 at which data are actually transmitted. However, during the period, access accompanied with other processes can be performed in the cache memory. That is, according to the present invention, the instruction cache memory can be accessed during the period until the data transmitted to the instruction load buffer have been written in the instruction cache memory. Normally, the period is rather long and the cache memory can be utilized efficiently.

Figure 16:
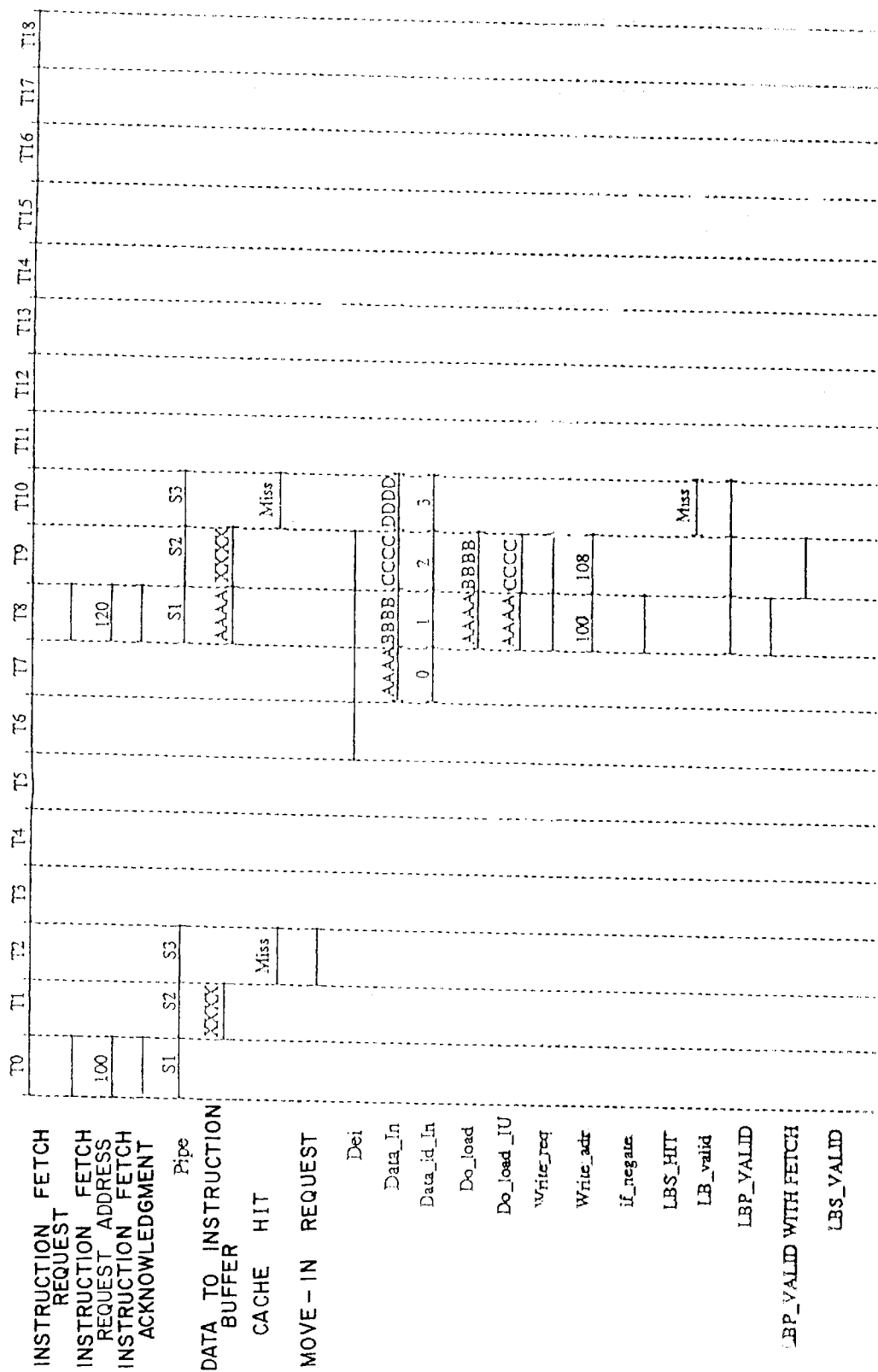
FIG. 16 is the time chart (2) indicating a process of fetching an instruction in the instruction load buffer.

FIG. 16 shows an example where the data in the LBS indicate a miss. The operations performed up to T9 are the same as those shown in FIG. 15. However, since the data in the LBS indicate a miss at T10, the data in the LBS are invalidated so that a series of operations can be terminated at T11. At T9, the data to be stored in the instruction buffer are normally "CCCC". However, since they are the data to be determined to be invalid in the subsequent cycle, they are referred to as "XXXX". At this time, the data transmitted as described by referring to FIG. 16 are inputted to the load buffer and the instruction buffer simultaneously. This can be realized by, for example, additionally establishing another path.

Next, the second embodiment is explained below. In the second embodiment, a data load buffer for temporarily storing data in fetching data from, for example, a main storage to a data cache memory as described above, and prefetched data together with the data to be moved in as being associated with a fetch instruction are stored in the data load buffer. The second embodiment is explained by referring to a data prefetching operation with an example of a program effectively executed using such a fetch and a timing chart for the program.

Figure 18:
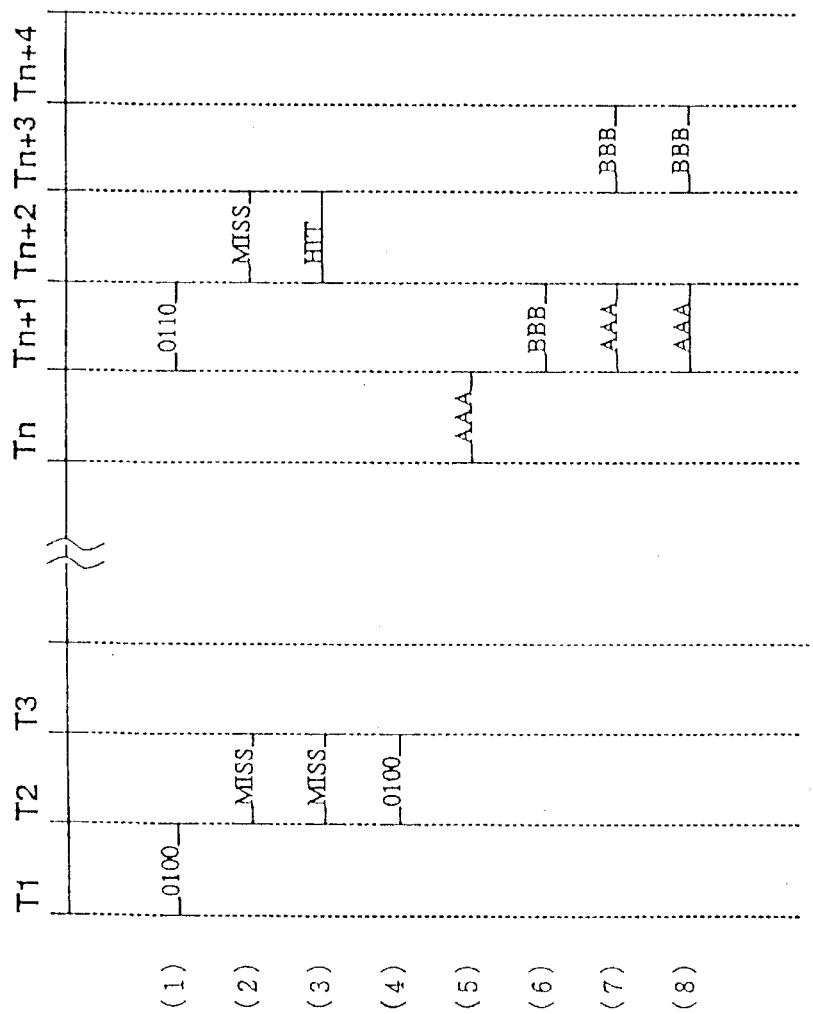
FIG. 18 is the timing chart indicating the process of the example of fetching data shown in FIG. 12.

FIG. 17 shows an example of a program effectively executed by a prefetch control of data according to the second embodiment. FIG. 18 is a timing chart indicating the execution of the program shown in FIG. 17.

In FIG. 17, the data at address 0100 are read to data register D1, the address is incremented correspondingly, and the data at the incremented address are read to data register D2. For example, an address value 0100 is read to address register A1 in the instruction/arithmetic operation unit 27 shown in FIG. 4B. Simultaneously, a request to fetch data is issued from the instruction/arithmetic operation unit 27 to the control unit of the data cache memory 26. Then, in the next cycle, a hit/miss determination is made in the data cache memory and the data load buffer.

As shown in FIG. 18, a request for data is issued to store them in a data cache memory with address 0100 designated at cycle T1. At T2, a hit/miss determination is made both in a data cache memory and a data load buffer (DLB). Since the determination indicates a miss in both units, the request for data is issued to the second lowest order storage unit next to the data cache memory, for example, a main storage, using address 0100.

At the request, data are prefetched in addition to the data at the designated address. The prefetch process is a hardware prefetch as in the first embodiment. If data to be fetched, that is, the data AAA associated with a move-in have been transmitted from the main storage to the data load buffer at Tn, then the prefetched data BBB are subsequently transmitted to the data load buffer (DLB) at the next cycle Tn+1. Simultaneously, data AAA are outputted from the DLB to the data cache memory, and to the instruction/arithmetic operation processing unit through a bypass route.

At cycle Tn+1, a request to fetch data is issued from the instruction/arithmetic operation unit to both data cache memory and DLB at address 0110. At the next cycle Tn+2, a hit/miss determination is made in both units. Since the requested data, that is, BBB, have not yet been stored in the cache memory, the cache memory indicates the determination result as a miss. On the other hand, the DLB indicates a hit. Therefore, data BBB are outputted to both data cache memory and instruction/arithmetic operation unit at the next cycle Tn+3.

According to the second embodiment, as described in the description by referring to FIG. 15, the data cache memory can be accessed by other processes during the period from the moment a move-in request is issued to the main storage to the moment the first data have been stored in the data cache memory. The period is shown as the duration from T3 to Tn in FIG. 18.

Figure 19:
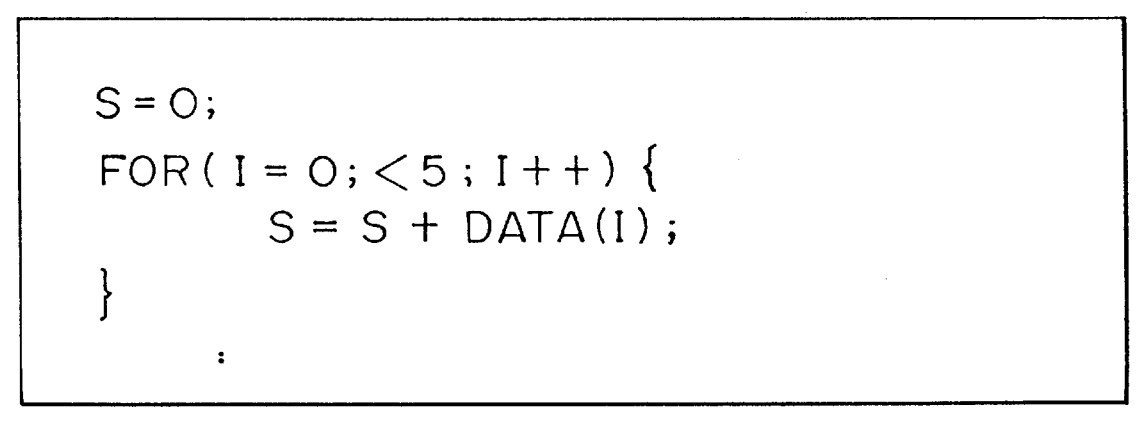

FIGS. 19 and 20 show an example of a program in which a prefetch control is effectively performed according to a software prefetch instruction according to the second embodiment. The example in FIG. 19 relates to a high-level language, and the example in FIG. 20 relates to an assembly language. In the program shown in FIG. 20, the instruction "pload A1" is a software prefetch instruction. It is a load instruction to store in register D1 the data to be used in an actual arithmetic operation by the instruction "load D1, A1".

In the case of a high-level language shown in FIG. 19, there is no instruction corresponding to a software prefetch instruction. FIG. 19 shows a concept used in understanding the contents of FIG. 20.

In FIG. 20, a leading address of array values pointed by data (i) is set at ①; the data to be required later are prefetched at ②, and the instruction activates a move-in. Normally, since a moving-in operation takes a much longer time than the execution of a common instruction, it is executed more sufficiently in advance than a load instruction. The compiler considers the time and locates the prefetch instruction at the optimum position. ③ in FIG. 20 corresponds to s=0 in FIG. 19. At ④, necessary data for use in actual calculation are read to data register D1. By this time the prefetch instruction at ② has stored necessary data in the data cache memory or the data load buffer. Therefore, the data can be obtained at a high speed. At ⑤, an addition is performed. No software prefetch instructions or i-incrementing instruction follow thereafter in FIG. 20 because enough data to calculate S=S+data (i) can be read by the prefetch instruction. Then, the result obtained by the program shown in FIG. 19 can be obtained by executing the instruction at ⑥.

Figure 21:
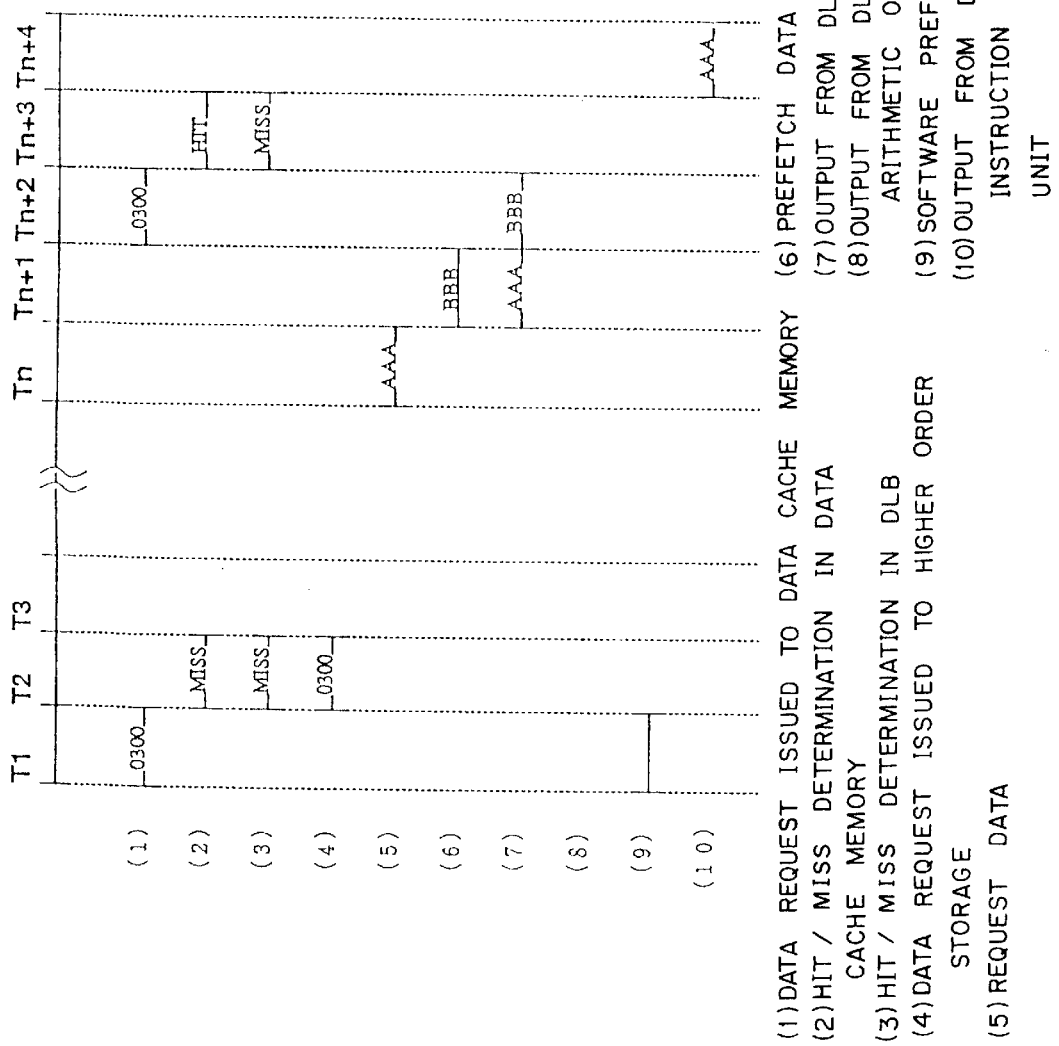
FIG. 21 is the timing chart indicating the process of the example of fetching data shown in FIGS. 19 and 20.

FIG. 21 shows an example of a timing chart associated with FIGS. 19 and 20. For example, in FIG. 20, after the first instruction reads the value 0300 as an address value into address register A1, the data at the address designated by A1 are software-prefetched. Then, as shown in FIG. 21, a request to fetch data into a data cache memory at address 0300 is issued at cycle T1. At the next cycle T2, the hit/miss determination for the data cache memory and the DLB individually indicates a miss. Therefore, a request for data is issued to, for example, a main storage at the address.

As in FIG. 18, data AAA are transmitted at cycle Tn, and prefetched data BBB are transmitted at the next cycle Tn+1 from the main storage to the DLB. Unlike that shown in FIG.

18, since a request for data is not issued by the instruction/arithmetic operation unit at cycle Tn+1, the data AAA and BBB are outputted to the data cache memory at Tn+1 and Tn+2 respectively. In this case, compared with the case shown in FIG. 18, the data BBB is outputted 1 cycle faster to the data cache memory. However, since FIG. 21 shows the software prefetch instruction, data are not outputted simultaneously to the instruction/arithmetic operation unit and to the data cache memory. The actual request to transmit data is issued to the instruction/arithmetic operation unit at Tn+2. At this time, since the data at address 0300 have been outputted from the DLB to the data cache memory, the hit/miss determination indicates a hit in the data cache memory, and a miss in the DLB at Tn+3, and the data AAA are outputted from the data cache memory to the instruction/arithmetic operation unit at Tn+4.

Figure 22A:
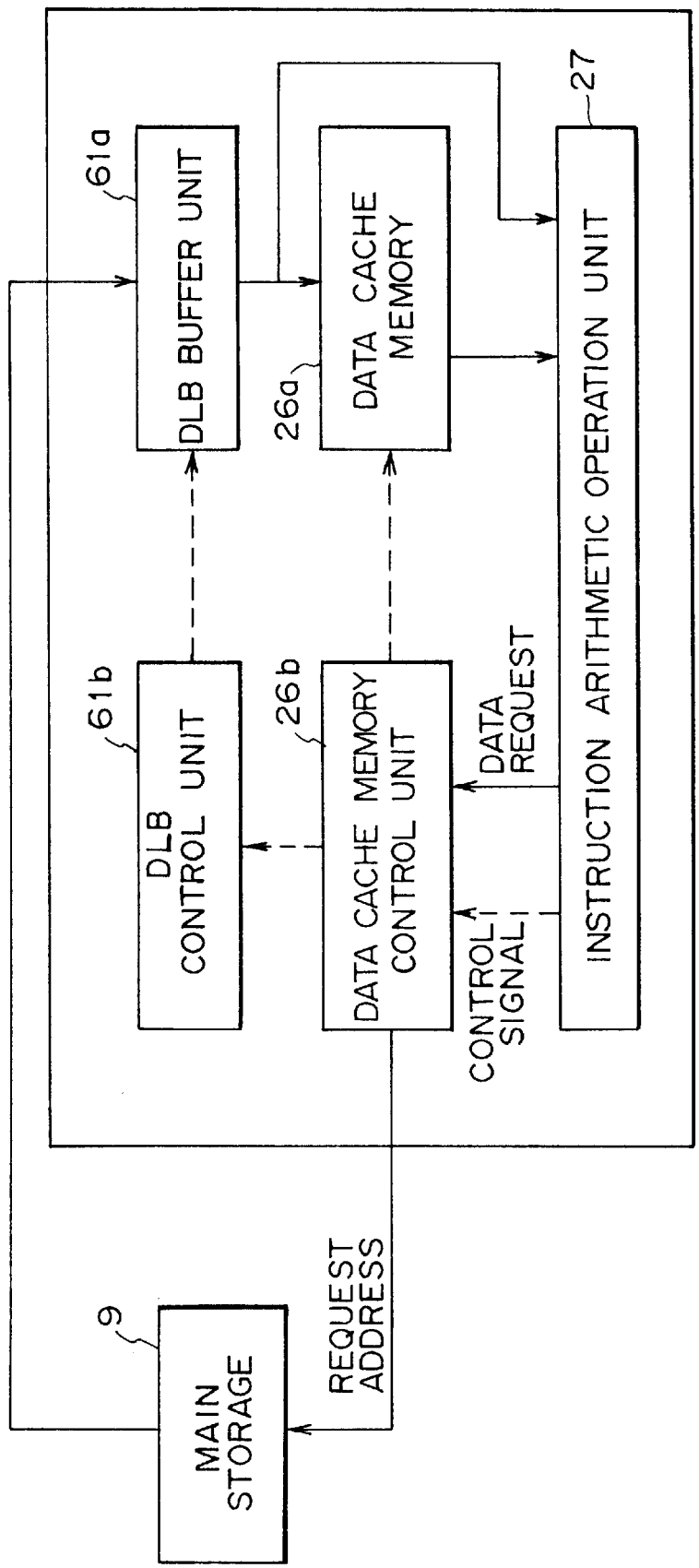
FIG. 22A is the block diagram showing the configuration of the data processing device according to the second embodiment of the present invention.

FIG. 22A is the block diagram showing the configuration of the data processing device according to the second embodiment of the present invention. Unlike FIG. 6A, it shows the relationship only among the main storage 9 and the data cache memory 26a, the data cache memory control unit 26b, the DLB (data load buffer) buffer unit 61a, the DLB control unit 61b, and the instruction/arithmetic operation unit 27 in the data cache block 32 shown in FIG. 5.

Figure 23:
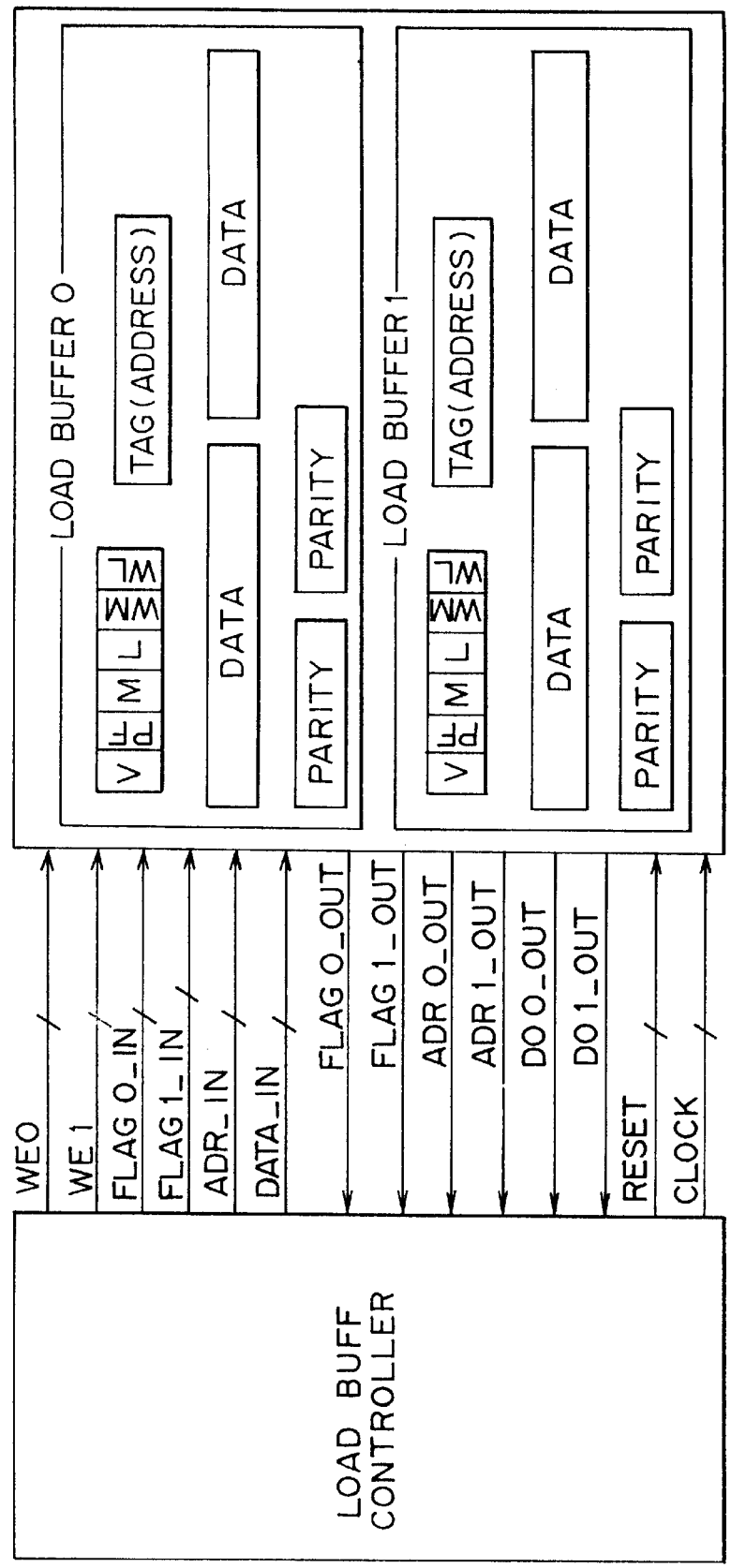
FIG. 23 is the block diagram showing the configuration of the data load buffer.

As explained by referring to FIG. 23, the DLB (buffer unit) 61a also comprises two load buffers each having the same configuration and storing 1-line data (operand) like the LBP 45 and the LBS 46 shown in FIG. 6A. As shown in FIG. 8, the two load buffers are named load buffers 0 and 1 respectively, but are not identified as being a primary or a secondary buffer.

The operation of the data load buffer shown in FIG. 22A is the same as that of the instruction load buffer shown in FIG. 6A. That is, if a cache miss has arisen as a result of a data request issued from the instruction/arithmetic processing unit 27, then a request address is notified by the data cache memory control unit 26b to the main storage 9, and a move-in process is started.

The 2-line data transmitted from the main storage 9 are stored in the DLB buffer unit 61a. If the data request is not issued by a software prefetch instruction, the data requested by the instruction/arithmetic operation processing unit 27 are immediately written to the data cache memory 26a, and directly outputted to the instruction/arithmetic operation unit. Writing other data and the data in response to a software prefetch instruction into the data cache memory 26a is described in detail by referring to FIG. 25.

Figure 22B:
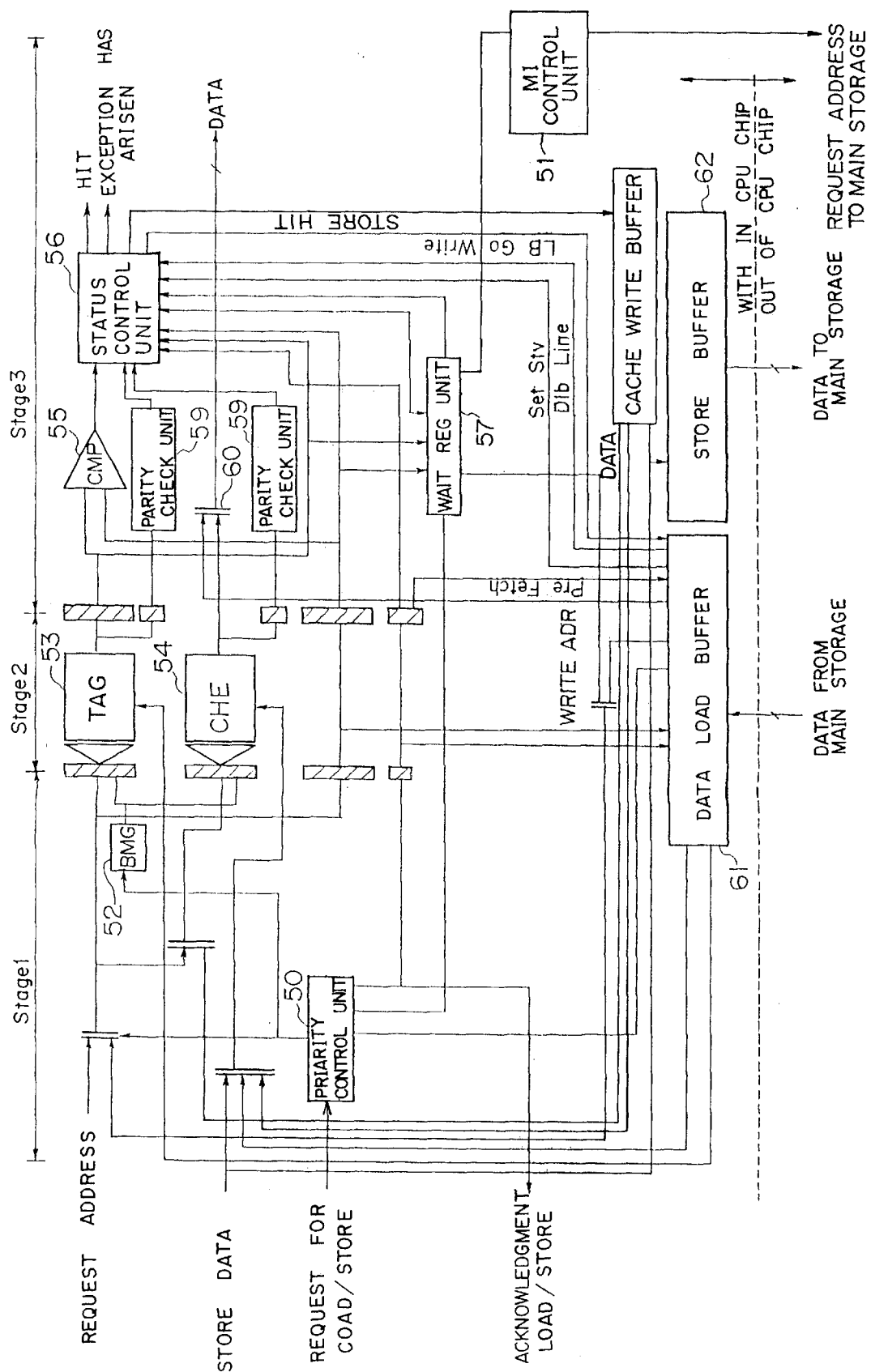
FIG. 22B is the block diagram showing the detailed configuration of the data cache block.

FIG. 22B shows the detailed configuration of the data cache block 32 shown in FIG. 5. In FIG. 22B, the data cache block 32 is similar in configuration to the instruction cache block 31 shown in FIG. 6B, but is different in that:

① data to be processed are operands used in an arithmetic operation;

② a request to fetch data issued to the priority control unit is a load/store request, and a response to the request to fetch data is an acknowledgement of load/store request;

③ a store buffer 62 is added as a buffer used when data are read from the CPU to the main storage according to a store instruction; and ④ an effective cache write buffer is additionally provided as a unit for storing store data in a cache memory. The cache write buffer stores data according to a store-hit signal from the status control unit 56. Then, the data are stored in the cache memory when a request issued to the priority control unit 50 has been accepted.

A software prefetch instruction can be implemented as an independent instruction as shown in FIG. 20, for example.

As an easier method, a write-disable register can be designated as a store register when a normal load instruction is issued. In the first method, since a normal load instruction is quite different from a software prefetch instruction, the instruction/arithmetic operation unit can easily recognize the difference, and notifies the data cache memory of the software prefetch instruction together with a load request signal.

In the second method, only the instruction/arithmetic operation unit can detect whether or not the load instruction actually functions as a software prefetch instruction because the data cache memory normally provides requested data for the instruction/arithmetic operation unit, and does not have to know in which register the data should be finally stored. That is, since the store register is a write-disable register, the instruction/arithmetic operation unit recognizes that the instruction is a software prefetch instruction.

Accordingly, determination as to whether or not a software prefetch instruction has been issued should be provided for the load buffer through a dedicated signal. In this case, as described later by referring to FIG. 24, a software prefetch instruction notification signal is provided for the load buffer as a prefetch signal through the priority control unit.

The difference in configuration between the data cache block shown in FIG. 22B and the instruction cache block shown in FIG. 6B is explained below in further detail. First, the wait register unit is the same as the MI control unit in the configuration shown in FIG. 6B. Concerning the status control unit, the data cache block writes data to the main storage, unlike the instruction cache block, that is, performs a storing operation. Therefore, these blocks are different from each other in external operations, but similar in operation of a load buffer.

Concerning the priority control unit, these blocks are different from each other in configuration of the priority encoder due to the increase in the number of requests in the data cache block. Otherwise, they are similar to each other. Furthermore, these blocks are similar in output timing of a write acknowledge signal in response to a write-to-cache request. When a software prefetch instruction is issued, the priority control unit outputs a write acknowledge signal when a request to store in the cache memory the data stored in the load buffer is received in the priority control unit.

FIG. 23 is the block diagram showing the configuration of the data load buffer according to the second embodiment. In FIG. 23, the data load buffer is similar in configuration to the load buffer for use in loading instruction data according to the first embodiment shown in FIG. 8. However, it is different in usage. That is, it requires no distinction between a load buffer primary and a load buffer secondary as shown in FIG. 8. Each of the load buffers is named LB0 and LB1, and comprises a 1-line and n-byte flipflop. An important difference from the one shown in FIG. 8 is that a PF flag is set to indicate that the data of an entry, if active, refers to software prefetched data, while in FIG. 8 the PS flag is used to indicate whether it is a primary load buffer or a secondary load buffer. The meanings of all the other flags are the same as those shown in FIG. 8.

Figure 24:
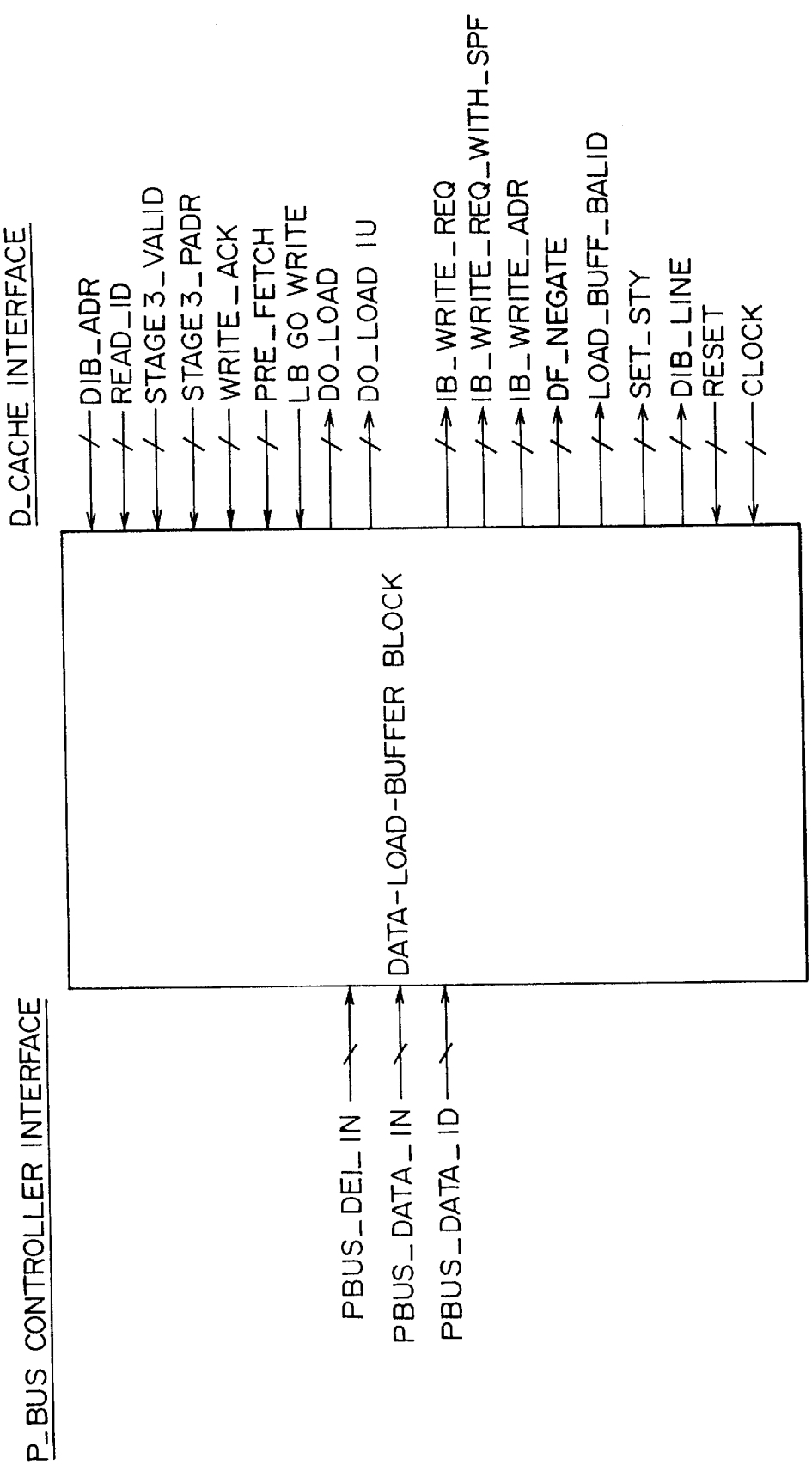
FIG. 24 shows the interface of the data load buffer.

FIG. 24 shows an example of an interface between the data load buffer and each portion of the data cache block shown in FIG. 22B, and an interface between a main storage and PBUS. The meaning of each signal shown in FIG. 24 is similar to the meaning of that shown in FIG. 9. However, the meanings of all signals are listed below to clearly define the differences.

DLB_ADR: an address of data associated with a request for a fetch which has caused a move-in.

READ_ID: a selection signal within 2 lines and 2n bytes when data are fetched.

STAGE3_VALID: STAGE 3 in the cache block is valid.

STAGE3_PADR: a physical address of a request to fetch data; can be the same as DLB ADR.

WRITE_ACK: an acknowledgement from a cache memory in response to a request for a write to the cache memory PRE_FETCH: data associated with a move-in are software prefetched.

DO_LOAD: written data in a cache RAM

DO_LOAD-IU: written data in a register

LB WRITE_ADR: an address of data written to a cache memory

LB WRITE_REQ: a request for a write in a cache memory

LB WRITE_REQ_WITH_SPF: a request to write to a cache memory during a software prefetch DF_NEGATE: data are stored in an LB and the LB is in the state of accepting a request for a fetch LOAD_BUFF_VALID: data in a load buffer are valid.

SET_STV: a hit signal in a move-in process

DLB_LINE: a hit determination signal when a request to fetch data is issued to a load buffer (a determination result by a comparator)

PBUS_DEI_IN: arrival of data from PBUS at the next cycle.

PBUS_DATA_IN: data from PBUS

PBUS_DATA_ID: position of data from PBUS within 2 lines and 2n bytes

RESET: a reset signal

CLOCK: a clock signal

Figure 25:
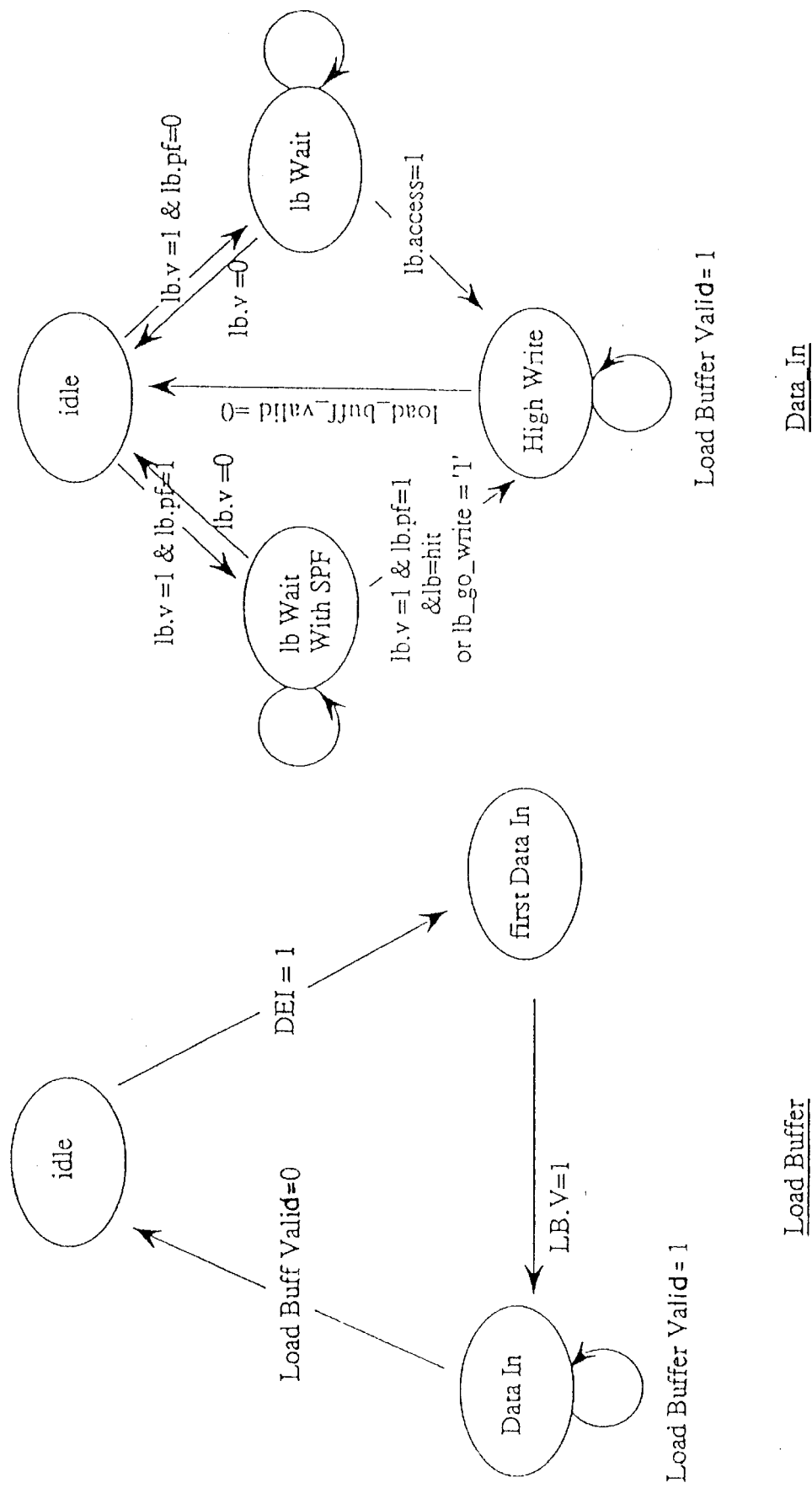
FIG. 25 shows the state machine of the data load buffer.

FIG. 25 shows the state machine of the data load buffer. As in the case shown in FIG. 10, the state machine is shown on the left, and the state machine of a data-in, one of the states, is shown on the right. The entire state machine on the left indicates the same state transition as the one shown in FIG. 10 except that the flag of LBP V shown in FIG. 10 is a V flag LB.V of the load buffer.

As in the case shown in FIG. 10, the Data In state is entered when the flag LB V turns active. If the present process is not a software prefetch (LB Pre-Fetch=0), then the state turns to the LB Wait as a hardware prefetch. The state corresponds to the LBP Valid state shown in FIG. 10, and the similar process is performed. For example, in this state, the first data to be stored in the load buffer correspond to the data obtained at a request to fetch data. Therefore, when the first data are stored in the LB Wait state, the data load buffer outputs the data to DO_LOAD_IU so as to store them in the general purpose register shown in FIG. 5. At this time, the data load buffer outputs a SFT_STV signal indicating a cache hit to the status control unit 56. The data cache memory accepts a new request to fetch data as long as it is not interlocked due to one of various causes.

Figure 3A:
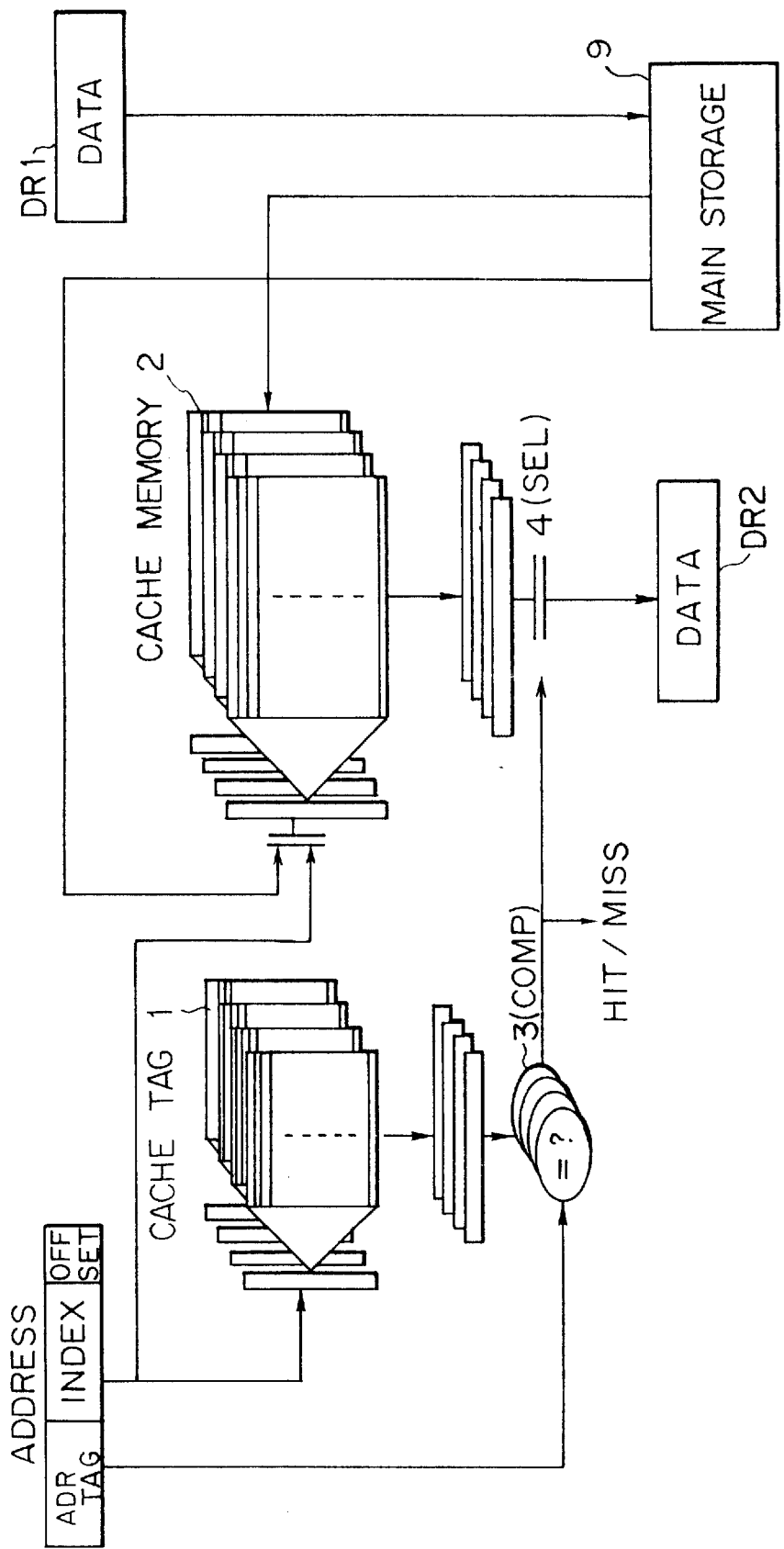
FIG. 3A is the block diagram showing the configuration of the cache memory.
Figure 3B:
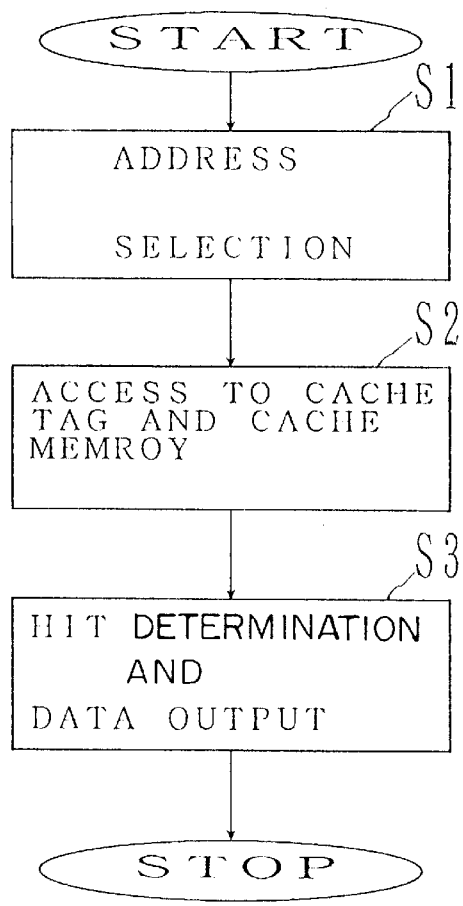
FIGS. 3B and 3C respectively show flowcharts of the operation of the cache tag and memory, when the load command and store command are executed.
Figure 3C:
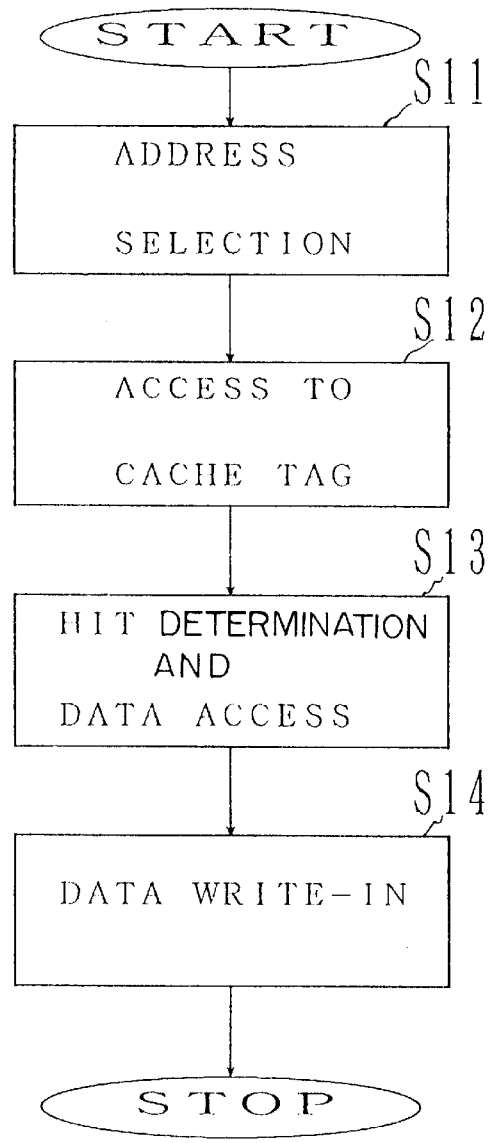
Figure 3D:
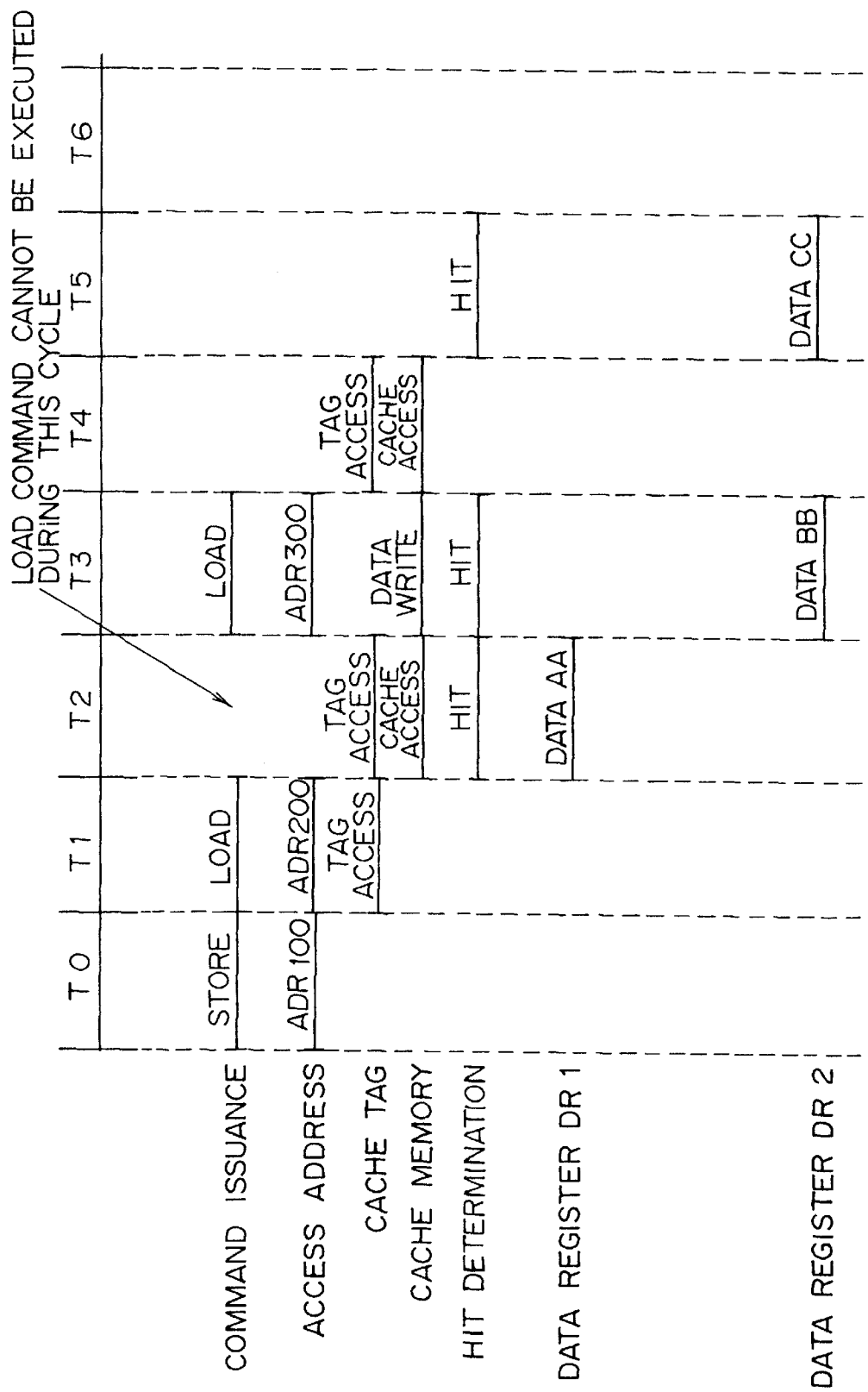
FIG. 3D shows a timing chart of the operation of the cache tag and memory when the store command and the succeeding load command are executed.

If a line stored in the load buffer is accessed according to a request to fetch data, then the data load buffer determines the access by checking only lower order bits of an address. When the determination indicates a hit, then LB Access is turned to an active state. When an lb.access signal turns active, the load buffer turns from the lb Wait state in the Data In state to the High Write state. In the High Write state, the data stored in the LB and not yet stored in the cache memory are stored in the cache memory while new move-in data (prefetched data) are stored. In the present state, the data cache block accepts a request to fetch data. In response to the request to fetch data accepted during the load buffer Valid, the load buffer is retrieved. As the result of the above-described access determination, LB Access turns active, which indicates that the index portion of the address (explained above about the access to a cache memory by referring to FIG. 3A) matches.

When the Data In state is entered by transmitting softwareprefetched data from the main storage, the state machine in the Data In state is turned from the idle state to the LB Wait With SPF state. In this state, the data transmitted from the main storage are stored in the load buffer. However, a write to a cache memory is performed as long as the cache memory is not performing any operation at all. According to the present system, a write request signal from the load buffer to the cache memory (LB_WRITE_REQ_WITH_SPF) turns active. However, the signal is assigned the lowest priority in the operations performed by the data cache memory. Accordingly, if the request comes in conflict with another request such as one to fetch data, etc., then an acknowledge signal (WRITE_ACK) to the load buffer is not turned to an active state. At a request to fetch data in the LB Wait With SPF state, the contents of the load buffer as well as the cache memory are retrieved.

In the retrieval, if a hit is detected in the data in the load buffer, the state machine is turned to the High Write state. In this state, the data in the load buffer are stored in the cache memory according to a write request (LB_WRITE_REQ) assigned the priority higher than that assigned to LB_WRITE_REQ_WITH_SPF. The change to this state can also be effectuated if the LB Go Write signal has turned active. The signal is outputted from the status control unit 56 if a cache miss has been detected as a result of the address comparison by the status control unit 56. The signal directs the load buffer to output the data stored in the load buffer.

Figure 28A:
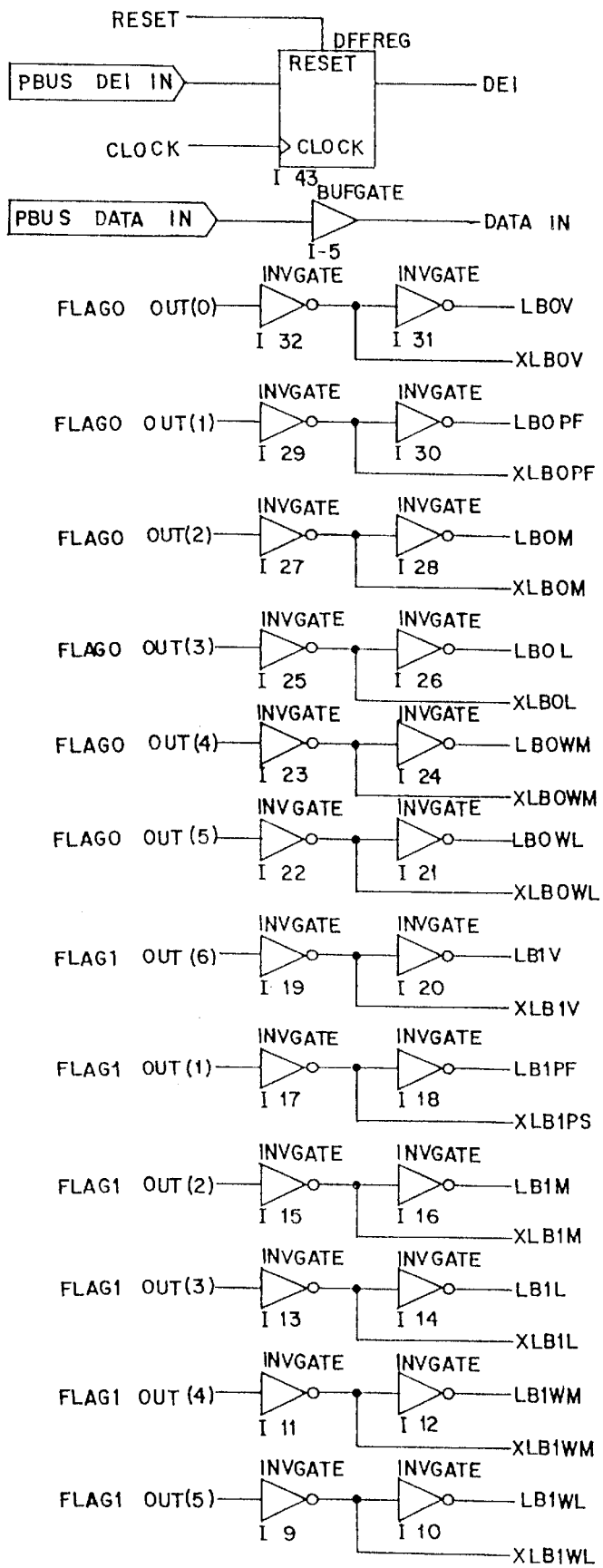
FIG. 28A shows an example (1) of a control circuit of a data load buffer.
Figure 28B:
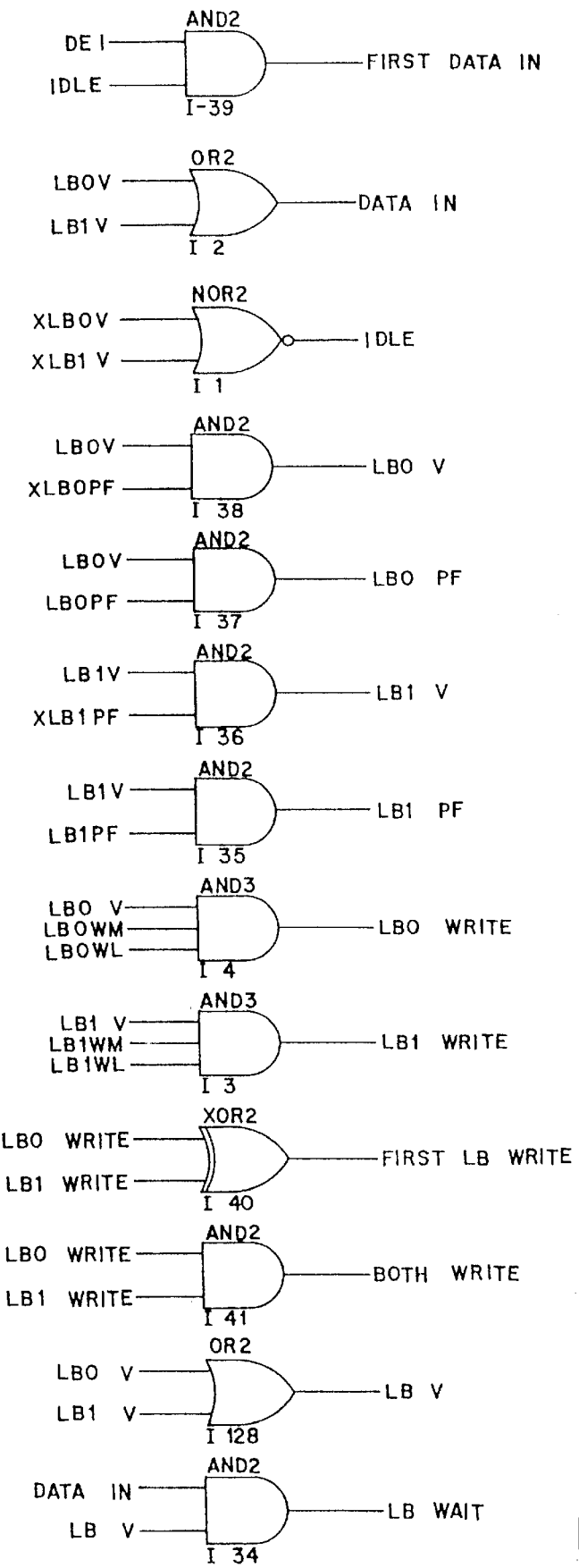
FIG. 28B shows an example (2) of a control circuit of a data load buffer.
Figure 28H:
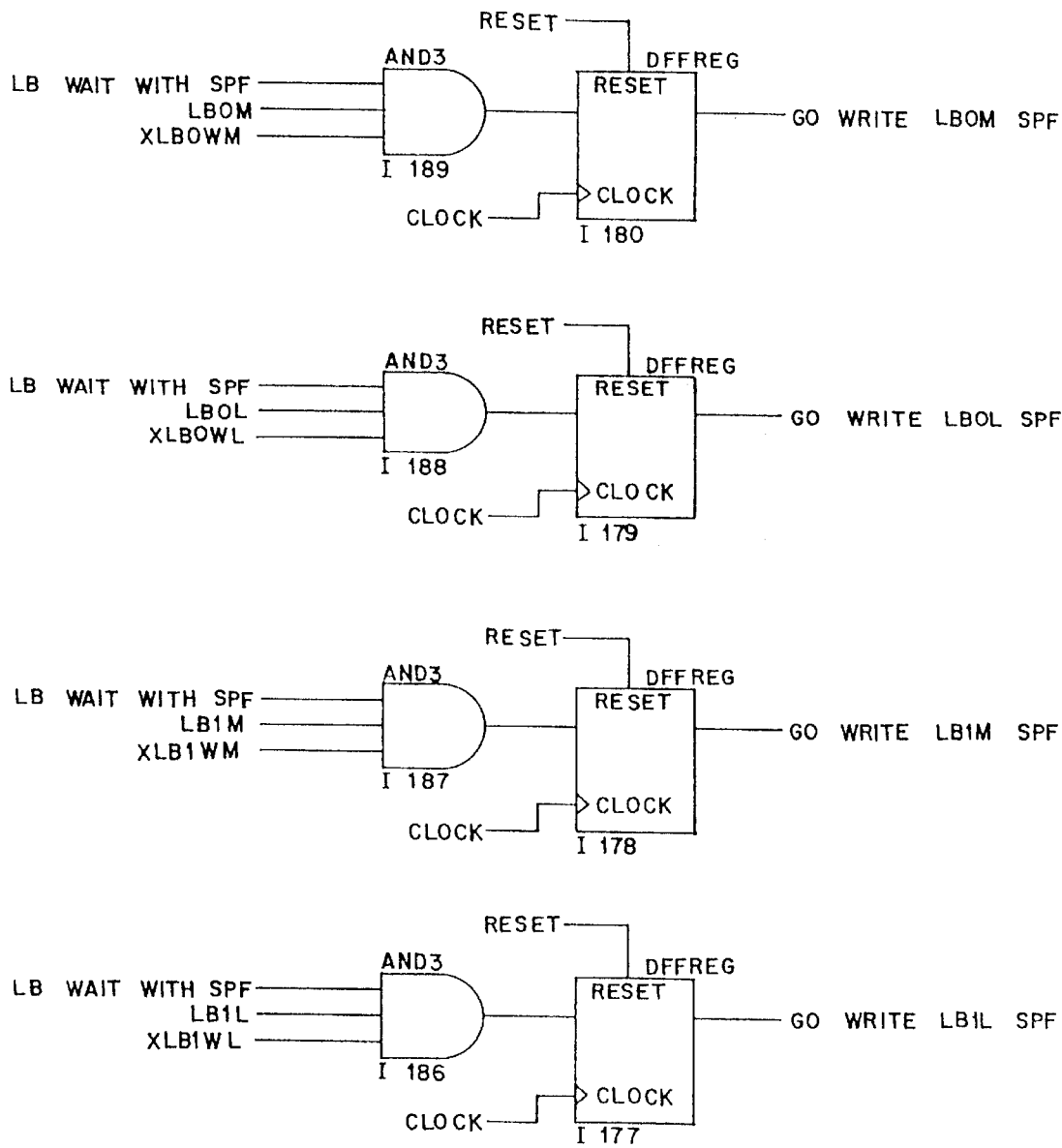
FIG. 28H shows an example (8) of a control circuit of a data load buffer.
Figure 28I:
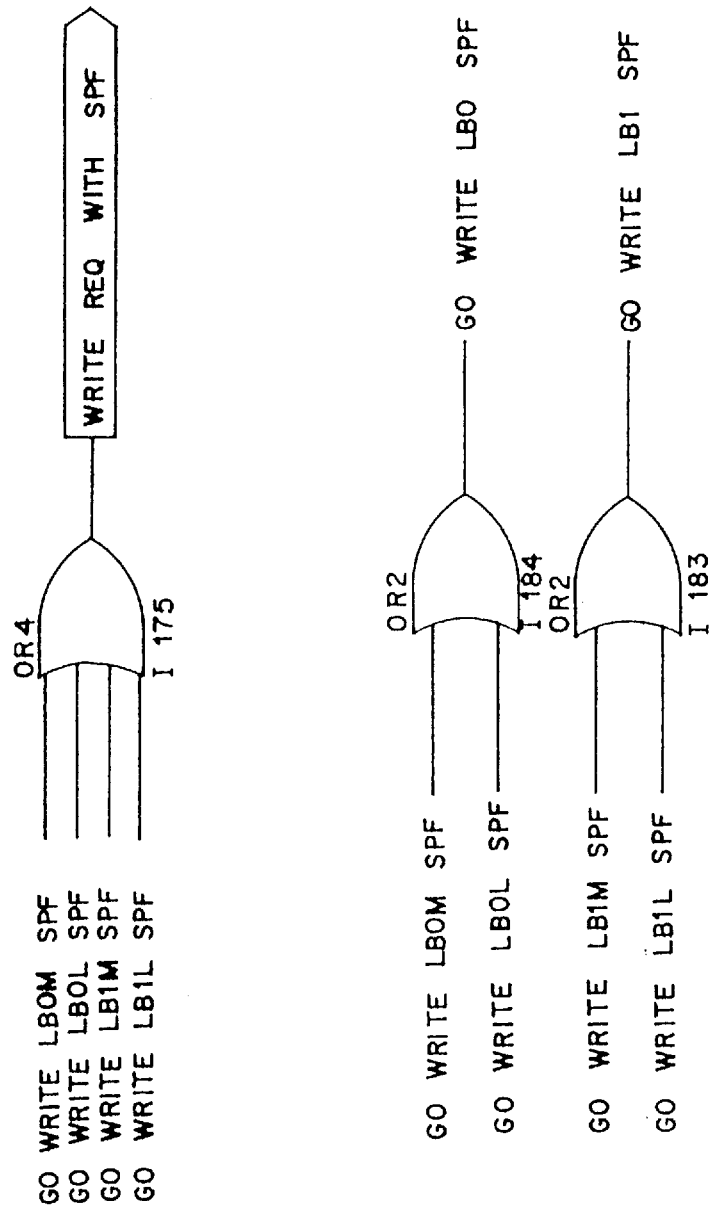
FIG. 28I shows an example (9) of a control circuit of a data load buffer.
Figure 28J:
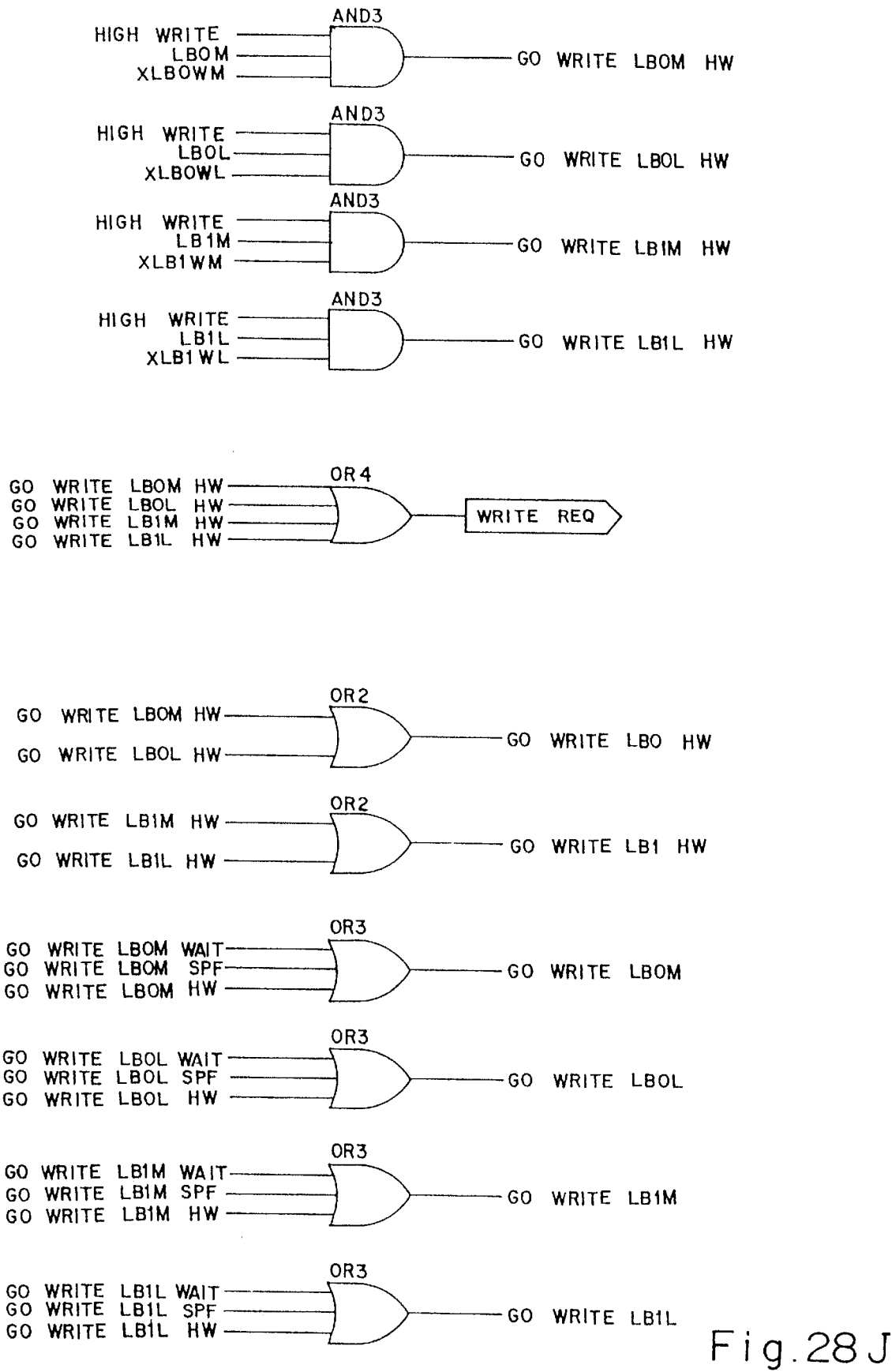
FIG. 28J shows an example (10) of a control circuit of a data load buffer.
Figure 28L:
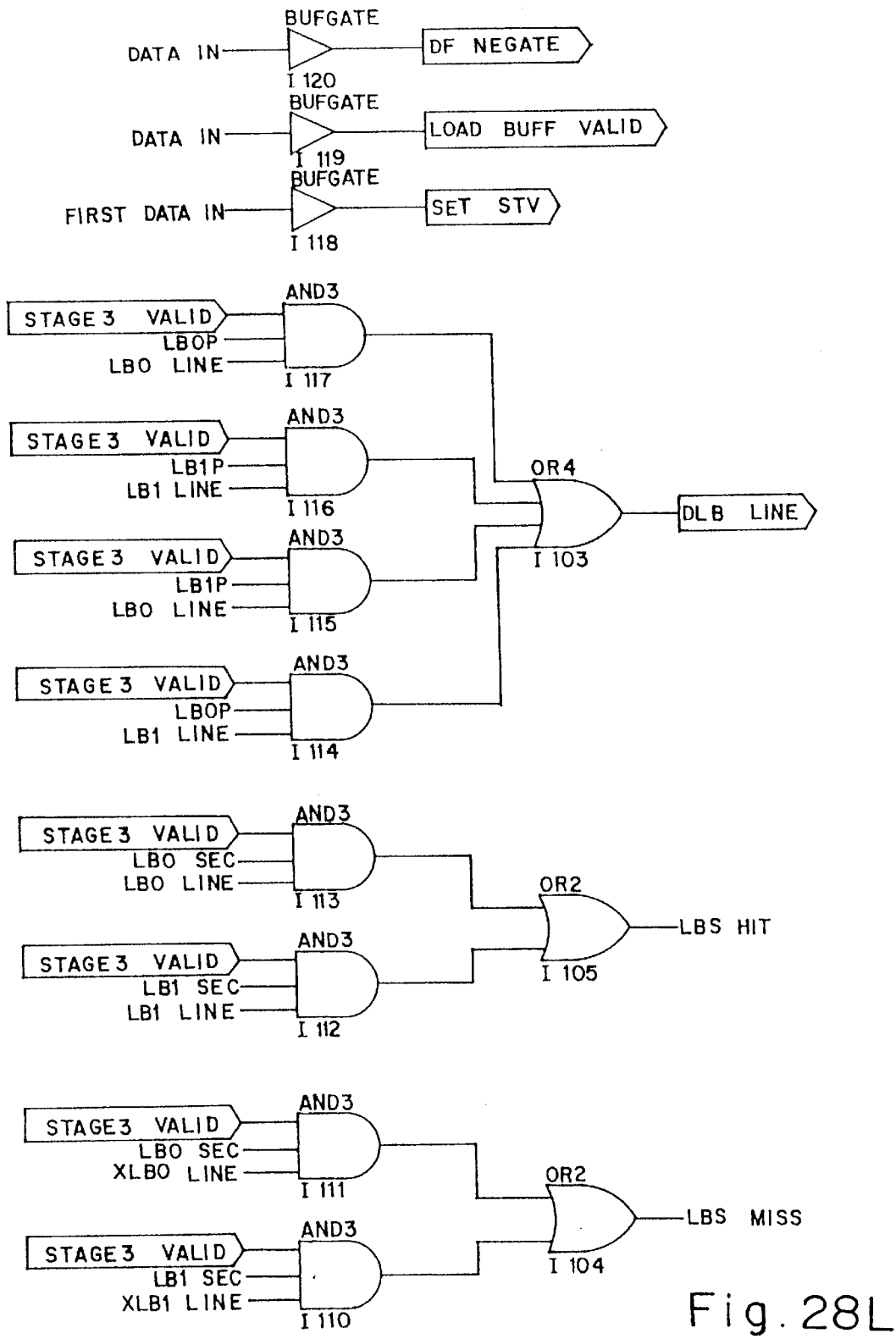
FIG. 28L shows an example (12) of a control circuit of a data load buffer.

The configuration of the load buffer controller of the data load buffer is almost the same as that of the controller of the instruction load buffer. As described by referring to FIG. 25, since the state machine of the data load buffer is different from the state machine of the instruction load buffer, the circuit of the control unit is naturally different from the circuit of the control unit of the instruction load buffer. FIGS. 28A through 28N show the circuit.

In the operation of the controller of the data load buffer, a PF is set the moment the state is turned from "First Data In" to "Data In". A notification as to whether or not a software prefetch is performed is provided through a prefetch signal via the data cache interface as shown in FIG. 24, and the signal value is set as the value of a PF flag. In the data in state, two kinds of operations are performed according to the value of the PF flag as shown on the right of FIG. 25.

If a software prefetch is not performed, the operation of the data load buffer, for example, shown in FIG. 14 is performed in the statistical way as that of the instruction buffer. That is, in the LB wait state on the right of FIG. 25, the data in the line containing requested data transmitted from the main storage are stored in the data cache memory, and the requested data are simultaneously outputted to the "DO_LOAD_IU" shown in FIG. 24.

When the line is stored in the data cache memory, that is, when WM=WL=1, and if the data in the line containing the requested data are accessed, and the data have passed an access determination made by comparing only lower order addresses of the data, then the state is changed to "High Write" with LB access=1. If no access is detected at this time, an LBV flag is set to 0, and the state is changed to "idle" without storing the data in the prefetched line in the data cache memory.

In the high write state, the data in a prefetched line are stored in the data cache memory. If the data to be transmitted from the main storage have not been completely stored in the load buffer, then the data should be stored entirely in the load buffer while the data stored in the load buffer are stored in the data cache memory.

Then, when all data have been stored in the data cache memory, the state is changed to "idle".

If a software prefetch is not performed, the operation shown in FIG. 12 is performed on the instruction load buffer. In FIG. 12, as a result of an access determination made to the instruction data in the load buffer secondary, the instruction data are stored in the instruction cache memory when the data in the load buffer secondary have passed the determination. However, as for the data load buffer, if data in the line succeeding the line containing the requested data, that is, the data in the prefetched line, have passed an access determination, then the data, for example, the data in the load buffer 1 as shown in FIG. 23, are stored in the data cache memory in a high write state. At this time, the meaning of LB access=1", that is, the condition of a change from an LB wait state shown in FIG. 25 to a high write state is different from the above-described case (a determination made according to data in the load buffer 0).

Furthermore, the operation performed on the instruction load buffer as shown in FIG. 13 is also performed on the data load buffer. That is, in a hit determination associated with the data in a line containing the data requested to be transmitted from the instruction/arithmetic operation unit, the state is changed to "High Write" if the data have passed a hit/miss determination made by comparing all bits of addresses, and the data in the prefetched line are stored in the data cache memory. In this case, as shown in FIG. 25, the condition of a change from an LB wait state is LB hit=1". In a high write state, a result of a hit/miss determination is notified from the data load buffer 61 to the status control unit 56 through "D1b Line" shown in FIG. 22B, thus outputting data.

When a software prefetch instruction is issued, the priority control unit 50 shown in FIG. 22B requests to write software prefetched data in the data cache memory as a request having priority lower than a write request accompanied with a normal load/store request. Thus, a data fetch request process for a normal load/store request is performed faster, and the software prefetched data are stored in the data cache memory when no data fetch request is issued.

The priority of the priority control unit is determined as follows. For example, a write request to a cache memory in response to an instruction other than a software prefetch instruction is assigned the first priority; a re-execution request is assigned the second priority; a data fetch request is assigned the third priority; and a write-to-cache request accompanied with a software prefetch instruction is assigned the fourth priority. The data fetch request having the third priority also includes a data fetch request for a software prefetch instruction. The write-to-cache request accompanied with the instruction can be processed based on the fourth priority, that is, the lowest order priority.

In FIG. 25, if load buffer valid=1 for the software prefetch instruction, then the state is changed to "LB" (load buffer) wait with SPF. In this state, the load buffer outputs a signal of a write-to-cache request assigned the fourth priority to the priority control unit while storing the data transmitted from the main storage in the load buffer, and stores the data in the cache memory when an acknowledge signal is received in response to the request. When all data have been written, the state is changed to "idle".

A load buffer wait with SPF state is changed to a high write state on the condition of "LB=hit" or "LB go write=1". In a load buffer wait with SPF state, a data fetch request from the instruction/arithmetic operation unit is processed. If a cache miss is detected, a hit/miss determination is made on all bits of addresses of the data stored in the load buffer. If the data have passed the determination, the condition of "LB=hit" exists, and the state is changed to "High Write". If a miss is detected as a result of the hit/miss determination, then "lb_go_write=1" exists, and the state is changed to "High Write".

In a high write state, the data transmitted by the main storage are stored in the load buffer, and as in the case with an instruction other than the above-described software prefetch instruction, valid data are stored in the cache memory. However, if the state is changed according to the condition of "LB=hit", a hit notification is provided for the status control unit as described above, and data are simultaneously outputted. When all data have been stored in the cache memory, the state is changed to "idle"

Figure 26:
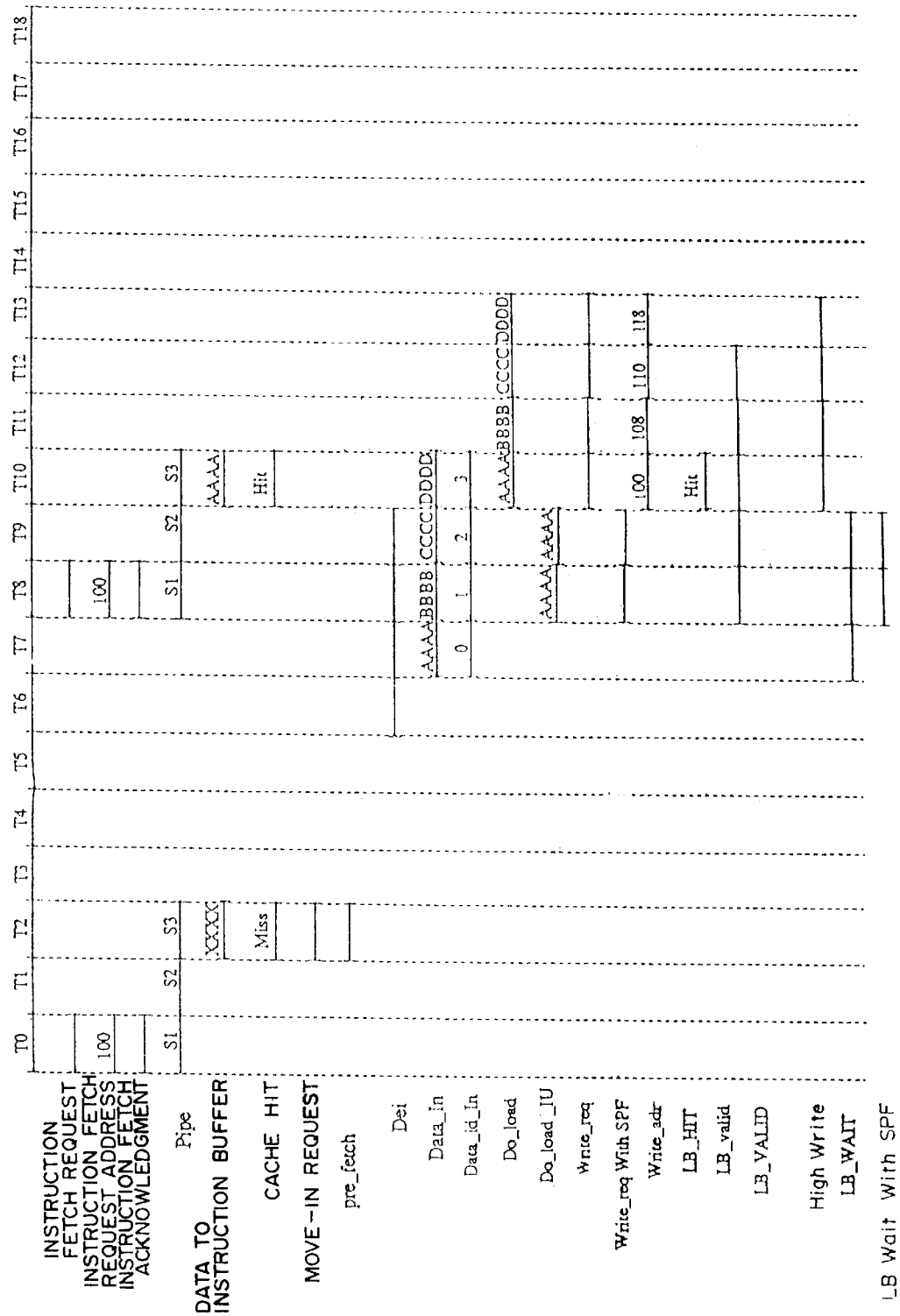
FIG. 26 is the timing chart indicating the process of an example of fetching data in the data load buffer.
Figure 27A:
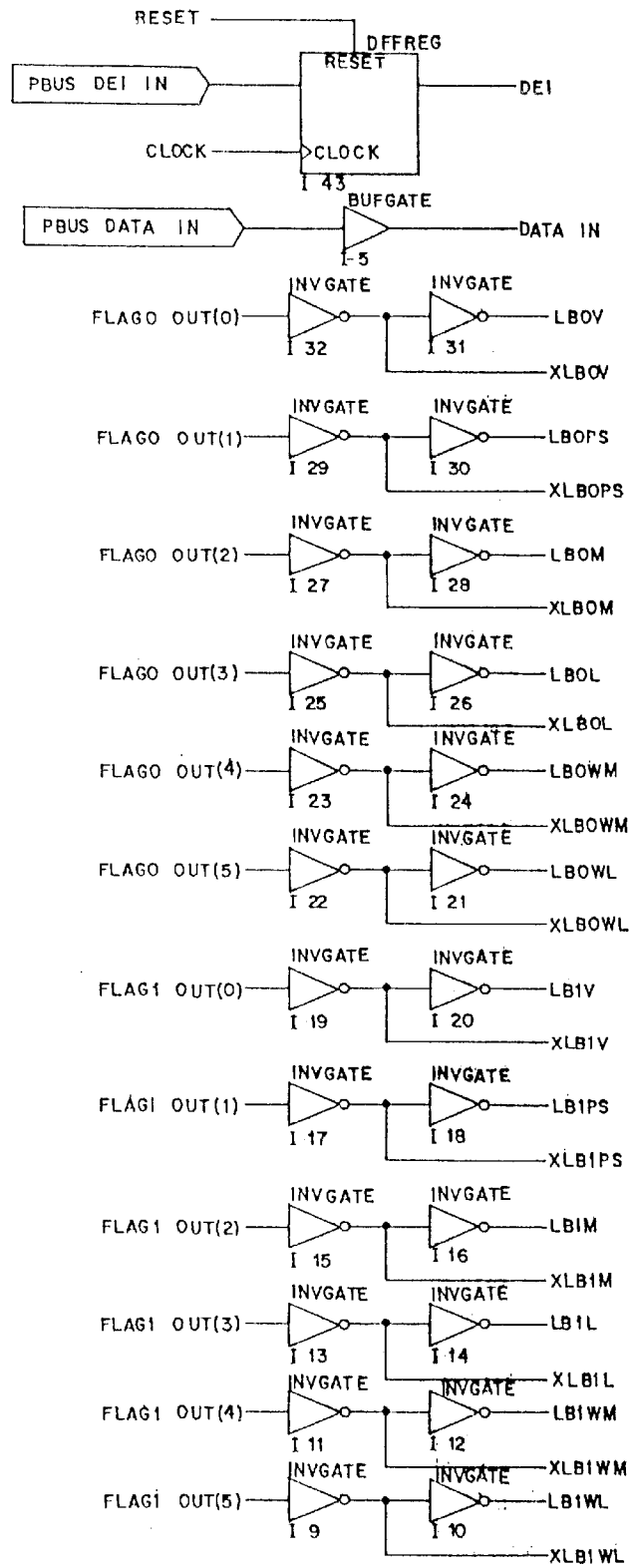
FIG. 27A shows an example (1) of a control circuit of an instruction load buffer.
Figure 27B:
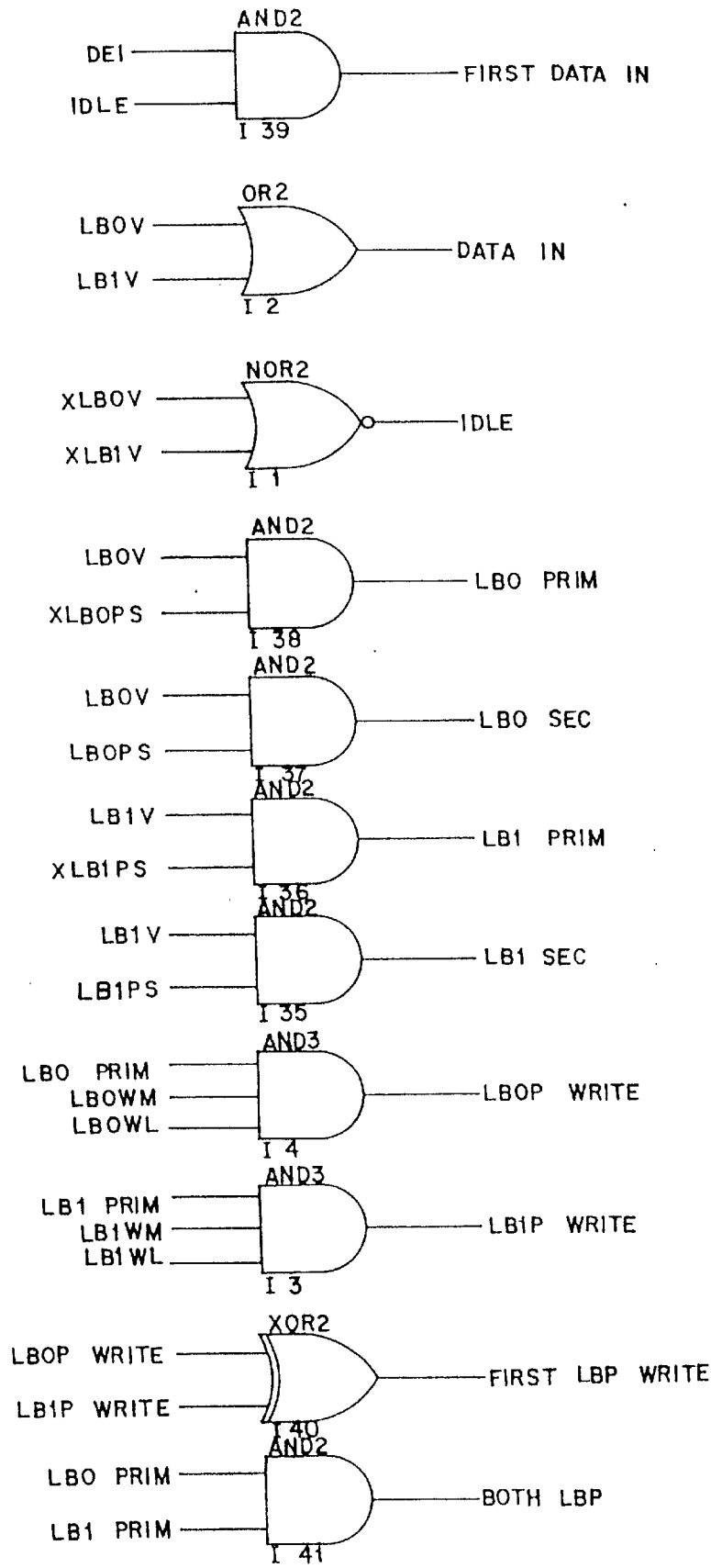
FIG. 27B shows an example (2) of a control circuit of an instruction load buffer.
Figure 27C:
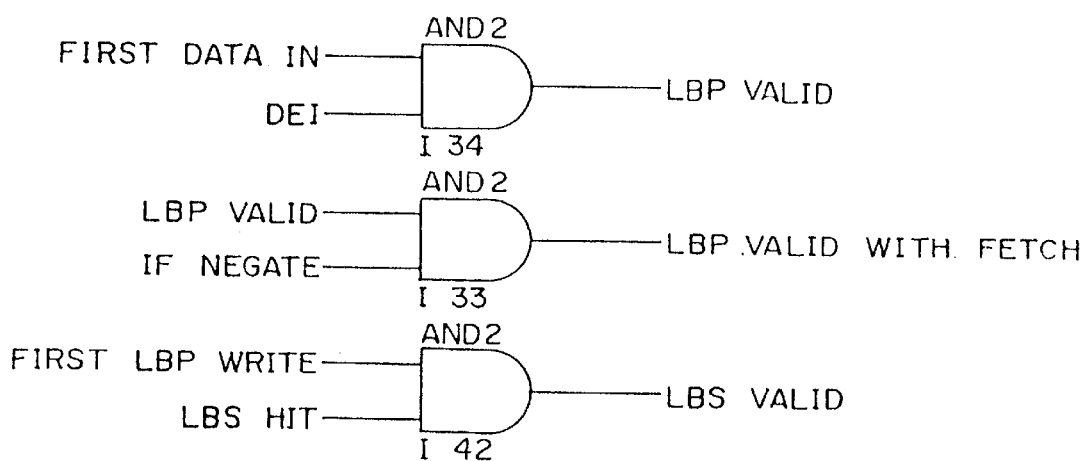
FIG. 27C shows an example (3) of a control circuit of an instruction load buffer.
Figure 27D:
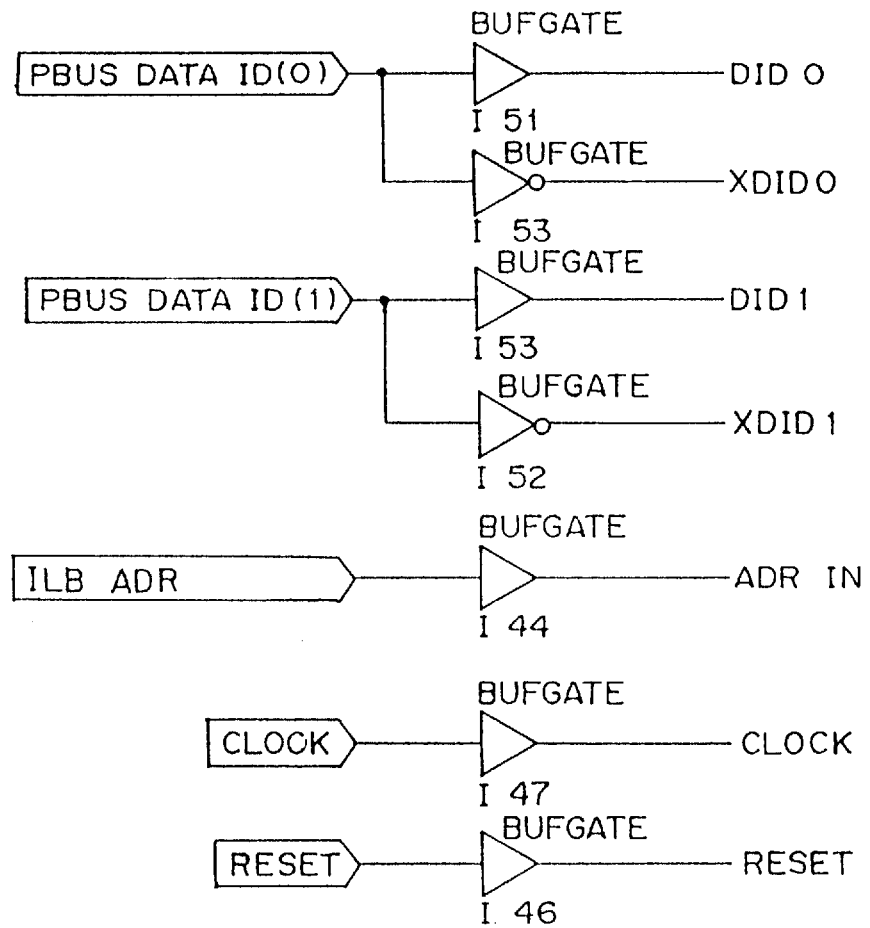
FIG. 27D shows an example (4) of a control circuit of an instruction load buffer.
Figure 27E:
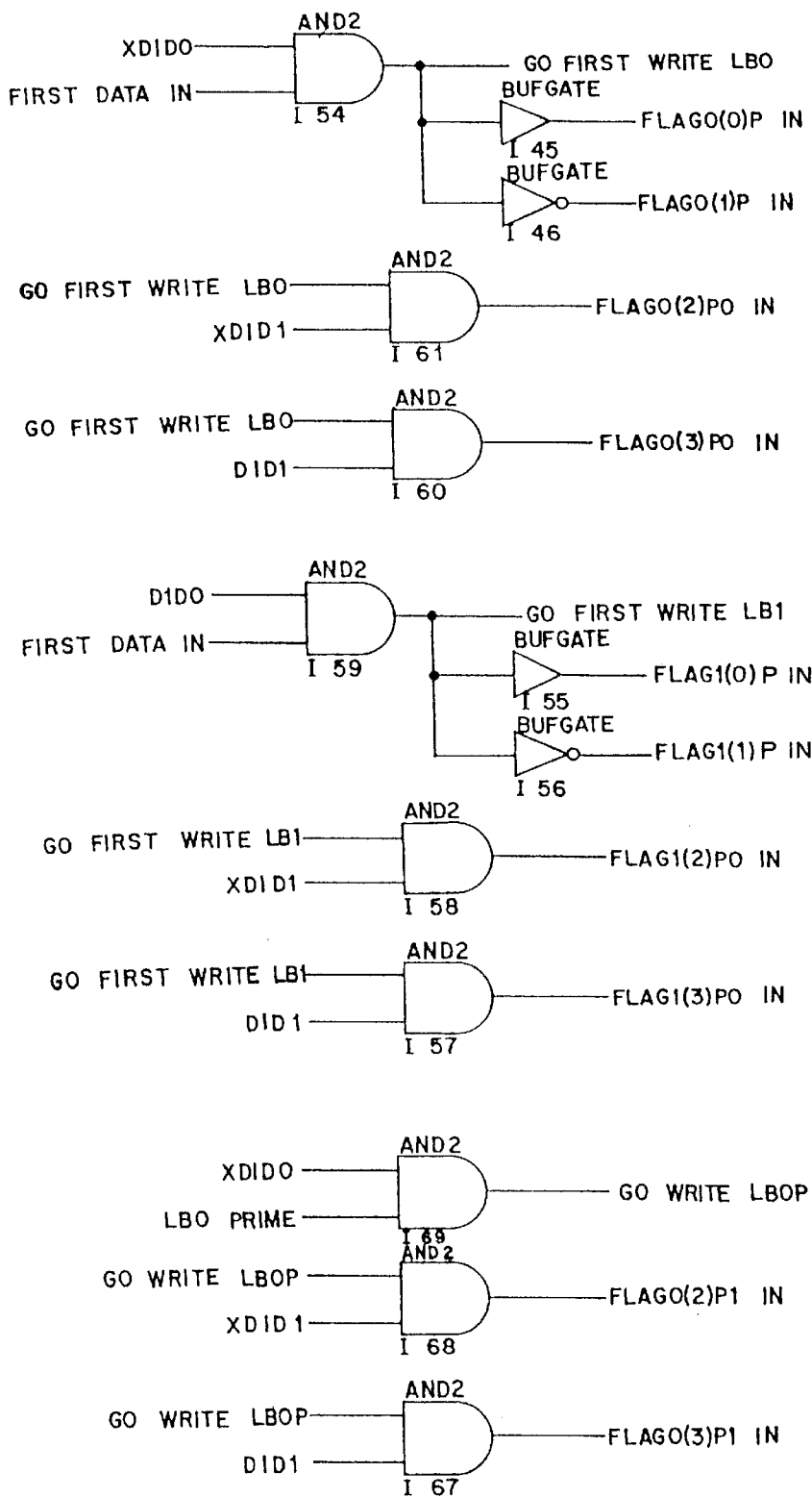
FIG. 27E shows an example (5) of a control circuit of an instruction load buffer.
Figure 27F:
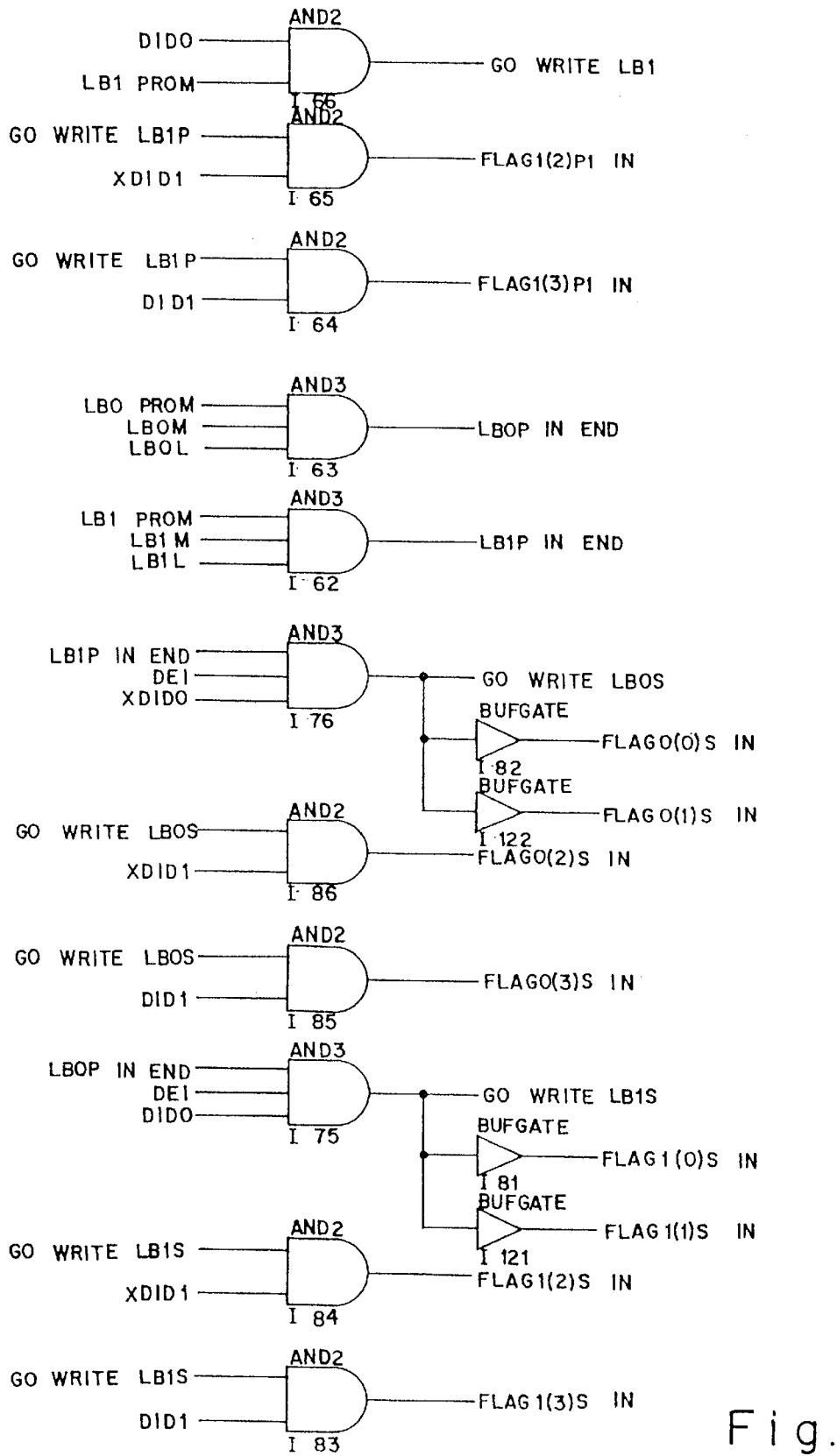
FIG. 27F shows an example (6) of a control circuit of an instruction load buffer.
Figure 27J:
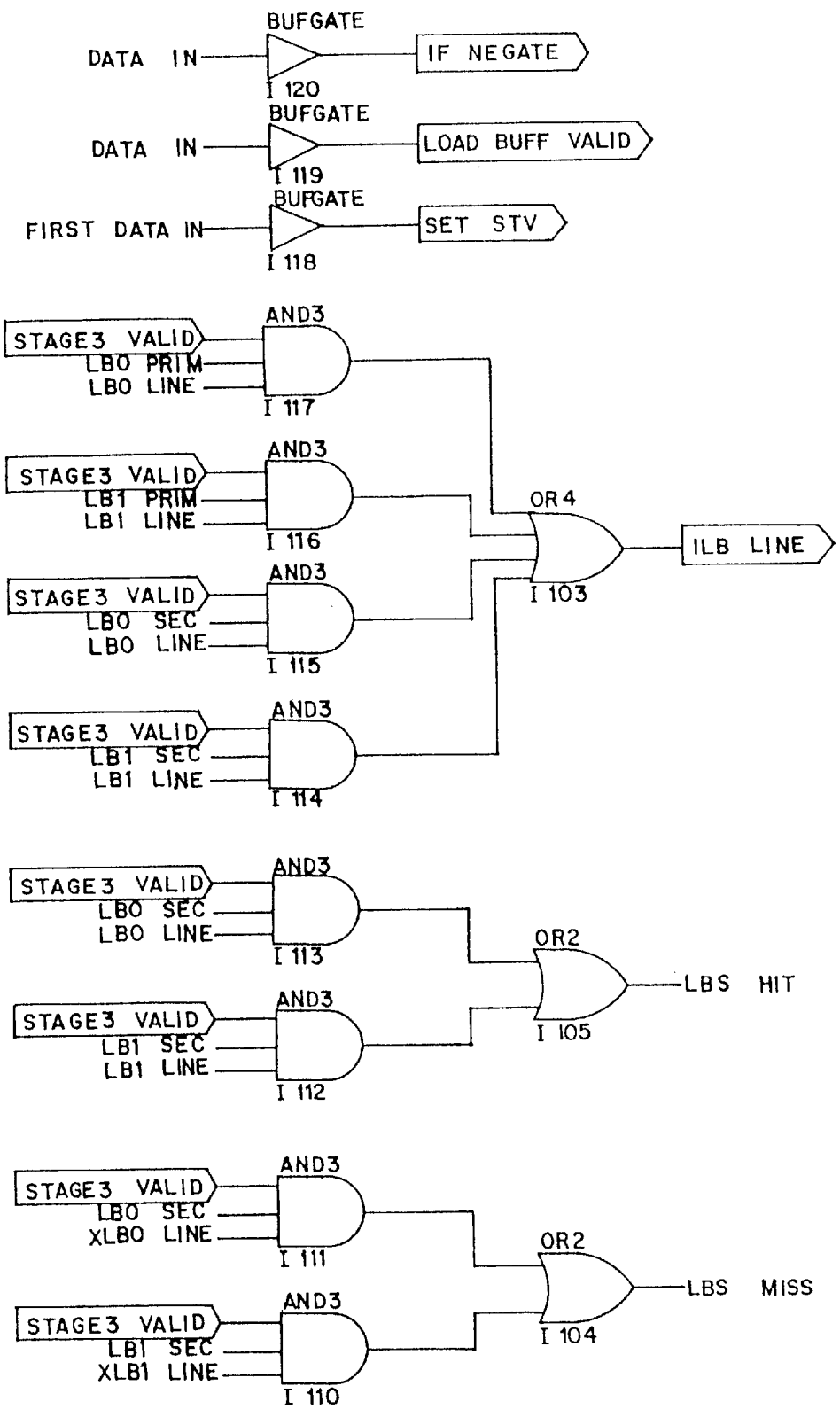
FIG. 27J shows an example (10) of a control circuit of an instruction load buffer.

FIG. 26 is the time chart indicating a software prefetch process. In FIG. 26, a Load/Store request is issued to a data cache memory at T0. The data cache memory notifies, with a Load/Store acknowledgement, the instruction/arithmetic operation unit 27 of the acceptance of a request for a fetch. Then, some data are stored in the register at T2. However, since the data are different from the requested data, a cache miss arises and a move-in request turns active, thereby starting a move-in operation. Then, DEI is notified at T6, and data are transmitted from the main storage during the 4 cycles from T7 to T10. The first data to be transmitted, that is, the data transmitted at T7, are transmitted to a register. However, the register has the value of 0 as an address value, and does not actually store register. The data cache memory can accept a request to fetch data at T7 or later. At T8, an actual Load/Store request is issued in response to a software prefetch performed at T0. The request for a fetch obtains a hit in the data in the load buffer at T10. If the hit is detected, the load buffer changes the LB Wait With SPF state to the High Write state. Then, the data in the load buffer are stored at a write request (WRITE REQ) assigned a high priority. Thus, a series of operations terminate.

FIGS. 27A through 27L show the embodiments of the control circuit for the load buffer according to the first embodiment, that is, the instruction load buffer. FIGS. 28A through 28N show the embodiments of the control circuit for the load buffer according to the second embodiment, that is, the data load buffer. The meanings of the gate signals used in these figures are listed as follows.

DFFREG: an FF with a reset
BUFGATE: a buffer (to output the same logic as an input)
INVGATE: an inverter
AND2: 2-input AND
AND3: 3-input AND
OR2: 2-input OR
OR3: 3-input Or
OR4: 4-input OR
OR5: 5-input OR
NOR2: 2-input NOR
XOR2: 2-input exclusive logical sum Data_ID_GEN: 2-bit ID output depending on an input
MUX2: 2-bit 2Δ1 selector
MUX: 144-bit 2Δ1 selector
MUX144: 144-bit 2Δ1 selector
COMPARATOR: 27-bit comparator
BUFF: a buffer unit in a load buffer A part of the operation of the control circuit for the instruction load buffer is explained below. In the LBP valid state or the LBP valid with fetch state shown in FIG. 10, when the data for the MSB in the contents stored in the LBP have been stored in the instruction cache, the WM flag of the LBP is set to 1. When the LSB of the LBP is stored in the instruction cache memory, the WL flag is set to 1. Then, since WM=WL=1 exists in the LBP, either LBOP write or LBlP write shown in FIG. 28 is set to 1, also setting first LBP write to 1.

As described above, an instruction load buffer comprises two load buffer units LBP and LBS being identified depending on the contents of the PS flag. If the LBP initially refers to load buffer 0 whereas the LBS refers to load buffer 1, then LBOP write indicates 1. To set each flag to 1, the WM/WL flag of the LBP should be outputted as 1 by the control unit 70 shown in FIG. 11, and a write-enable signal (WE) of 1should be outputted. These signals are provided to the buffer unit through the flag 0 in signal and WEO, and the flag in the buffer unit is rewritten.

Figure 36:
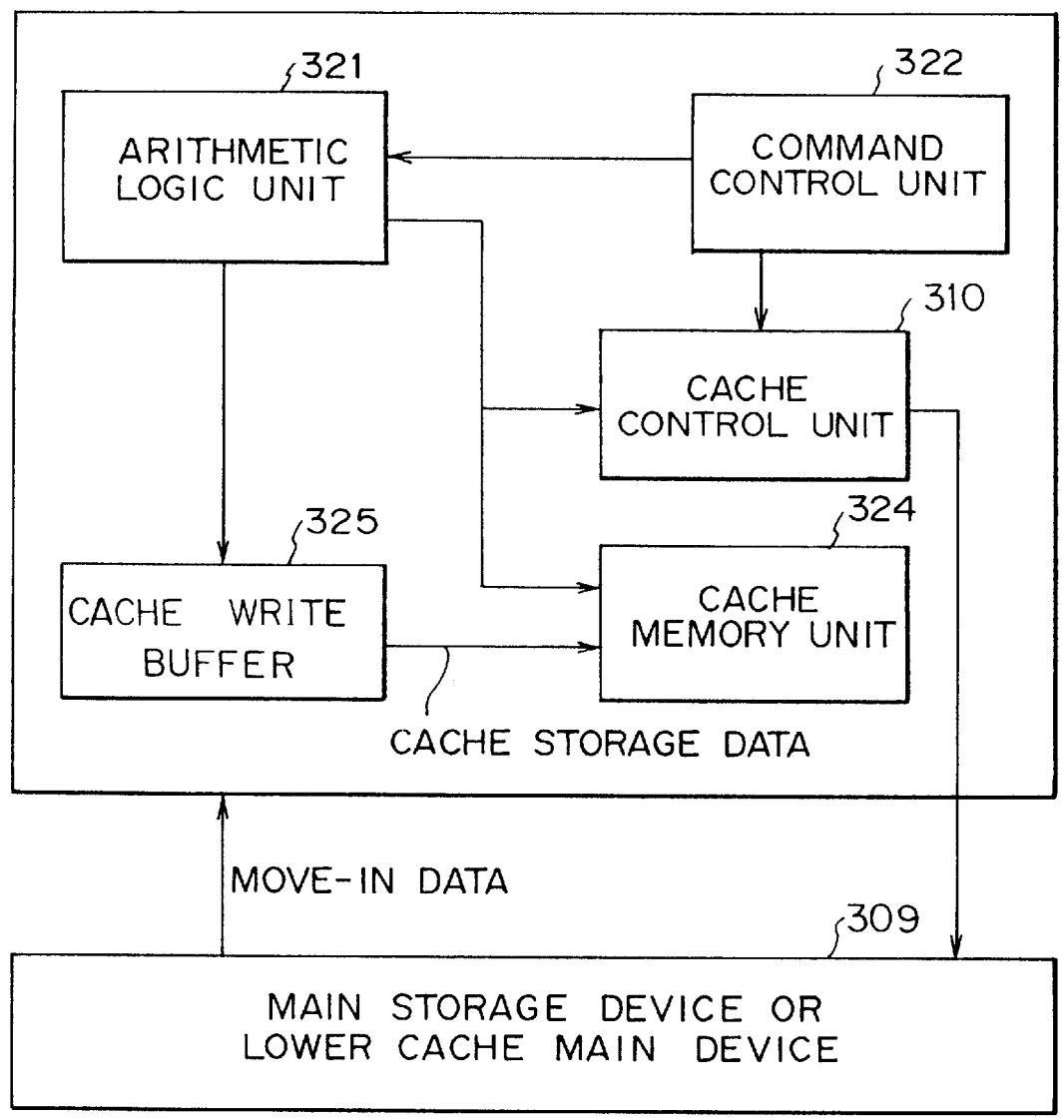
FIG. 36 is a block diagram showing a configuration of a data processing apparatus having a cache storage device pursuant to a fifth embodiment.

On the other hand, if a result of a hit/miss determination made on the data in the LBS results in a hit, then an LBS hit in FIG. 36 indicates 1. The hit/miss determination is made by the two comparators shown in FIG. 38. These two comparators are shown as four comparators in FIG. 11. However, the comparators finally generate an equal value. The outputs of these comparators generate the LBS hit signal shown in FIG. 36.

Figure 29:
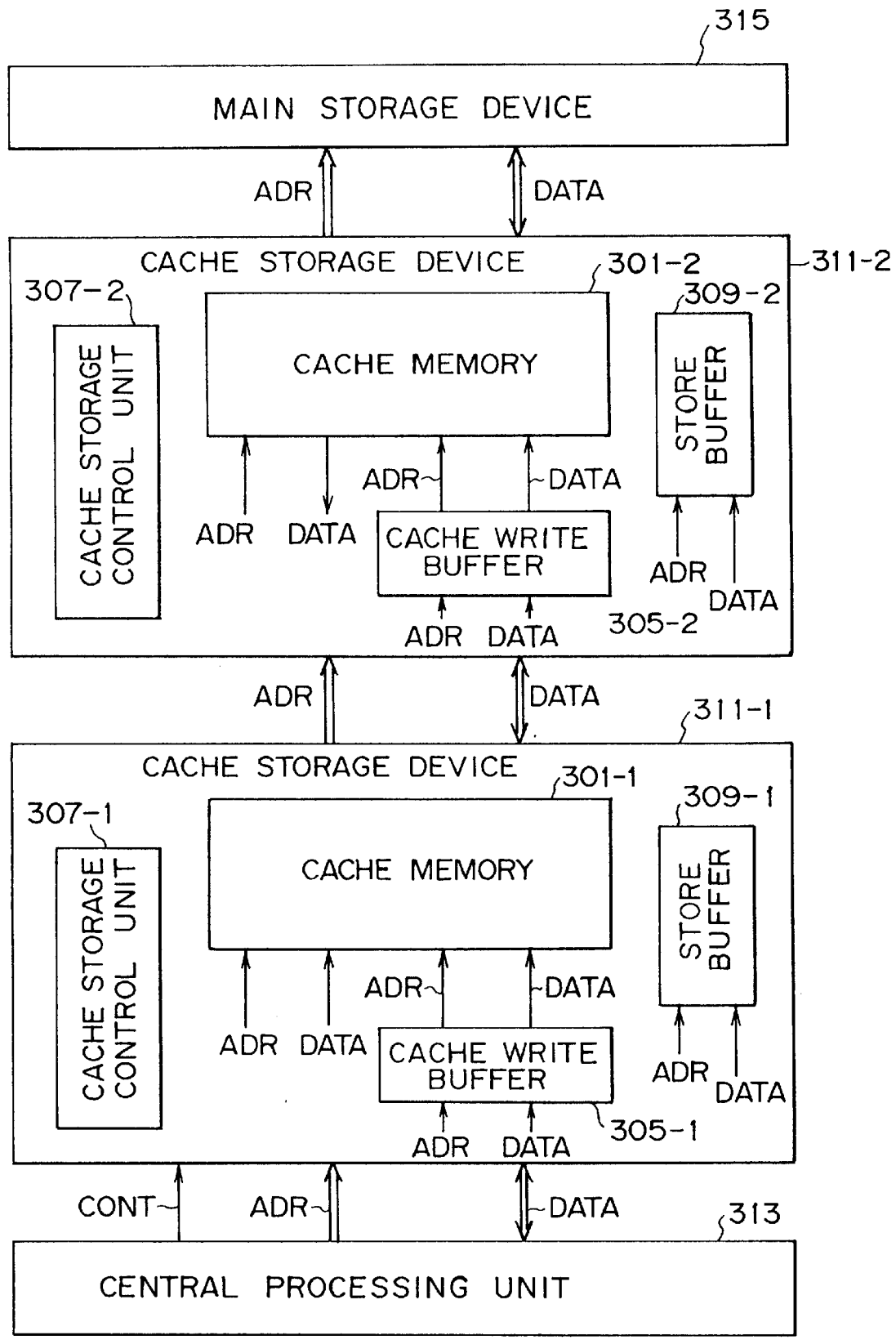
FIG. 29 shows a configuration of a data processing apparatus having two [2] hierarchies of cache storage devices pursuant to a third embodiment.

If first LBP write=1 and LBS hit=1, then the LBS valid shown in FIG. 29 indicates 1, and the state is changed to "LBS valid". The signal is provided for the circuit shown in Figure 37, and flag 1 (1) LBS value indicates 1. Next, flag (1) shown in FIG. 33 indicates 0 and WE1 indicates 1, and the PS flag in the load buffer 1 is rewritten from 1 to 0.

In the above-described embodiment, each of the instruction load buffer and the data load buffer comprises a two-stage load buffer, each stage having a 1-line capacity. However, the number of stages is not limited to two at all, and it is obvious that the load buffer can comprise three or more stages of buffer units.

As described above, the present invention greatly improves a hit ratio in a cache memory by prefetching data as instructions and operands. It prevents unnecessary prefetched data from being stored in the cache memory by storing in the cache memory only the data determined to be valid through an access determination and a hit/miss determination performed in the load buffer. Furthermore, the present invention smoothly provides data without disturbing the pipeline of the data cache memory used for a load instruction other than, for example, a software prefetch instruction, by lowering the priority of a process of storing in the data cache memory the data prefetched according to the software prefetch instruction. Thus, the present invention successfully improves the performance of an entire data processing device.

By referring to the figures, the third embodiment of the present invention will be explained.

FIG. 29 shows a configuration of a data processing apparatus having two [2] hierarchies of cache storage devices.

Two [2] hierarchies of cache storage devices 311-1 and 311-2, provided between a central processing unit 313 and a main storage device 315, have the same configuration. More specifically, cache storage device 311-1 is connected to the central processing unit 313, and cache storage device 311-2 is connected to the main storage device 315. In the following description, -i represents either one of -1 and -2, while -k represents the other one of the same. Also, ADR represents an address signal line, and DATA represents a data signal line.

A cache storage device 311-i comprises a cache memory 310-i for storing data, a write-in buffer 305-i for buffering one or more write-in addresses and write-in data, and a cache storage control unit 307-i for controlling operations of cache storage device 311-i. Upon executing a store command, cache storage control unit 307-i writes write-in data first into write-in buffer 305-i, instead of writing them directly into cache memory 301-i while write-in buffer 305-i buffers the valid data.

As well, cache storage device 311-i comprises a storage buffer 309-i to be controlled on a store-through basis in relation to cache storage device 311-k or the main storage device 315.

The central processing unit 313 and the cache storage devices 311-1 and 311-2 are built as a single chip module.

Figure 30:
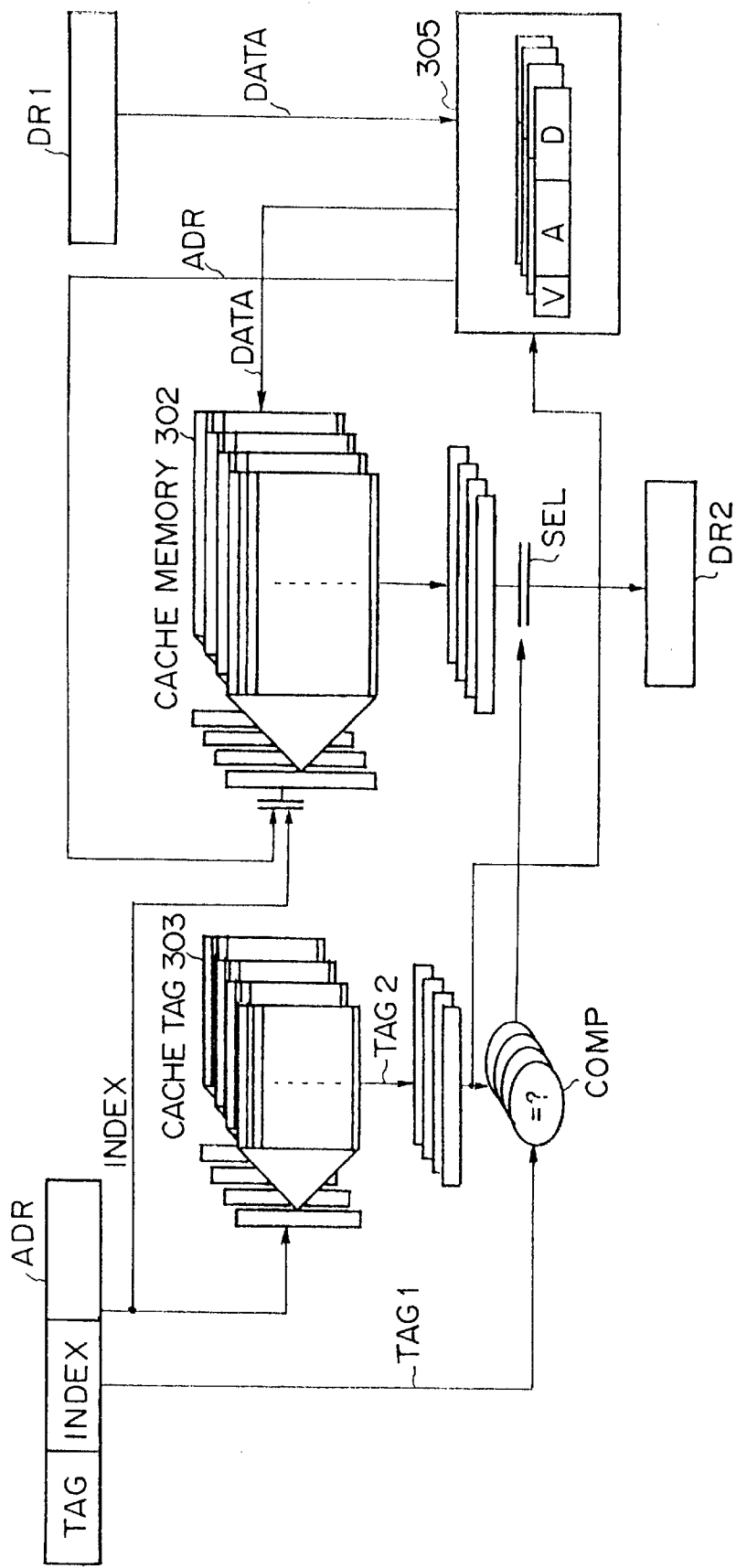
FIG. 30 shows a detailed configuration of a cache storage device of a four-way associative system pursuant to the third embodiment.

FIG. 30 shows a detailed configuration of a cache storage device of a four-way associative system pursuant to a third embodiment.

A cache storage device of the first embodiment corresponds to cache storage device 311-i shown in FIG. 29, except that a storage buffer and a cache storage control unit are not illustrated. More specifically, it comprises an address register ADR_REG for storing address data at an access, a data register DR1 for storing write-in data, a data register DR2 for storing readout data, write-in buffer 305-i for storing a write-in address and write-in data, a cache memory 302-i for storing write-in data, a cache tag 303-i for storing a tagged address, a comparator COMP for determining a hit by comparing a requested address with a tagged address, and a selector SEL for selectively outputting appropriate write-in data upon positively determining a hit.

Write-in buffer 305-i comprises as many registers as the number of ways, and has an address field A for a write-in address, a data field D for write-in data, and a validity bit V for validity of the write-in data.

When a central processing unit 313 (shown in FIG. 29) executes a store command, a cache storage control unit (not shown) writes write-in data first into write-in buffer 305-i instead of writing them directly into the cache memory 302-i, and controls a write-in of data buffered in write-in buffer 305-i into cache memory 302-i.

While the write-in data and the write-in address are written into a storage buffer on a store-through basis, when cache memory 302-i does not store write-in data before being updated, i.e., when a miss in an access to cache tag 303-i arises, only data in the storage buffer are recognized as valid data. The storage system on a store-through basis is such that the main storage device 315 (shown in FIG. 29) always stores valid data whereas cache storage device 311-i (shown in FIG. 29) stores the same only when it registers a block.

When a miss in an access to cache tag 303-i arises in executing a store command, the cache storage control unit 307-i (shown in FIG. 29) has write-in data written into storage buffer 309-i (shown in FIG. 29) only, instead of into write-in buffer 305-i. That is, this control system causes write-in data to be written into write-in buffer 305-i only upon a positive determination in a hit check.

The cache storage device of the third embodiment is very effective under the following circumstances.

(1) On executing a store command.

(2) On executing a load command successive to a store command.

(3) On experiencing a storage miss when a storage system operates on a store-through basis.

Figure 31:
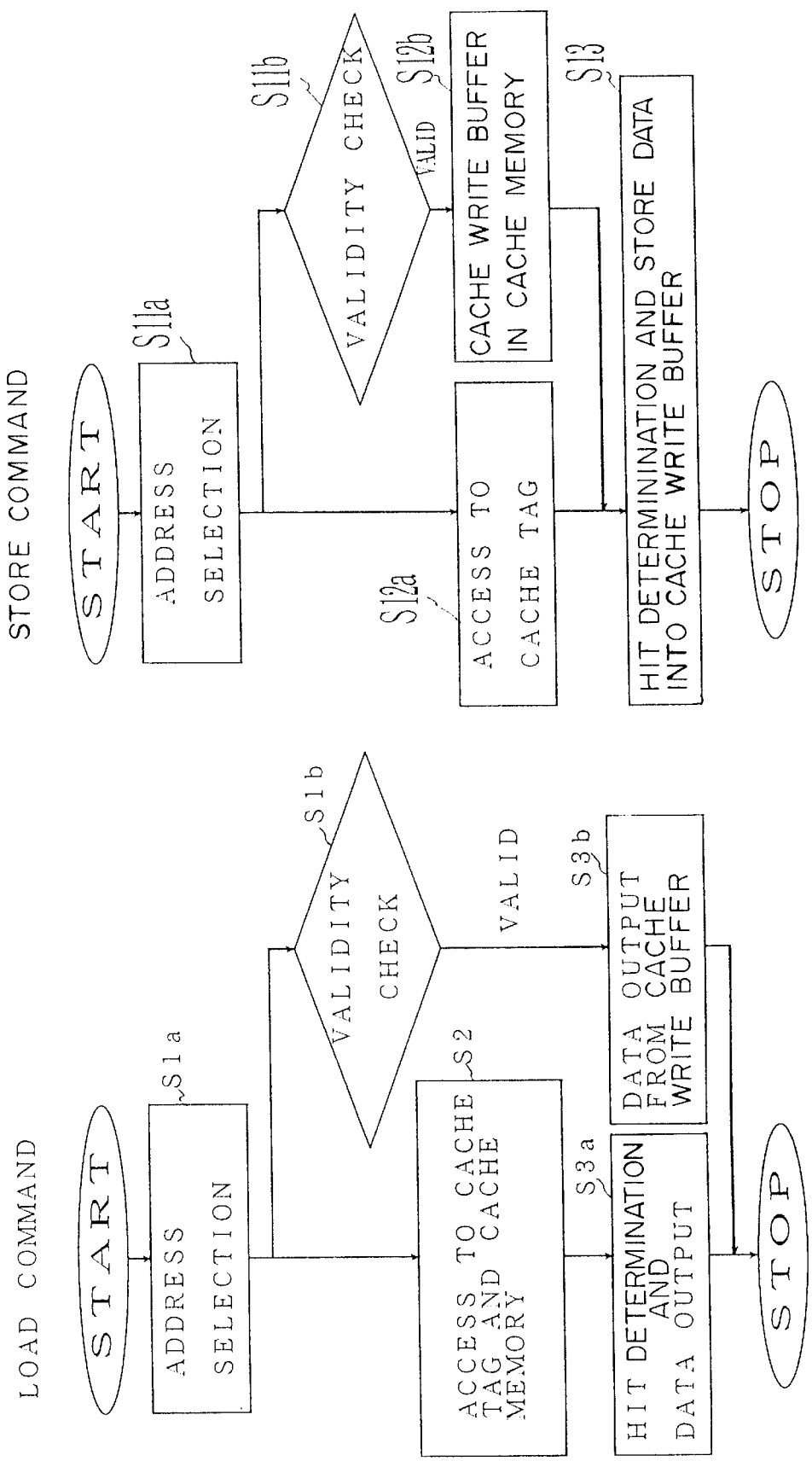
FIGS. 31A and 31B are flowcharts respectively illustrating the flows of operations when the cache storage device executes a load command and a store command pursuant to the third embodiment.

FIGS. 31A and 31B are flowcharts respectively illustrating the flows of operations when the cache storage device (shown in FIG. 30) executes a load command and a store command pursuant to the third embodiment.

FIG. 31A illustrates operations in executing a load command when a validity bit V indicates data being valid.

A step S1a (an address selection stage) is for an address selection after the issuance of a load command, a step S2 (a cache tag and cache memory access stage) is for a data readout through an access to the cache memory 302-i and the cache tag 303-i, and a step S3a (a hit check stage) is for the hit check of the read-out data.

Here, because write-in buffer 305-i may store data before a write-in to cache memory 302-i, a step S1b is provided for a validity check of the validity bit V of write-in buffer 305-i, and a step S3b is provided for a readout of the data in the data field D of write-in buffer 305-i.

FIG. 31B illustrates operations in executing a store command when a validity bit V indicates data being valid.

A step S11a (an address selection stage) is for an address selection after the issuance of a store command. A step S11b is for a validity check of the validity bit V stored in cache write buffer 305-i. A step S12a (a cache tag access stage) is for a data readout through an access to cache tag 303-i, and a step S12b, invoked simultaneously upon a positive determination in step S11b, is for an invalidation of the validity bit V after a write-in of data in the data field D of cache write buffer 305-i into cache memory 302-i. A step S13 (a hit check stage) is for a hit check of the write-in data and for a validation of the validity bit V through a write-in of address data and write-in data respectively into the address field A and the data field D of cache write buffer 305-i.

Figure 32:
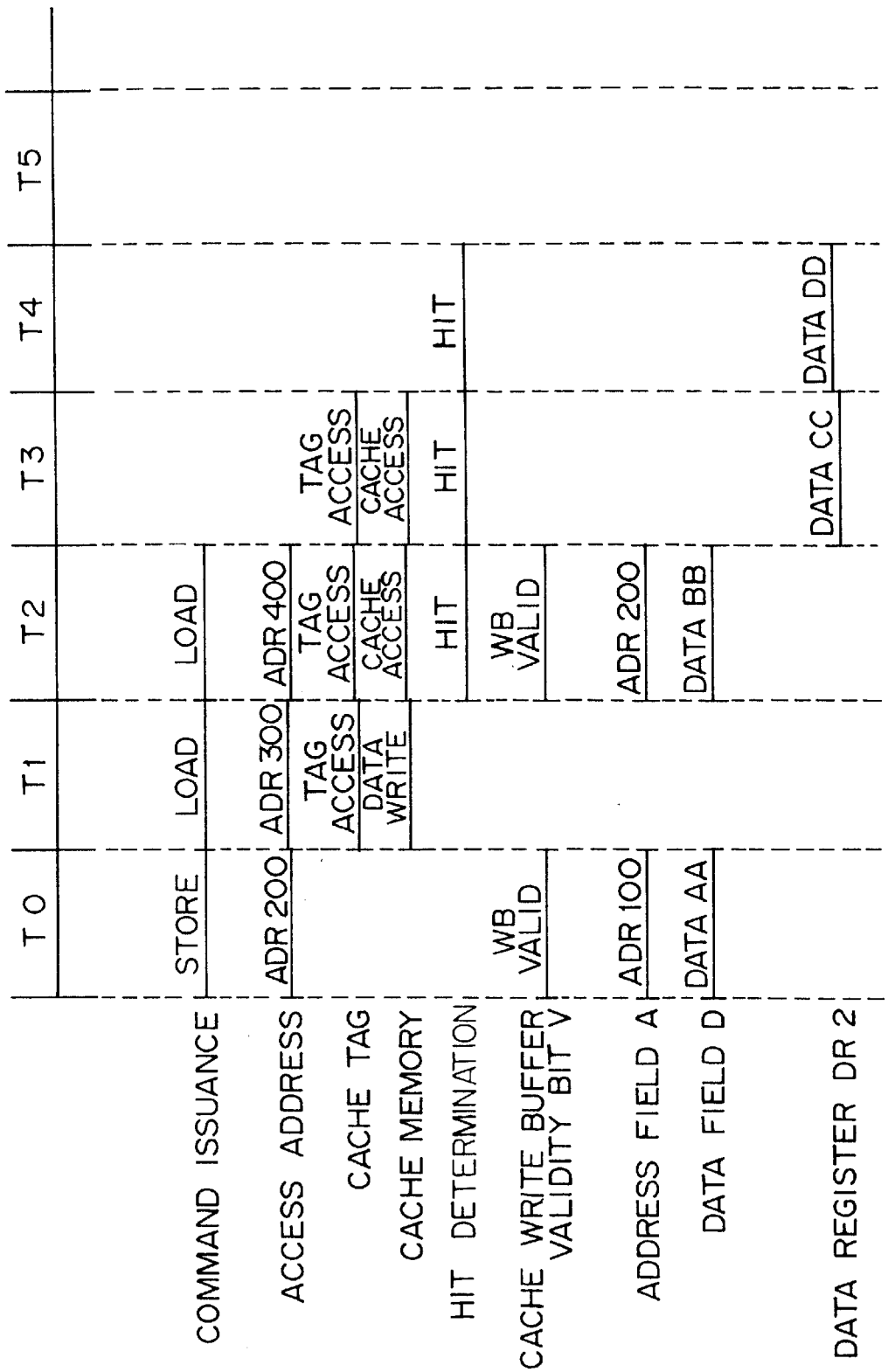
FIG. 32 is a timing chart illustrating the timings of operations when the cache storage device executes a store command and a successive load command pursuant to the third embodiment.

FIG. 32 is a timing chart illustrating the timings of operations when the cache storage device (shown in FIG. 30) executes a store command and a successive load command pursuant to the third embodiment.

A T0 cycle is for a validity check of the validity bit V of cache write buffer 305-i contemporaneously with the issuance of a store command. A T1 cycle is for a cache tag access contemporaneously with a write-in of write-in data (DATA AA) into an appropriate address (ADR 100) of cache memory 302-i when the validity bit V in cache write buffer 305-i is valid (WB_VB VALID). A T2 cycle is for a hit check and, upon a positive determination (HIT), for write-ins of address data (ADR 200) and write-in data BB respectively in the address field A and the data field D and for a validation of the validity bit V of cache write buffer 305-i (WB_VB VALID).

After the issuance of a load command in the T1 cycle, a cache tag and cache memory access is executed in the T2 cycle, and a hit check and an output of data (DATA CC) are executed in a T3 cycle.

Furthermore, even if a load command is issued in the T2 cycle, a cache tag and cache memory access is executed in the T3 cycle, and a hit check and an output of data (DATA DD) are executed in a T4 cycle. That is, unlike the prior art, a successive load command can be executed without a delay caused by an interference of an access to cache memory 302-i.

The third embodiment is such that cache storage control unit 307-i has write-in data written into a storage buffer 309-i only without being buffered in cache write buffer 305-i, upon a miss in an access to cache tag 303-i when the central processing unit 313 executes a store command.

Yet, another control method is also possible whereby cache storage control unit 307-i has write-in data always buffered first in cache write buffer 305-i and the write-in data reset after the write-in data are stored in storage buffer 309-i, upon a miss in an access to cache tag 303-i.

In the latter case, when the central processing unit 313 executes a succeeding store command, upon its issuance, write-in data of a preceding store command buffered in cache write buffer 305-i are written into cache memory 302-i. Write-in data are written into cache write buffer 305-i before a hit check and, upon a negative determination of the hit check, the validity bit V in cache write buffer 305-i is invalidated.

The third embodiment assumes that the timing at which valid data buffered in cache write buffer 305-i are written into cache memory 302-i is when a succeeding store command is executed.

Still, it could be at any instant in time allowed by the cache storage device before the issuance of the succeeding store command.

The above description of operations of the third embodiment are summarized as follows:

Write-in data are not written directly into a cache memory when a central processing unit executes a store command. Instead, cache write data and their write address are written first into a cache write buffer. When a cache write buffer is deemed to buffer valid data, the valid data are written into a cache memory at any time allowed by a cache storage device. This makes it possible to execute a load command and a store command in the same number of stages, thereby providing a high performance data processing apparatus free from an interference of accesses to a cache memory in executing a load command and a store command.

Also, upon a miss in an access to cache tag 303-i when the central processing unit executes a store command, write-in data are written only into a storage buffer instead of a cache write buffer. When a cache write buffer stores valid data, data buffered in the cache write buffer are written into a cache memory concurrently with the execution of a successive store command. This enables the executions of a load command and a store command to be consummated in the same number of stages. Thus, when a load command and a successive store command are executed, a cache write into a cache memory by a preceding store command does not interfere with a readout from the cache memory by a succeeding load command. Consequently, a succeeding load command can be executed without any delay. This results in a high performance data processing apparatus free from an interference of accesses to a cache memory in executing a load command and a store command.

Figure 33:
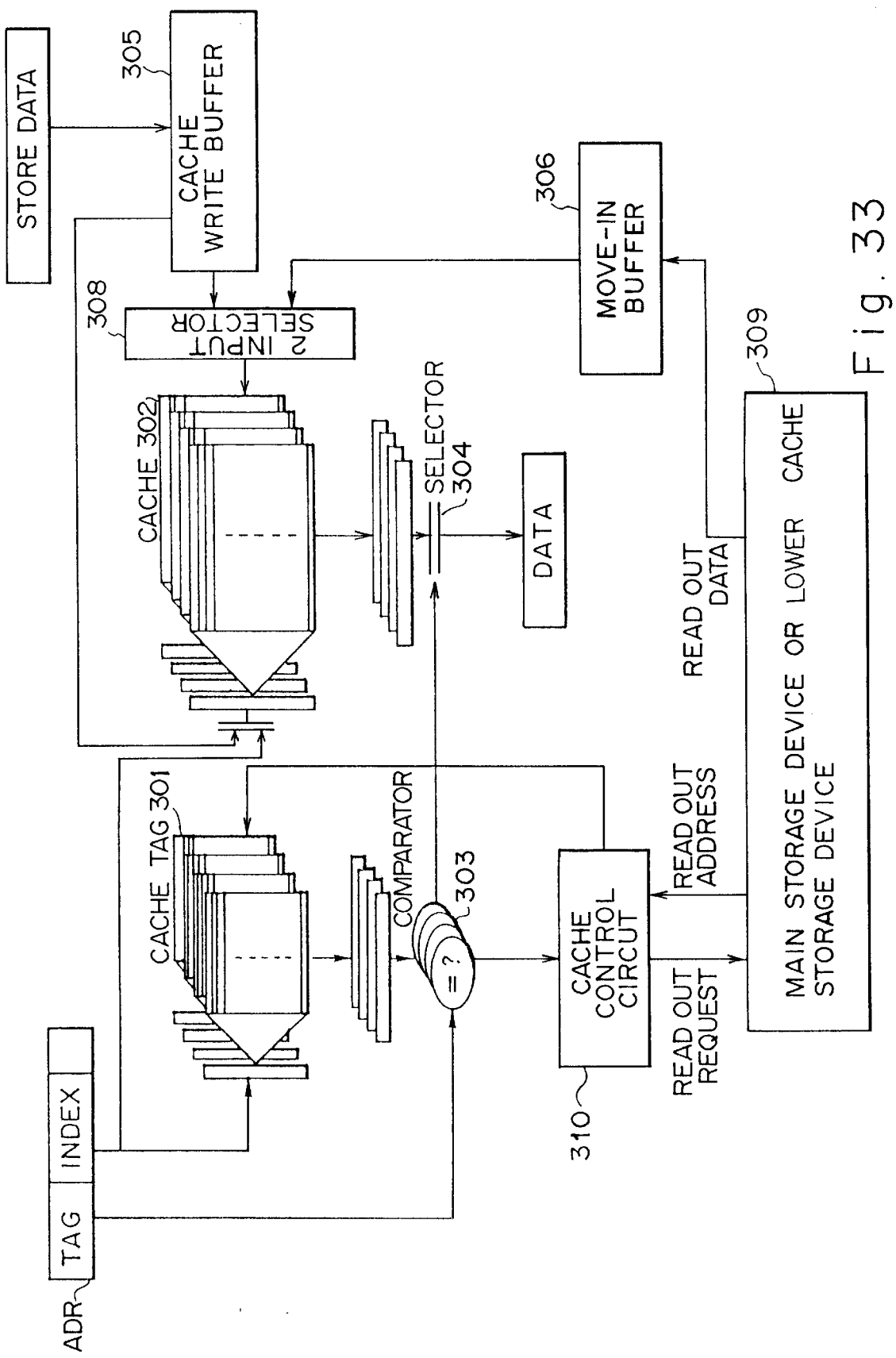
FIG. 33 shows a configuration of a cache storage device pursuant to a fourth embodiment.

FIG. 33 shows a configuration of a cache storage device pursuant to a fourth embodiment.

A cache storage device comprises cache memory 302, cache tag 301, cache storage control module or cache control circuit 310, cache write buffer 305, a comparator COMP 303, a selector SEL 304, a move-in buffer 306 and a two-input selector 308.

In the fourth embodiment, the cache write buffer 305 is provided between the central processor unit (not shown) and the cache memory 302 and the move-in buffer 306 is provided between the main storage device 309 and the cache memory 302.

Figure 34:
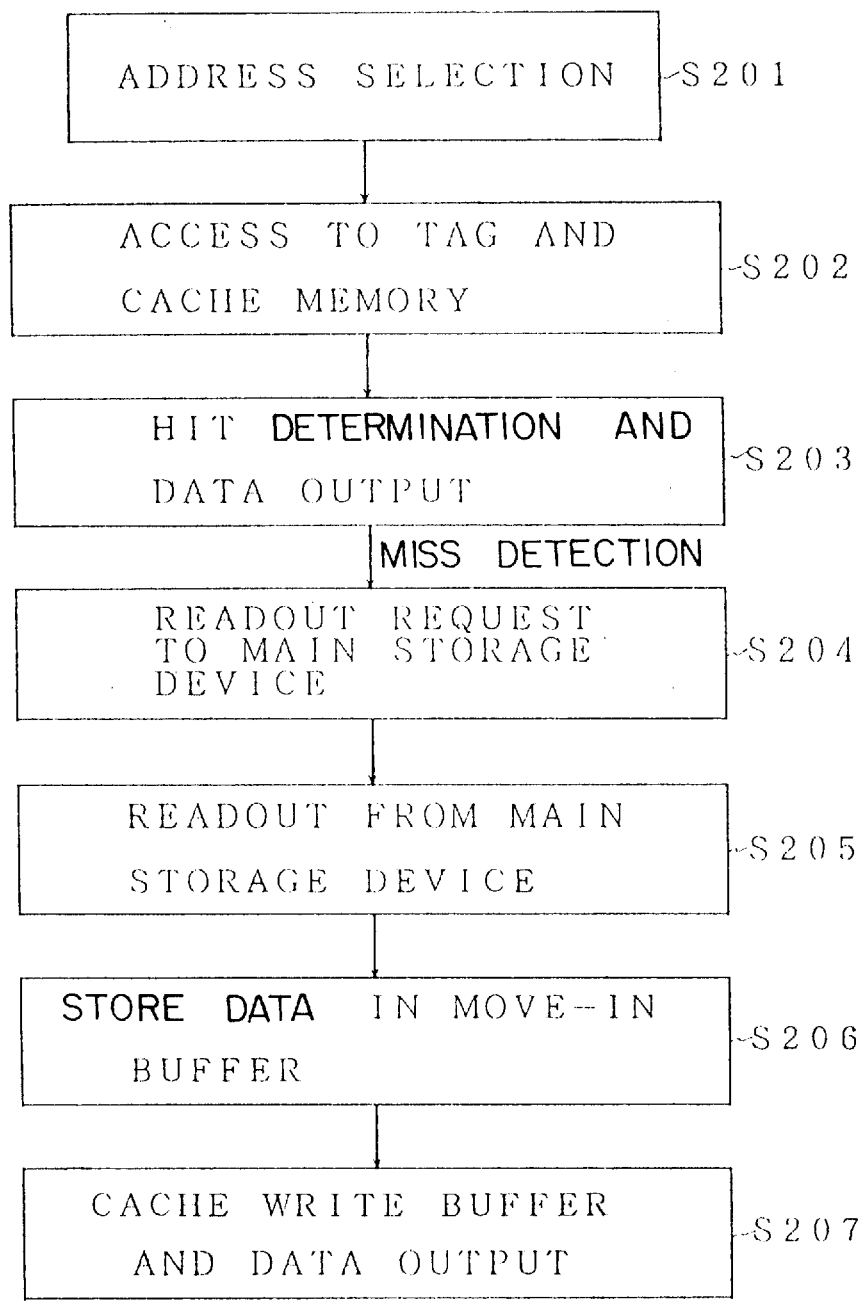
FIG. 34 is a flowchart illustrating the flow of operations when the cache storage device executes a load command pursuant to the fourth embodiment.

FIG. 34 is a flowchart illustrating the flow of operations when a cache storage device (shown in FIG. 33) executes a load command pursuant to the fourth embodiment.

Step S201 is for receiving a load command and a main storage device access address from a central processing unit.

Step S202 is for extracting an index from the main storage device access address stored in an address register ADR_REG and accesses to cache memory 302-i and cache tag 301-i.

Step S203 is for comparing an address read out from cache tag 303 with the tag extracted from the address register ADR_REG.

In the case of an access hit in step S203, selector SEL 304 selects data corresponding to a tag from data read out from cache memory 302-i, and the cache storage device consummates its operations for executing a load command.

In the case of an access miss in step S203, i.e. when cache tag 303 does not store an address corresponding to a tag, the cache storage device continues its operations by invoking step S204.

Step S204 is for having a cache storage control module 310-i request data to be loaded to either a main storage device or a cache storage device of a lower hierarchy, e.g. cache storage device 311-k of a different hierarchy (shown in FIG. 29), provided between the main storage device 315 and cache storage device 311-i (shown in FIG. 33).

Step S205 is for reading out data to be loaded from either the main storage device 315 or cache storage device 311-k of a different hierarchy.

Step S206 is for having the move-in buffer 306-i buffer the data to be loaded as move-in data.

Step S207 is for having cache memory 302-k of a different hierarchy store move-in data buffered in move-in buffer 306-i supplied via the two-input selector 308-i before any other cache memory accesses, for example, by deferring an operation of uniting the succeeding store command in the cache memory 302 from the cache write buffer 305, for outputting the move-in data stored in move-in buffer 306-i as data to be loaded.

When a command received from the central processing unit 313 is a store command, cache storage device 311-i (shown in FIGS. 30 and 33) operates in accordance with the flow of operations shown in FIG. 31B.

Upon receiving a main storage device access address and storage data, cache storage device 311-i accesses cache tag 303-i and performs a hit check on a tag. Upon a positive determination, it stores storage data in cache write buffer 305-i. When the validity bit V of cache write buffer 305-i is valid, it concurrently writes into cache memory 302-i other data already stored in cache write buffer 305-i.

The storage data stored in cache write buffer 305-i can be written into cache memory 302-i when cache memory 302-i is not accessed, in addition to when another store command is executed. Under the control of CPU (not shown) two-input selector 308-i selects from move-in buffer 306-i and cache write buffer 305-i a source of supplying data into cache memory 302-i.

Figure 35:
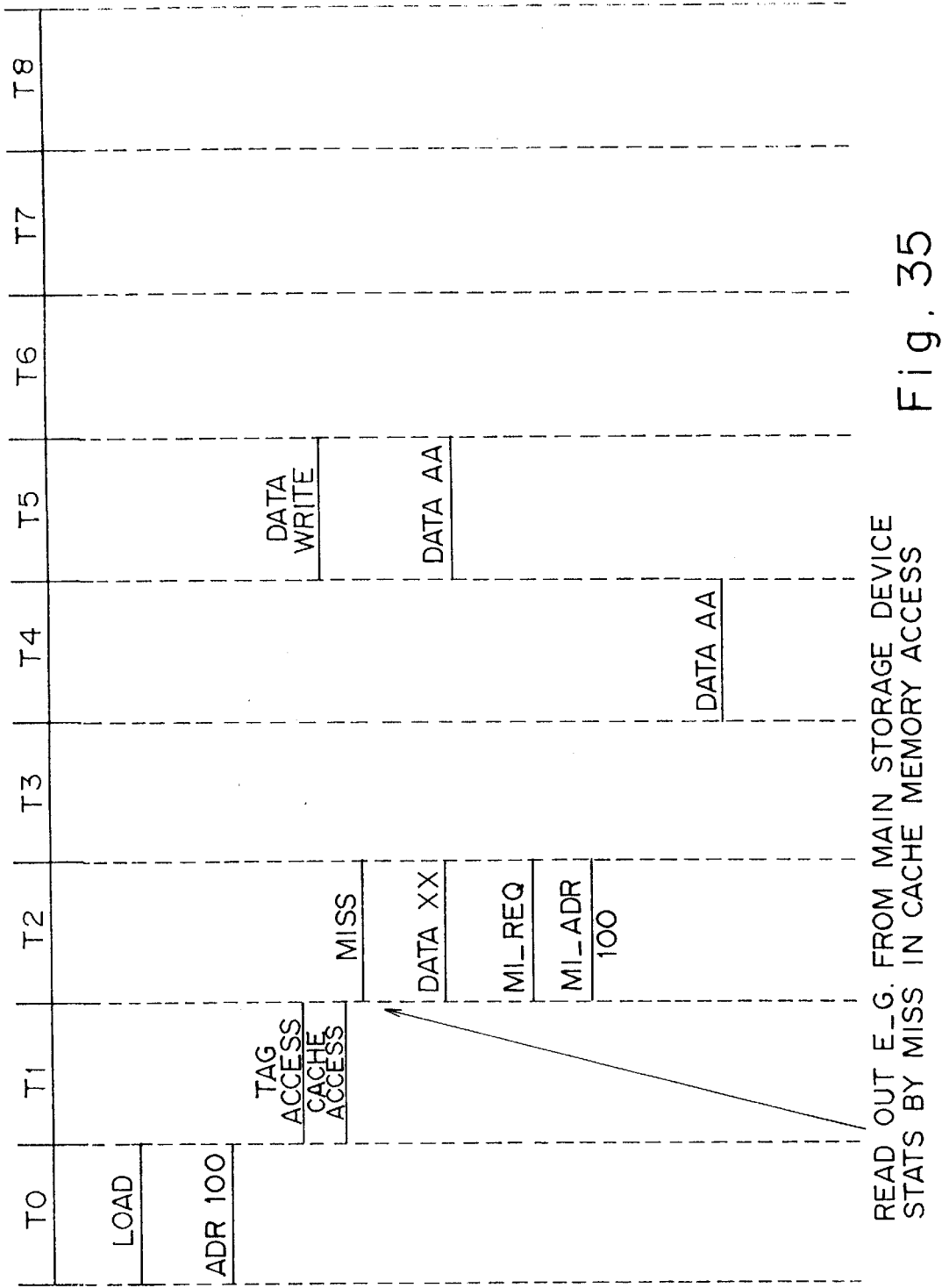
FIG. 35 is a timing chart illustrating the timings of operations when the cache storage device (shown in FIG. 33) executes a load command that ends in a miss pursuant to the fourth embodiment.

FIG. 35 is a timing chart illustrating the timings of operations when cache storage device 311-i (shown in FIG. 33) executes a load command that ends in a miss pursuant to the fourth embodiment.

A T0 cycle is for the issuance of a load command and the main storage device access address ADR 100. A T1 cycle is for a cache tag access and a cache memory access. A T2 cycle is for a hit check and, upon a negative determination (MISS), for the issuance of a move-in request (MI_REQ) and a move-in readout address (MI_ADR 100) to the main storage device or a cache storage device of a lower hierarchy. The data (DATA XX) is stored in the move-in buffer 306 at a cycle T3. A T4 cycle is for the readout of DATA AA from the main storage device 315 or the cache storage device of a lower hierarchy. A T5 cycle is for storage of the read-out DATA AA in move-in buffer 306-i. A T3, which may not be equal to a single cycle, merely represents the lapse of time from the issuance of the move-in request (MI_REQ) to the readout of data of the move-in request (MI_REQ) to the readout of DATA AA, which will be subsequently written into cache memory 302-i.

In the fourth embodiment, the move-in buffer may be comprised of the load buffer disclosed in the first and second embodiments. Then, as both the load buffer and the cache write buffer are used, the fourth embodiment provided the effects of the first and second embodiments as well as the effect of the third embodiment.

FIG. 36 is a block diagram showing a configuration of a data processing apparatus having a cache storage device pursuant to a fifth embodiment.

The data processing apparatus pursuant to the fifth embodiment comprises an integer execution unit (Arithmetic Logic Unit) 321, a command control unit 322, a cache memory control unit 310, a cache storage or memory unit 324-i and a cache write buffer 325-i.

Of these elements, the integer execution unit 321 and the command control unit 322 from the central processing unit 313 (shown in FIG. 29), and cache memory control unit 310, cache storage unit 324-i and cache write buffer 325-i compose cache storage device 311-i (shown in FIG. 29).

Figure 37:
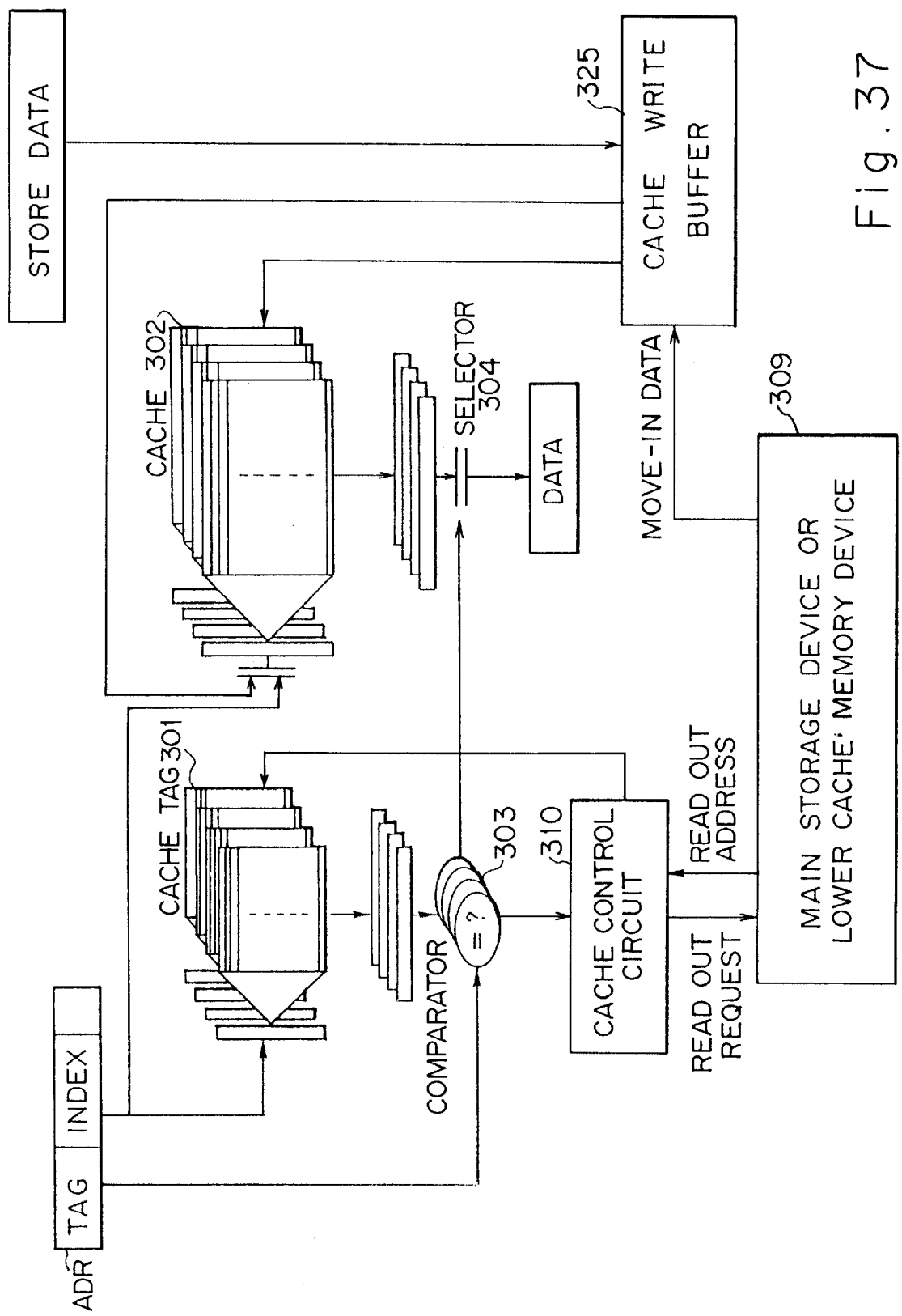
FIG. 37 shows a detailed configuration of a cache storage device pursuant to the fifth embodiment.

Also, cache storage unit 324-i comprises cache memory 302-i, cache tag 303-i, a comparator (COMP) and a selector (SEL) (shown in FIG. 37).

As well, cache memory control unit 310 corresponds to cache storage control unit 307-i (shown in FIG. 29) pursuant to the fifth embodiment.

Upon receiving a request for an access to cache memory 302-i, such as a load command and a store command, from the command control unit 322, cache storage control unit 323-i accesses cache storage unit 324-i based on the access address received from the integer execution unit 321.

When the request for an access to a cache memory is a load command, if an access to cache storage unit 324-i ends in a miss, cache storage control unit 323-i issues an access request to the main storage device 315 or a cache storage device of a lower hierarchy, and reads out as move-in data requested by the load command. Write-in buffer 325-i stores the read-out move-in data, unlike the fourth embodiment.

When the cache memory access request is a store command, if an access to cache storage unit 324-i ends in a hit, cache write buffer 325-i stores the storage data.

When another store command is executed or when cache storage unit 324-i is not accessed, cache storage unit 324-i stores as cache memory storage data storage data and move-in data stored in cache write buffer 325-i.

Because cache write buffer 325-i, in lieu of a move-in buffer, stores move-in data and handles them similarly to storage data, the fifth embodiment sheds a move-in buffer and has an advantage that a chip area less than that required in the fourth embodiment (shown in FIG. 33) can realize the storage of move-in data, and that the control of the cache storage device by cache storage control unit 323-i is easier.

FIG. 37 shows a detailed configuration of a cache storage device pursuant to the fifth embodiment.

The cache storage device of the fifth embodiment (shown in FIG. 36) stores move-in data in cache write buffer 325-i, not having a move-in buffer. The storage data outputted from cache write buffer 325-i to cache memory 302-i are either storage data or move-in data.

Figure 38:
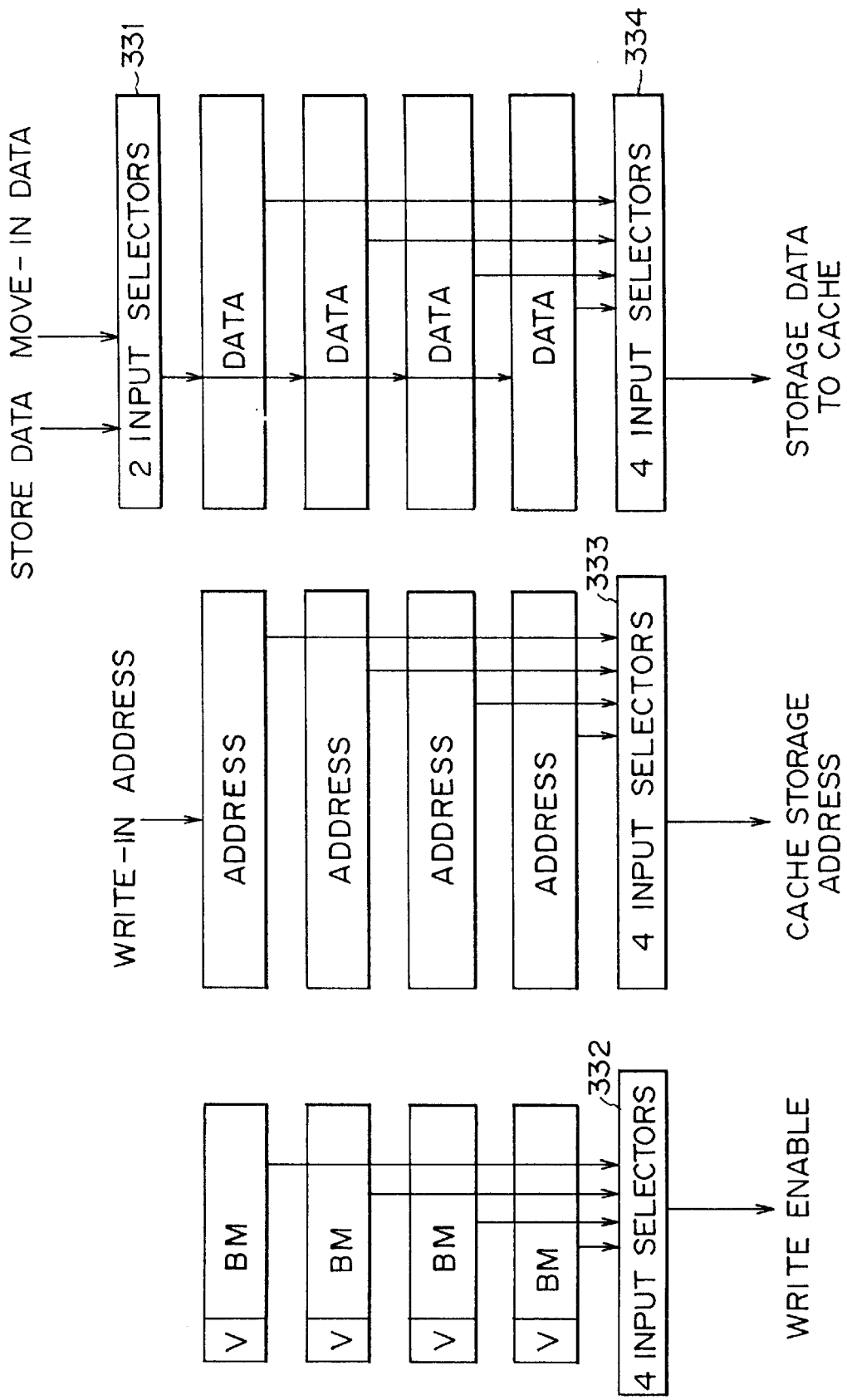
FIG. 38 shows a configuration of write-in buffer 325-i pursuant to the fifth embodiment.

FIG. 38 shows a configuration of cache write buffer 325-i (shown in FIG. 37) pursuant to the fifth embodiment.

As the two-input selector 331 selects the store data or move-in data, the cache write buffer 325 can perform an operation as the cache write buffer and the move-in buffer in a switching manner.

Write-in buffer 325-i stores, in its data field, storage data or move-in data via two-input selector 331-i. More specifically, it stores four [4] kinds of data in correspondence with the number of ways of cache memory 302-i, and operates on a FIFO (first-in, first-out) basis. A four-input selector 334-i selects one [1] of four [4] kinds of stored data for an output to cache memory 302-i. The width of data stored in cache write buffer 325-i is the same as that storable in cache memory 302-i at a time.

A four-input selector 333-i outputs as a cache storage address a cache write address, which is an address for use in storing data in cache memory 302-i, together with the stored data from four-input selector 334-i.

A byte mark BM indicates the number of bytes of storage data in cache memory 302-i. A validity bit V indicates whether or not data stored in cache write buffer 325-i are valid. When data are valid, a four-input selector 332-i outputs a write enable signal to cache memory 302-i.

The structure of the cache write buffer 305 used in the third and fourth embodiments is the same as that shown in FIG. 38 except that the cache write buffer 305 does not have the two-input selector 331.

Figure 39:
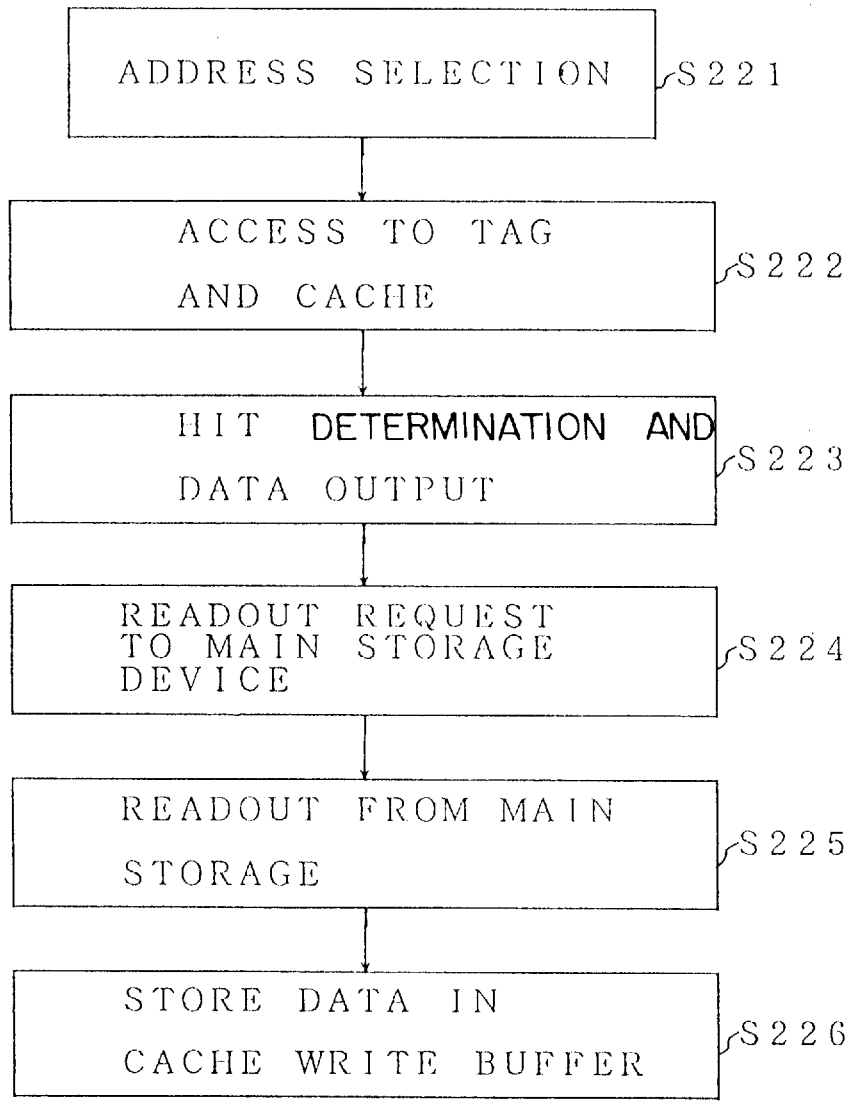
FIG. 39 is a flowchart illustrating the flow of operations when the cache storage device executes a load command pursuant to the fifth embodiment.

FIG. 39 is a flowchart illustrating the flow of operations when the cache storage device executes a load command pursuant to the fifth embodiment.

Operations in steps S221 through S225 are the same as those in steps S201 through S205 (shown in FIG. 34) pursuant to the fourth embodiment.

S226 is for having cache write buffer 325-i store move-in data read out from the main storage device 315 or a cache storage device of a lower hierarchy, thus consummating the processes.

Thereafter, cache write buffer 325-i handles the stored move-in data similarly to storage data, and stores them in cache memory 302-i, upon executing another store command. At this time, cache storage control module 310 stores in cache tag 303-i the readout address of the move-in data.

Figure 40:
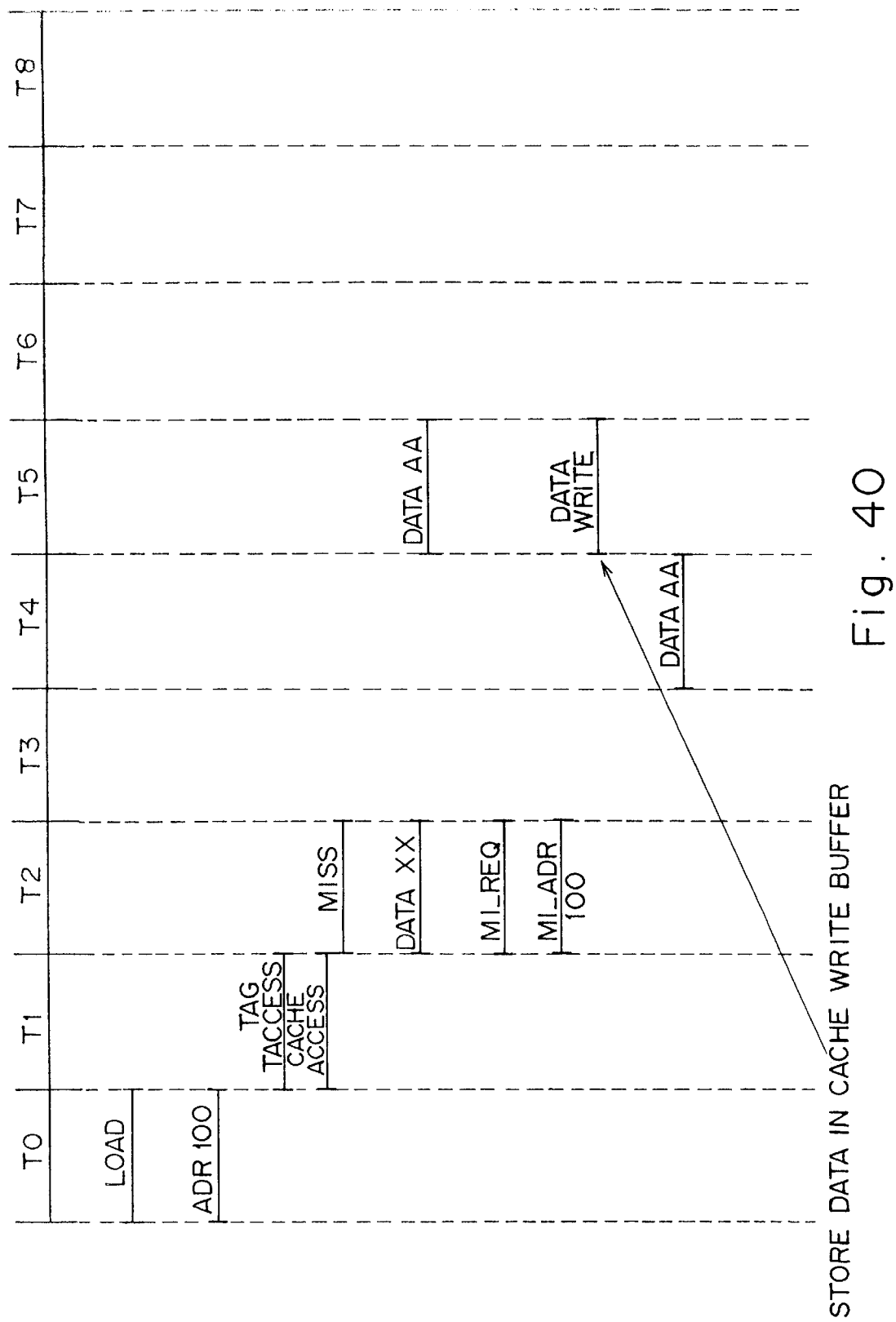
FIG. 40 is a timing chart illustrating the timings of operations when the cache storage device executes a load command that ends in a miss pursuant to the fifth embodiment.

FIG. 40 is a timing chart illustrating the timings of operations when the cache storage device (shown in FIG. 36) executes a load command that ends in a miss, pursuant to the fifth embodiment.

Operations in T0 through T4 cycles are the same as those (shown in FIG. 35) pursuant to the fourth embodiment. In a T5 cycle, cache write buffer 325-i stores move-in DATA AA read out in the T4 cycle from the main storage device 315 or the cache storage device of a lower hierarchy. Cache memory 302-i stores DATA AA stored in cache write buffer 325-i, when a store command is executed or when cache memory 302-i is not accessed.

As described above, when a load command results in a miss of a cache memory, the storage of move-in data in cache write buffer 325-i not only removes the necessity to control a move-in buffer but also eliminates an interlock between a load command and a successive command, due to the absence of a data write-in from a move-in buffer to a cache memory. The commands other than the above-recited store or load commands can access the cache memory as both an operation of writing data into the cache write buffer and an operation of reading data from the cache write buffer since the cache memory is controlled in a first-in first-out (FIFO) method.

That is, operations related to the execution of a load command (shown in FIG. 40) consummates in the T5 cycle. When a successive command is issued in the T4 cycle, the T5 cycle allows an immediate access to cache tag 303-i and the cache memory 302-i. As a result, unlike the first and fourth embodiments, the fifth embodiment does not have to have an access by a successive command stand by until cache memory 302-i and cache tag 303-i store data stored in a move-in buffer and the corresponding readout address, respectively. Additionally, the fifth embodiment does not limit a successive command to a load command only, but allows a store command, too, as long as a load command precedes.

In the present embodiment, it is not necessary to separately control the move-in buffer and the cache write buffer and to control the interrelation between the move-in buffer and the cache write buffer. Further, the present embodiment may use the cache write buffer and the load buffer in common.

Cache storage control module 326-i prioritizes a cache write from cache write buffer 325-i to cache memory 302-i, when the value of a tag stored, together with a store command or a successive load command, in cache storage device 311-i matches the readout address stored in cache storage control module 326-i in correspondence with data stored in cache write buffer 325-i. This is because cache memory 302-i stores objective data, since the objective data of a successive command match the data stored in cache write buffer 325-i. At this time, cache storage control module 326-i stores the readout address in cache tag 303-i.

Figure 41:
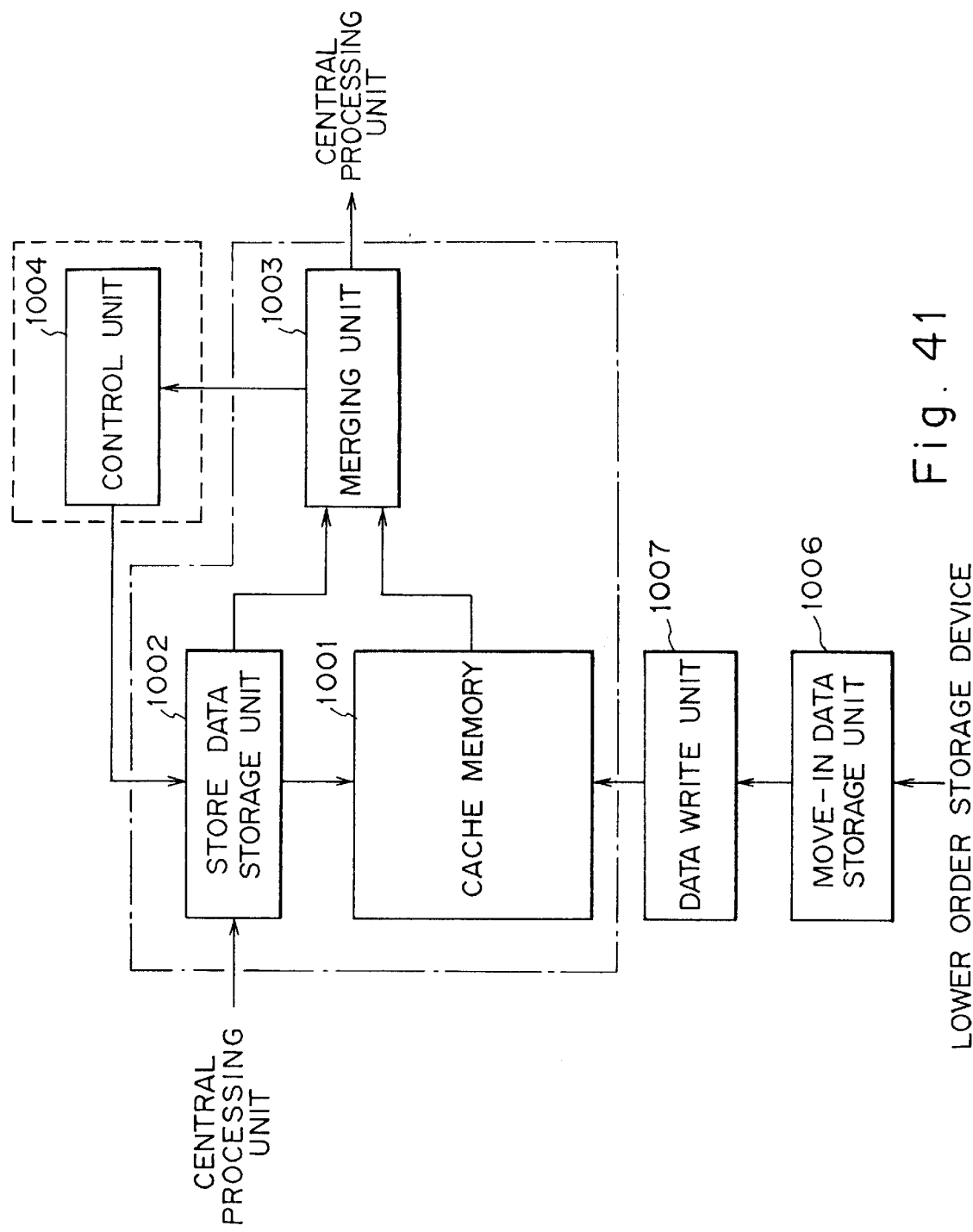
FIG. 41 is a block diagram of the sixth embodiment of the present invention.

FIG. 41 is the block diagram (1) showing the principle of the sixth embodiment of the present invention.

The embodiments described below relate to a cache memory device provided between a central processing unit and a storage device in a lower order layer.

The main storage in the lower order layer is the main storage or a lower order cache memory device.

In FIG. 41, a cache memory 1001 stores a copy of a part of the contents of the storage device in the lower order layer. The cache memory 1001 is designed in a direct mapping method, a set associative method, etc.

A store data storage unit 1002 is provided between the central processing unit and the cache memory 1001, and stores the store data of a store instruction when the central processing unit has successfully accessed the cache memory 1001 during the execution of the store instruction.

A merging unit 1003 reads line data accessed according to a load instruction from the cache memory 1001 when the central processing unit executes a load instruction to load store data stored in the store data storage unit 1002, merges the line data with the store data stored in the store data storage unit 1002 to generate new line data by replacing a corresponding portion in the line data with the store data, and outputs the new line data to the central processing unit.

According to the sixth embodiment of the present invention, line data accessed according to a load instruction are read from the cache memory 1001 when the central processing unit executes a load instruction to load store data stored in the store data storage unit 1002, and the line data are merged with the store data stored in store data storage unit 1002 to generate new line data by replacing a corresponding portion in the line with the store data, and then the new line data are outputted to the central processing unit.

Therefore, when the central processing unit serially executes a store instruction and a load instruction accessing the same address, data requested by the load instruction can be outputted to the central processing unit without writing in the cache memory 1001 the store data of the store instruction stored in the store data storage unit 1002, thereby shortening the time taken for executing the load instruction. Furthermore, since writing the store data stored in the store data storage unit 1002 to the cache memory 1001 is not required, valid line data which are probably involved in a cache hit in the cache memory 1001 can be prevented from being erroneously deleted.

The sixth embodiment of the present invention further comprises, in addition to the above listed units 1001, 1002, and 1003, a control unit 1004 for invalidating the store data stored in the store data storage unit 1002 when the store data to be merged in the merging process have been transmitted to the merging unit 1003.

According to the sixth embodiment of the present invention, the store data in the store data storage unit 1002 are invalidated when the store data stored, to be merged, in the store data storage unit 1002 are transmitted to the merging unit 1003.

Therefore, when a store instruction is executed after another store instruction, the store data stored in the store data storing unit 1002 do not have to be written to the cache memory 1001. Thus, the frequency of a write process of line data in the cache memory can be greatly reduced.

The sixth embodiment of the present invention further comprises, in addition to the above listed units 1001, 1002, and 1003, a move-in data storage unit 1006 and a data write unit 1007.

The move-in data storage unit 1006 is provided between the storage device in the lower order layer and the cache memory 1001, and stores move-in data transmitted from the storage device in the lower order layer when the central processing unit has failed in accessing the cache memory 1001 during the execution of a load instruction. The move-in data are line data including the data to be loaded according to the load instruction issued by the storage device in the lower order layer at a move-in request when a cache miss has arisen during the execution of the load instruction.

The data write unit 1007 stores the move-in data in the cache memory 1001 after the merging unit 1003 has accessed the cache memory 1001 to perform the merging process when the move-in data have been transmitted to and stored in the move-in data storage unit 1006 during the merging process performed by the merging unit 1003.

According to the sixth embodiment, in addition to the first aspect, the move-in data storage unit 1006 stores move-in data transmitted from the storage device in the lower order layer when the central processing unit has failed in accessing the cache memory 1001 during the execution of a load instruction. The data write unit 1007 stores the move-in data in the cache memory 1001 after the merging unit 1003 has accessed the cache memory 1001 to perform the merging process when the move-in data have been transmitted to and stored in the move-in data storage unit 1006 during the merging process performed by the merging unit 1003.

Therefore, when a load instruction and a store instruction accessing data in line data having the same index can be executed, and when another load instruction accessing the same address of the main storage as the store instruction is being executed, a desirable effect can be obtained if the preceding load instruction encounters a cache miss in the cache memory 1001 and the store instruction encounters a cache hit in the cache memory 1001.

That is, in this case, the store data stored in the store data storage unit 1002 and involved in the cache hit are not written to the cache memory 1001, but are invalidated immediately after the merging process has been performed. Therefore, the move-in data transmitted from the storage device in a lower order layer due to the cache miss can be immediately written to the cache memory, and are not rewritten even if a succeeding store instruction is executed. Thus, valid move-in data can be stored in the cache memory 1001 for an extended period.

According to the seventh embodiment of the present invention, the merging unit 1003 merges the store data stored in the store data storage unit 1002 with the line data, stored in the move-in data storage unit 1006, including the data to be updated to the store data, and writes the merged line data at a corresponding position in the cache memory 1001.

Accordingly, if the central processing unit serially executes a load instruction and a store instruction both accessing the same line address, and if the data of the line address are not stored in the cache memory 1001 during the execution of the load instruction, then these instructions can be processed at a high speed.

That is, if the load instruction has encountered a cache miss, a move-in request is issued. Next, when a store instruction is executed, a cache miss is detected in the cache memory 1001, but a hit is detected in the move-in data storage unit 1006 by the execution of the move-in. Therefore, the store data of the store instruction are stored in the store data storage unit 1002. Then, the merging unit 1003 merges the store data with the move-in data transmitted to the move-in data storage unit 1006 (that is, the corresponding line data), and the line data obtained by the merging process are written to the cache memory 1001. Thus, the merging process can be performed without writing the store data in the store data storage unit 1002 or the move-in data storage unit 1006 to the cache memory 1001, thereby speeding up the merging process. Since the line data are not written to the cache memory 1001 during the execution of the merging process, the line data having the same index as the line data already stored in the cache memory 1001 can be extendedly stored.

Furthermore, according to the sixth embodiment of the present invention, store data in the store data storage unit 1002 can be invalidated if the merging unit 1003 receives the store data from the store data storage unit 1002 when it performs the merging process.

Accordingly, when a store instruction preceded by the load instruction has encountered a cache hit, the store data of the store instruction involved in the cache hit can be immediately written to the store data storage unit 1002 without sweeping the store data stored in the store data storage unit 1002 to the cache memory 1001, thereby greatly speeding up the entire process.

Figure 42:
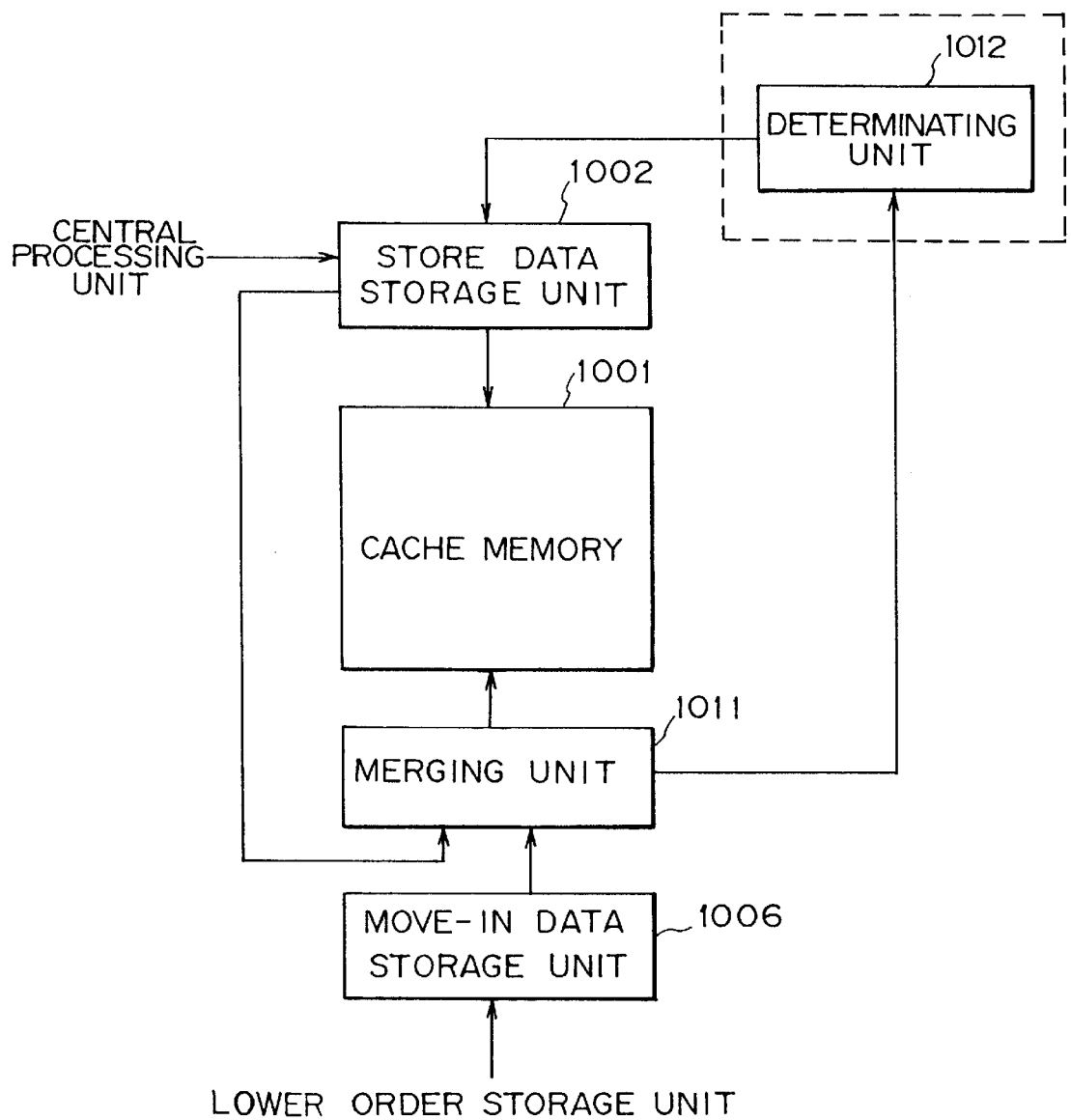
FIG. 42 is a block diagram of the seventh embodiment of the present invention.

FIG. 42 shows the block diagram of the seventh embodiment of the present invention.

In FIG. 42, the cache memory 1001, the store data storage unit 1002, and the move-in data storage unit 1006 have the same functions as the units assigned the corresponding numbers shown in FIG. 41.

The seventh embodiment further comprises a merging unit 1011 in addition to the above described cache memory 1001 and the above listed units 1002 and 1006.

The merging unit 1011 merges the store data with the move-in data at the position of the move-in data when the line data, to which the store data stored in the store data storage unit 1002 are written, have been transmitted as move-in data to the move-in data storage unit 1006, and for writing the line data obtained by the merging process at a corresponding position in the cache memory 1001.

In the seventh embodiment, the merging unit 1010 comprises a control unit 1012 in addition to the cache memory 1001 and the above listed units 1002 and 1003.

The control unit 1012 invalidates the store data in the store data storage unit 1002 when the merging unit 1011 has read the store data, to be merged in the merging process, from the store data storage unit 1002 during the merging process.

Figure 43:
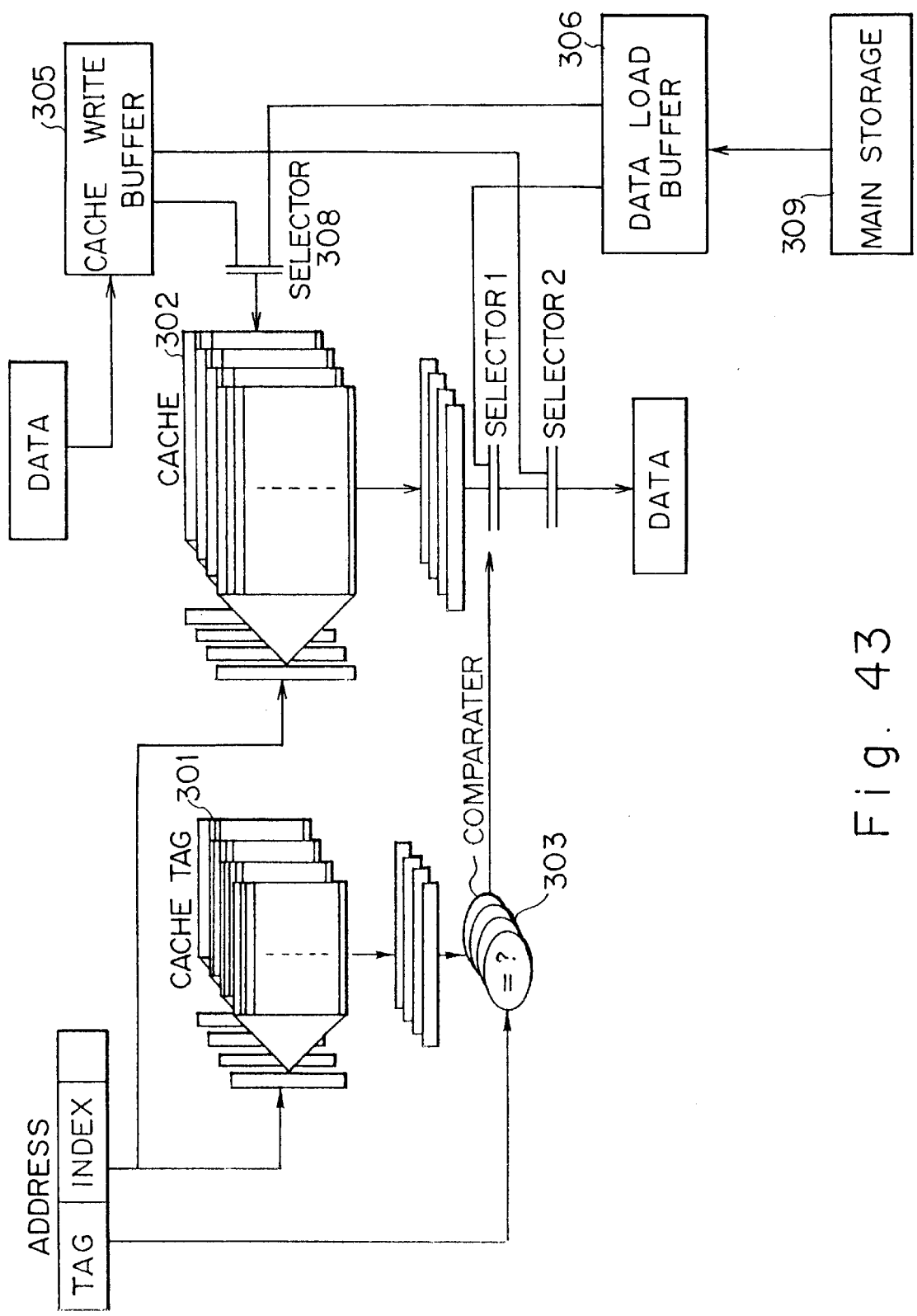
FIG. 43 shows the general configuration of the sixth embodiment.

FIG. 43 shows the general configuration of the sixth embodiment. In FIG. 43, if a unit is also used in the cache memory device shown in any of the previous figures, it is assigned the same number.

A selector 110 selects and outputs hit data outputted from either of the cache memory or the data load buffer 102. A selector 120 outputs data selected and outputted by the selector 110 or data outputted by the cache write buffer 305 to the main storage or a lower order cache memory device. With the configuration, the data in the cache write buffer 305 or the data load buffer 306, in addition to the data in the cache memory involved in a hit, bypass a cache memory from the selector 120, and are outputted to the main storage or a lower order cache memory device. These data are merged as described later.

The control method according to the sixth embodiment of the present invention works effectively under the following conditions:

1. When a cache miss has arisen during the execution of a load instruction;

2. When a move-in is performed after a cache miss;

3. When a load instruction to load data having the same index as that of the data to be stored by a store instruction is executed;

4. When the store instruction results in a cache hit; and

5. When the data to be stored by the store instruction (store data) have been processed by a load instruction.

Figure 44:
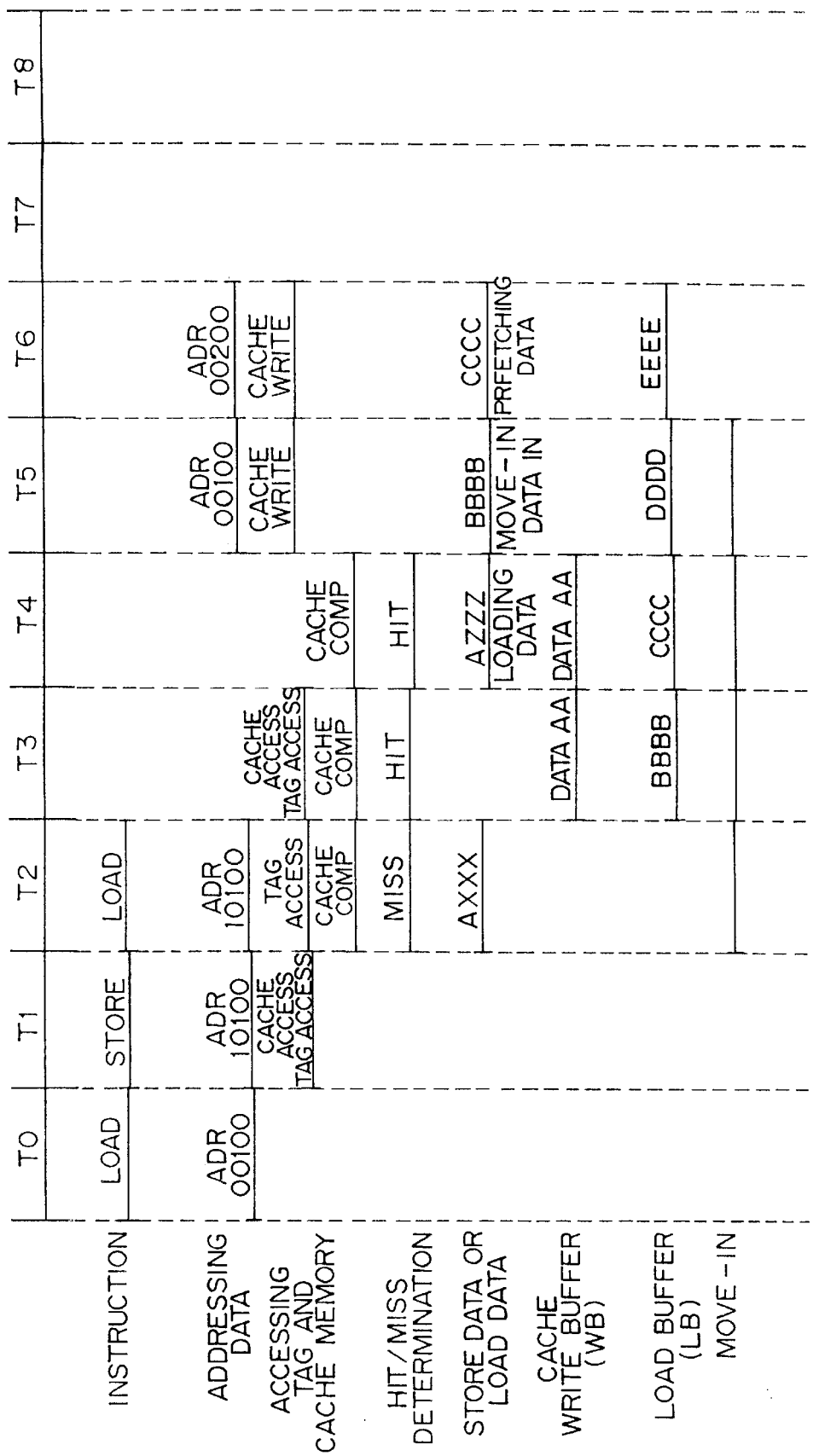
FIG. 44 is a timing chart of executing loads and store instructions.

With the above listed sequence 1 through 5, load and store instructions are executed according to the time chart shown in FIG. 44.

A load instruction to load data at address ADR 00100 starts at T0. Then, at T1, a cache memory and a tag are accessed, resulting in a cache miss at T2. Accordingly, a move-in request is issued at T2.

After the load instruction, a store instruction is received at T1. The address of the store data AXXX (X indicates invalid data. Therefore, only A is valid in the data AXXX) of the store instruction shares the same index with address ADR 10100 of the load data of the load instruction. A tag access is made for the store instruction at T2, resulting in a cache hit at T3. Thus, the store data AXXX of the store instruction and their store address ADR 10100 are stored in the cache write buffer 305. The store data in the cache write buffer are Data AA. Data AA include the address of the above described store data.

Furthermore, a load instruction is received at T2 immediately after the store instruction. The address of the load data of the load instruction is ADR 1010 the same as the address of the store data of the store instruction. Therefore, cache and tag are accessed for the load instruction at T3, resulting in a hit in the cache write buffer 305 and the cache memory at T4.

The load instruction should load the data stored by the preceding store instruction. In this case, according to the feature of the present embodiment, the store data (AXXX) stored in the cache write buffer 102 are merged with the line data including the data (ZZZZ) at address ADR 10100 stored in the cache memory, and are outputted to the main storage of a lower order cache memory device. Then, at T5, the line data BBBB including the data at address ADR 00100 stored in the data load buffer 102 by the above described move-in are written to a cache memory. Simultaneously, DATA AA stored in the cache write buffer 305 are invalidated.

Thus, since the store instruction issued at T1 results in a cache hit in this case, the store data AXXX of the store instruction are stored in the cache write buffer 305. However, since the load data of a succeeding load instruction are the store data of the above described store instruction, the data in the cache write buffer 305 are merged with the line data in the cache memory at T4 before writing to the cache memory the line data BBBB fetched according to the move-in request, and the resultant data are outputted to the CPU. Thus, the merging process can be realized without writing into the cache memory the data temporarily written to the cache write buffer 305 as a result of a cache hit, thereby performing the merging process at a high speed. In the present embodiment, the data in the cache write buffer 305 can be invalidated without writing the data to the cache memory. Therefore, when a succeeding store instruction results in a cache hit, its store data can be immediately written to a cache write buffer.

Conventionally, store data of a preceding store instruction resulting in a cache hit should be written from the cache write buffer 305 to a cache memory each time the store instruction encounters a cache hit. Accordingly, if a cache hit arises continuously for a store instruction, then data must be frequently rewritten in a cache memory, thereby disturbing a pipeline process and totally deteriorating the performance of the data processing device. The present invention has been developed to solve such a problem.

Furthermore, according to this embodiment, since the load data of a load instruction resulting in a cache miss and the store data of the succeeding store instruction are included in the line data having the same index, only the move-in data BBBB of the preceding load instruction can be immediately written to a cache memory.

Then, the data stored in the cache write buffer 305 are immediately invalidated. Therefore, even if a load instruction and a store instruction are processing data sharing the same index and issued one after the other, and the load instruction results in a cache miss whereas the store instruction results in a cache hit, the retention of the data stored in the cache memory as a result of the cache miss of the above described load instruction can be extended further than in a conventional method.

Figure 45:
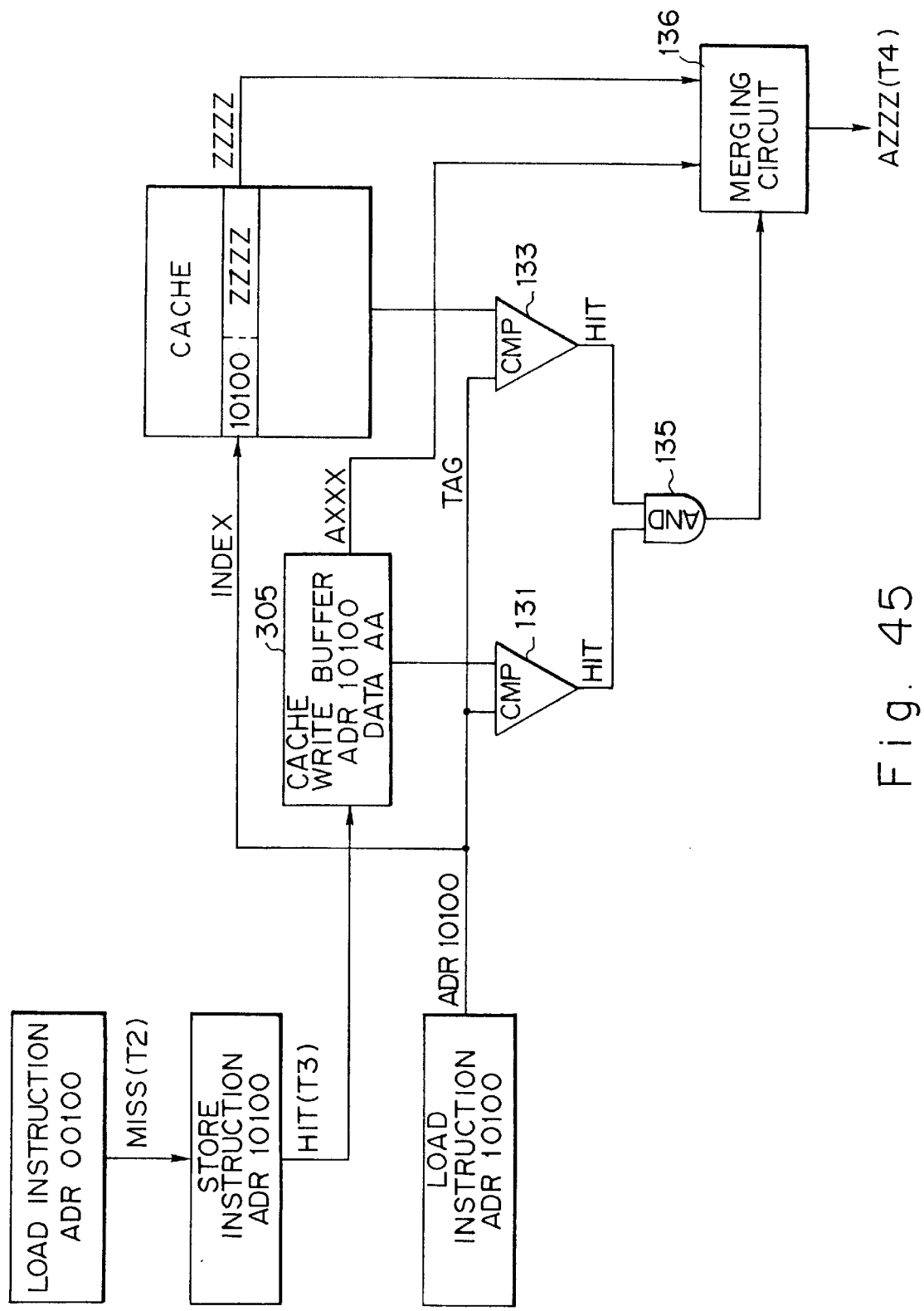
FIG. 45 is an example of a circuit for merging the data in the cache write buffer.

Next, FIG. 45 shows an example of a circuit for merging the data in the cache write buffer 305 with the line data in the cache memory.

In FIG. 45, a comparator (CMP) 131 determines whether or not a succeeding load instruction hits the cache write buffer 305, and the address of the load data of the load instruction and the address of the store data stored in the cache write buffer 305 are entered.

A comparator (CMP) 133 determines whether or not the succeeding load instruction hits the cache memory, and compares the tag of the address of the load data of the load instruction with the tag read from the cache memory with the index of the address as a key.

An AND circuit 135 receives comparison results outputted by the comparators (CMP) 131 and 133, and outputs a merge-enable signal if both comparison results indicate a coincidence signal.

The merging circuit 136 receives stored data (AXXX) from the cache write buffer 305 and the line data (ZZZZ) indicating a cache hit according to the succeeding load instruction from the cache memory, and rewrites only the stored data of the store instruction in the line data (ZZZZ) to the store data when the merge-enable signal is received from the AND circuit 135, thus performing a merging process. Then it outputs the line data obtained by the merging process to the CPU.

Another embodiment will now be explained. It is designed to efficiently utilize the cache write buffer 305 and the data load buffer 306.

The embodiment is effective under the following conditions:

1. when a cache miss has arisen for a load instruction;
2. when a move-in is executed as a result of the cache miss;
3. when a store instruction is executed for an offset position other than the line containing the data to be loaded by the load instruction; and
4. when the store instruction results in a load buffer hit.

Figure 46:
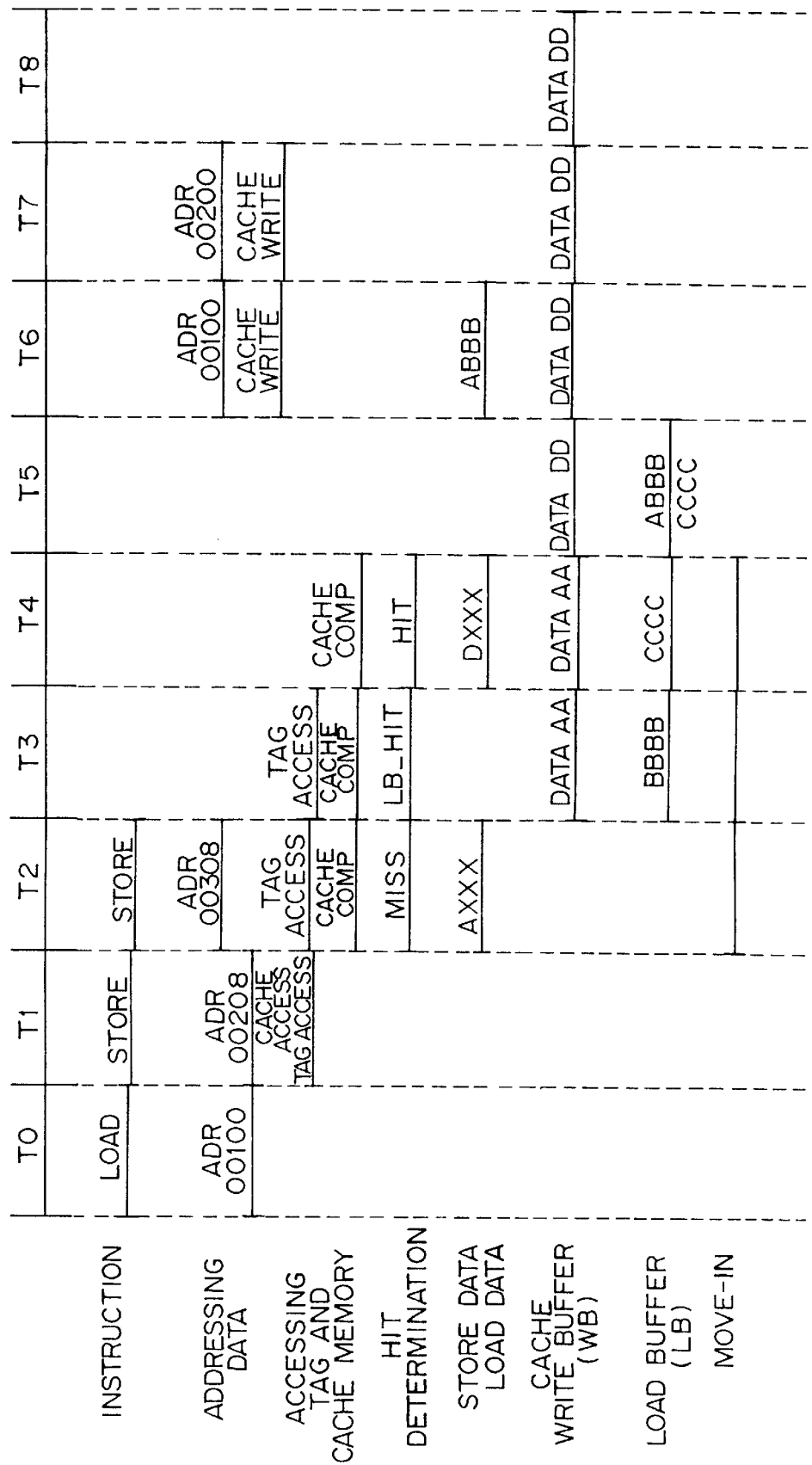
FIG. 46 is the time chart indicating the control method according to the present embodiment performed when the above described conditions exist.

FIG. 46 is the time chart indicating the control method according to the present embodiment performed when the above described conditions exist.

First, at T0, a load instruction to load the data at address ADR 00100 is started. When the load instruction has been issued, a tag access and a cache access are made at T1, and a cache miss is detected at T2. Therefore, the execution of a move-in starts at T2.

After the load instruction, a store instruction is accepted at T1. The store instruction stores data AXXX at address ADR 00208. The data at address ADR 00208 and the data at load address ADR 00208 of the load instruction refer to the same data. When the store instruction is issued, a tag access is made at T2, and a load buffer hit is detected at T3. That is, when a request to perform a move-in is issued at T2, the load data buffer 102 has not stored line data BBBB including the data at the above described store address ADR 00208 in the load data buffer 102. However, since the address information of the move-in data BBBB has been stored, the address information induces a load buffer hit (LB-Hit). Therefore, the store data AXXX of the above described store instruction are stored in the cache write buffer 305 at T3.

A further store instruction is accepted at T2. This succeeding store instruction stores data DXXX at address ADR 00308, and a tag access and a cache access are made at T3, and a cache hit is detected at T4. As a result, data DXXX should be stored in the cache write buffer 305. According to the present embodiment, data AXXX stored in the cache write buffer 305 as a result of the load buffer hit are transmitted to the data load buffer 306 instead of writing them to a cache memory as in the conventional method. Then, move-in data BBBB and data AXXX are merged in the data load buffer 306 to generate line data ABBB.

That is, as described above, since each piece of data at load address ADR 00100 of the load instruction and at store address ADR 00208 of the succeedingly accepted preceding store instruction are included in the same line, the above described merging process can be successfully realized. Line data ABBB at line frame address ADR 00100 are obtained by the merging process and stored in a cache memory at T6.

Thus, according to this embodiment, when a preceding store instruction results in a hit, store data AXXX of the preceding store instruction stored in the cache write buffer 305 are not immediately written to a cache memory at T2 of the tag access stage of a succeeding store instruction. Conventionally, store data AXXX are written to a cache memory at T2 in the stage. In the present embodiment, the data of a preceding store instruction stored in the cache write buffer 305 are not immediately written to a cache memory even if another store instruction results in a hit two times continuously, but the store data are written to a cache memory after the line data have been updated in the load buffer 102. Accordingly, in the present embodiment, the data stored in the cache memory device can be extended further than in the conventional method.

Figure 47:
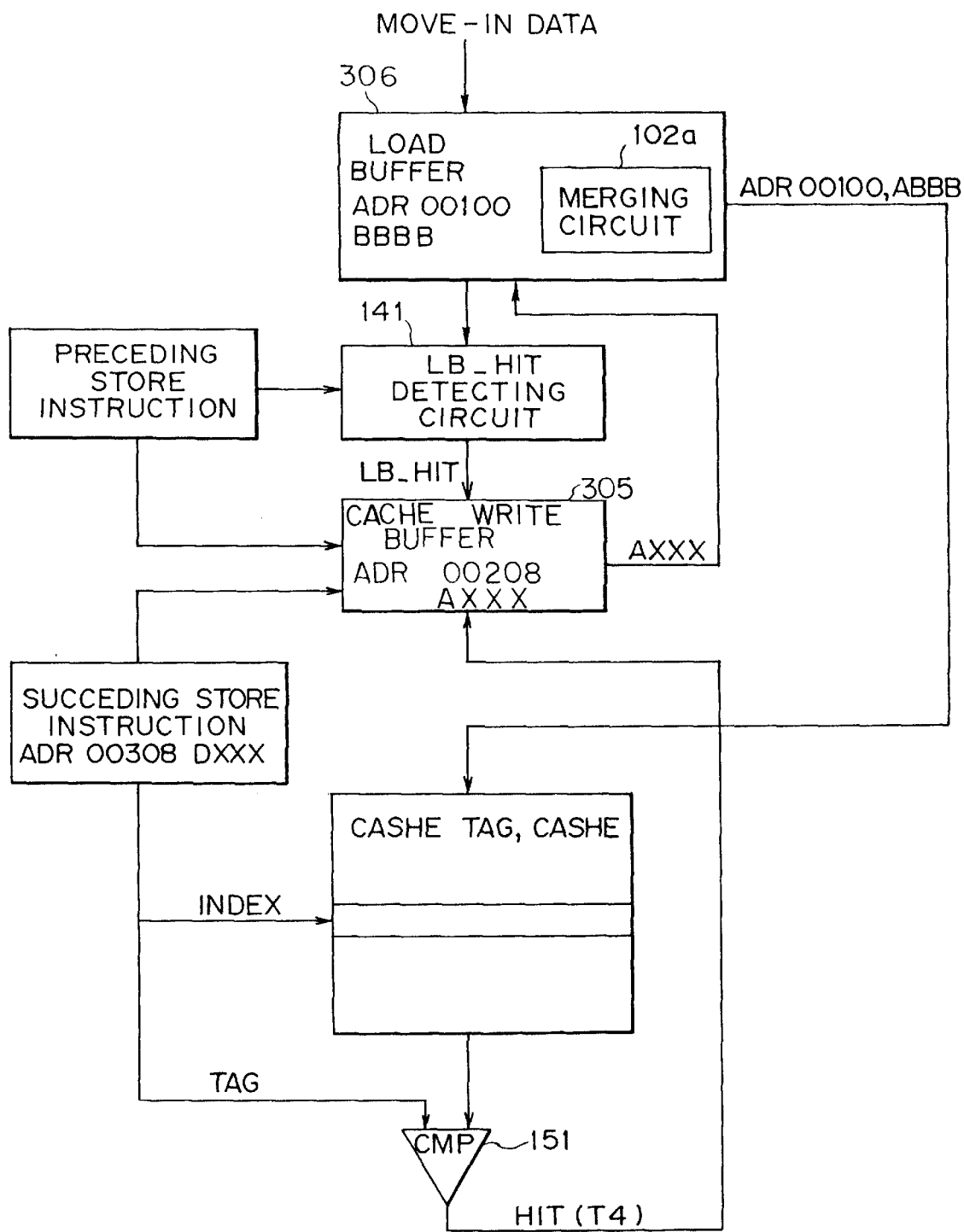
FIG. 47 shows an example of the configuration of a circuit for merging in the load buffer 102 the move-in data with the store data in the cache write buffer 103.

Next, FIG. 47 shows an example of the configuration of a circuit for merging in the load buffer 306 the move-in data with the store data in the cache write buffer 305.

In FIG. 47, a load buffer hit (LB-HIT) detecting circuit 141 receives a store address of a store instruction at the execution of the store instruction, and compares the store address with the address information of the move-in data stored in the load buffer 306. Then, it is determined based on a comparison result whether or not the store instruction has resulted in a load buffer hit (LB-HIT). If it has, a write-enable signal is outputted to the cache write buffer 305.

When the write-enable signal is applied, the cache write buffer 305 stores the store data of the store instruction and the store address (ADR 00208), and sets a validity flag to an active state.

Then, when a succeeding store instruction is executed, it is determined by a comparator (CMP) 151 provided for a cache tag whether or not the store instruction has resulted in a cache hit. If it has, a hit detection signal is outputted to the cache write buffer 305.

When the hit detection signal is received, the cache write buffer 305 transmits the store data (AXXX) of the preceding store instruction and their store address (ADR 00208) to the load buffer 306.

As a feature of the present embodiment, the load buffer 306 has a built-in merging circuit 102a. The merging circuit 102a merges the store data (AXXX) of the preceding store instruction transmitted from the cache write buffer 305 with the existing move-in data (BBBB) according to the address information of each piece of data. The line data (ABBB) obtained by the merging process are written to a cache memory. At this time, the tag (frame line address) of the line data (ABBB) is also written to the corresponding position of an index in a tag cache memory.

What is claimed is:

1. A data processing device in a computer system having an instruction cache memory for storing an instruction, a lower order storage unit and an instruction processing unit for instructing the lower order storage unit to transmit a necessary instruction to the instruction cache memory when the instruction is not stored in the instruction cache memory, said data processing device comprising:

first transmit instruction data storage means for storing 1-line instruction data containing a first instruction required by the instruction processing unit, followed by a second instruction, and for transmitting the 1-line instruction data from the lower order storage unit to the instruction cache memory and directly to the instruction processing unit;

second transmit instruction data storage means, formed of one or more stages, for storing one or more lines of prefetched instruction data following the 1-line instruction data and for transmitting the one or more lines of prefetched instruction data after the 1-line instruction data is transmitted; and determining means for determining whether the one or more lines of prefetched instruction data are to be transmitted to the instruction cache memory by comparing only a portion of an address of the second instruction stored in said first transmit instruction data storage means with a corresponding portion of an address of a third instruction required by the instruction processing unit, said determining means determining to transmit the one or more lines of prefetched instruction data to the instruction cache memory when at least the portion of the address of the second instruction and the corresponding portion of the address of the third instruction match.

2. The data processing device according to claim 1, wherein when a specific instruction stored in said second transmit instruction data storage means is stored in the instruction cache memory after a different instruction, which was stored in and transmitted from said first transmit instruction data storage means, has been stored in the instruction cache memory, the specific instruction stored in said second transmit instruction data storage means is stored in the instruction cache memory when the different instruction stored in said first transmit instruction data storage means has passed an accessibility determination which is made by comparing a portion of the addresses of the second and third instructions.

3. The data processing device according to claim 1, wherein when the second instruction stored in said second transmit instruction data storage means is stored in the instruction cache memory after a different instruction which was stored in and transmitted from said first transmit instruction data storage means has been stored in the instruction cache memory, the second instruction stored in said second transmit instruction data storage means is stored in the instruction cache memory when the second instruction has passed an accessibility determination which is made by comparing only a portion of the addresses of the second and third instructions.

4. The data processing device according to claim 1, wherein when a specific instruction stored in said second transmit instruction data storage means is stored in the instruction cache memory after a different instruction which was stored in and transmitted from said first transmit instruction data storage means has been stored in the instruction cache memory, the specific instruction stored in said second transmit instruction data storage means is stored in the instruction cache memory when the first instruction stored in said first instruction data storage means has passed a hit/miss determination which is made by comparing all bits of addresses of the second and third instructions.

5. The data processing device according to claim 1, wherein when the second instruction stored in said second transmit instruction data storage means is stored in the instruction cache memory, after a different instruction which was stored in and transmitted from said first transmit instruction data storage means has been stored in the instruction cache memory, the second instruction stored in said second transmit instruction data storage means is stored in the instruction cache memory when the second instruction has passed a hit/miss determination which is made by comparing all bits of addresses of the second and third instructions.

6. The data processing device according to claim 1, wherein when instruction data are transmitted from the lower order storage unit to said first transmit instruction data storage means and said second transmit instruction data storage means, only an address of a necessary instruction required by the instruction processing unit to be transmitted by the lower order storage unit is provided for the lower order storage unit so that the number of communications to the lower order storage unit can be effectively reduced.

7. The data processing device according to claim 1, wherein said first transmit instruction data storage means is a load buffer primary, and said second transmit instruction data storage means is a load buffer secondary, and wherein said first and second transmit instruction data storage means are provided by an instruction load buffer comprising:

a load buffer controller, coupled to the lower order storage unit, the instruction cache memory, the instruction processing unit and said determining means, for controlling operation of said instruction load buffer; and a buffer unit, including two load buffers, where at any given time one of said two load buffers corresponds to said load buffer primary and the other of said two load buffers corresponds to said load buffer secondary, each of said two load buffers including an address storage area, coupled to said load buffer controller. for storing an address of said 1-line instruction data;

two data storage areas coupled to said load buffer controller and respectively storing higher- and lower-order ½ line data of the 1-line instruction data; and a flag storage area, coupled to said load buffer controller, for storing a V flag indicating that data stored in a corresponding one of said two load buffers are valid, a PS flag which turns active to indicate the load buffer secondary, an M flag which turns active when the higher-order ½ line data are valid, an L flag which turns active when the lower-order ½ line data are valid, a WM flag which turns active when the higher-order ½ line data are stored in the instruction cache memory, and a WL flag which turns active when the lower-order ½ line data are stored in the instruction cache memory.

8. The data processing device according to claim 7, wherein said instruction load buffer has one of at least three states: an idle state indicating no operations are being performed, a first-data-in state entered from the idle state upon receiving a data enable input signal indicating that first transmission data will be available next cycle from the lower order storage unit, and a data-in state entered after the load buffer primary has turned active upon receiving the first transmission data, said instruction load buffer maintaining the data-in state while the V flag of either of said two load buffers is active and chancing to the idle state when the V flags of both of said two load buffers are inactive.

9. The data processing device according to claim 8, wherein said instruction load buffer changes from the firstdata-in state to a load buffer primary valid state when the V flag of the load buffer primary has turned active; and stores, in the instruction cache memory, valid data stored in and transmitted from the load buffer primary when the WM and WL flags have changed to active while receiving second transmission data after receipt or the first transmission data by the load buffer primary.

10. The data processing device according to claim 9, wherein the computer system further includes a priority control unit, and wherein in the load buffer primary valid state, said instruction load buffer sends to the priority control unit an instruction fetch negate signal indicating that a request to fetch a next instruction is acceptable, before outputting the first transmission data to the instruction cache memory and the instruction processing unit, then changes to a load buffer primary valid with fetch state and continues storing, in the instruction cache memory, valid data stored in the load buffer primary while receiving prefetched data in the load buffer secondary.

11. The data processing device according to claim 10, wherein in the load buffer primary valid with fetch state, said instruction load buffer changes to a load buffer secondary valid state changes the load buffer secondary to the load buffer primary by resetting the PS flag to inactive, and changes to a load buffer primary valid with fetch state when the WM flag and the WL flag are active, and when a hit/miss determination indicates a hit for data stored in the load buffer secondary.

12. The data processing device according to claim 10, wherein in the load buffer primary valid with fetch state of the data-in state, said instruction load buffer changes from the data-in state to the idle state when the V flags in the load buffer primary and the load buffer secondary are inactive.

13. A data processing device, in a computer system having a lower order storage unit, a data cache memory for storing data and an instruction/arithmetic operation unit, coupled to the lower order storage unit and the data cache memory, for instructing the lower order storage unit to transmit necessary data to said data cache memory when the necessary data are not stored in said data cache memory, said data processing device comprising:

transmission data storing means, comprising plural stages of buffers, for storing 1-line data containing a first piece of data required by the instruction/arithmetic operation unit, followed by a second piece of data, both the first and second pieces of data transmitted from the lower order storage unit, and one or more lines of prefetched data following the 1-line data, said transmission data storing means distinguishing and storing the 1-line data and the one or more lines of prefetched data and transmitting the 1-line data to the data cache memory and directly to the instruction/arithmetic operation unit; and determining means for determining whether the prefetched data are to be transmitted to the data cache memory by comparing only a portion of an address of the second piece of data included in the 1-line data with a corresponding portion of an address of a third piece of data required by said instruction/arithmetic operation unit, for transmitting the prefetched data to said data cache memory when at least the portion of the address of the second piece of data included in the 1-line data and the corresponding portion of the address of the third piece of data match.

14. The data processing device according to claim 13, wherein the prefetched data are required by the instruction/ arithmetic operation unit for transmission and are stored in the data cache memory when the second piece of data passes an accessibility determination made by comparing a part of the addresses of the second and third pieces of data.

15. The data processing device according to claim 13, wherein the prefetched data have an address, and wherein when the prefetched data are stored in the data cache memory after the 1-line data have been stored in the data cache memory, the prefetched data are stored in the data cache memory after the prefetched data have passed an accessibility determination made by comparing a part of the addresses of the prefetched data and the third piece of data.

16. The data processing device according to claim 13, wherein the instruction/arithmetic operation unit includes a data requesting unit coupled to the lower storage unit, the data cache memory and said determining means, and wherein the prefetched data are stored in the data cache memory and directly transmitted to the data requesting unit in the instruction/arithmetic operation unit to provide data at a higher speed when the prefetched data have passed a hit/miss determination made by comparing all bits of the third piece of data and the addresses of the prefetched data stored in said transmission data storing means.

17. A data processing device in a computer system having a data cache memory for storing data, a lower order storage unit and an instruction/arithmetic operation unit for instructing the lower order storage unit to transmit necessary data to the data cache memory when the necessary data are not stored in the data cache memory, said data processing device comprising:

transmission data storing means, including plural stages of buffers and at least one flag indicating whether a piece of data is stored according to a software prefetch instruction in a program, for storing 1-line data, including the necessary data required by the instruction/ arithmetic operation unit and transmitted from the lower order storage unit, and one or more lines of prefetched data following the 1-line data, said transmission data storing means distinguishing and storing the 1-line data and the one or more lines of prefetched data; and priority control means for giving a higher priority to a first request to fetch data from the data cache memory and a lower priority to a second request to store in the data cache memory requested data prefetched according to a software prefetch instruction in a program.

18. The data processing device according to claim 17, wherein the data cache memory includes a pipeline, and wherein when the prefetched data transmitted to said transmission data storing means are stored in the data cache memory according to a software prefetch instruction to prefetch data in a program, data are smoothly provided without disturbing the pipeline of the data cache memory by processing the first request to fetch the prefetched data issued to data cache memory before storing the prefetched data.

19. The data processing device according to claim 17, wherein when the prefetched data transmitted to said transmission data storing means are stored in the data cache memory according to a software prefetch instruction to prefetch data in a program, said transmission data storing means maintains the prefetched data during a first period in which the first request to fetch data is issued, and wherein the data cache memory stores the prefetched data during a second period in which the first request to fetch data is not issued, thereby residence of valid data already stored in the data cache memory is extended.

20. The data processing device according to claim 17, wherein said instruction/arithmetic operation unit includes a data requesting unit coupled to the lower storage unit. the data cache memory and said transmission data storing means, and wherein when the prefetched data transmitted to said transmission data storing means are stored in the data cache memory according to a software prefetch instruction to prefetch data in a program, the instruction/arithmetic operation unit issues the first request to fetch data to the data cache memory, wherein the data cache memory processes the first request before storing the prefetched data wherein said transmission data storing means makes a hit/miss determination by comparing all bits of addresses of the prefetched data stored in said transmission data storing means with the first request to fetch data when a cache miss is detected as a result of the first request to fetch data, and, wherein said transmission data storing means stores the prefetched data in the data cache memory and directly transmits the prefetched data to said data requesting unit in said instruction/arithmetic operation unit if the hit/miss determination indicates a hit.

21. The data processing device according to claim 17, wherein when the prefetched data transmitted to said transmission data storing means are stored in the data cache memory according to a software prefetch instruction to prefetch data in a program, the instruction/arithmetic operation unit issues the first request to fetch data to the data cache memory, wherein the data cache memory processes the first request before storing the prefetched data wherein said transmission data storing means makes a hit/miss determination by comparing all bits of addresses of the prefetched data stored in said transmission data storing means with the first request to fetch data if a cache miss has been detected as a result of the first request to fetch data, and wherein the data cache memory stores the prefetched data if the hit/miss determination indicates a miss.

22. The data processing device according to claim 13, wherein said transmission data storing means comprises a data load buffer having at least two stages of buffers storing the 1-line data and next line data following the 1-line data, said data load buffer comprising:

a load buffer controller, coupled to the lower order storage unit, said data cache memory, the instruction processing unit and said determining means, for controlling said data load buffer;

a buffer unit, including two load buffers, each of said two load buffers including two data storage areas coupled to said load buffer controller and respectively storing higher-order ½ line data and lower-order ½ line data;

an address storage area for storing an address of the higher-order and lower-order ½ line data; and a flag storage area, coupled to said load buffer controller, for storing a V flag indicating that data stored in the two data storage areas are valid, a PF flag which turns active when data are stored according to a software prefetch instruction in a program, an M flag which turns active when the higher-order ½ line data are valid, an L flag which turns active when the lower-order ½ line data are valid, a WM flag which turns active when the higher-order ½ line data are stored in said data cache memory, and a WL flag which turns active when the lower-order ½ line data are stored in said data cache memory.

23. The data processing device according to claim 22, wherein said data load buffer indicates one of an idle state indicating no operations are being performed, a first-data-in state entered from the idle state upon receiving a data enable input signal indicating that transmission data will be available next cycle from the lower order storage unit and a data-in state entered after the V flag in a primary one of said load buffers has turned active upon receiving first transmission data, said data load buffer maintaining the data-in state while the V flag of either of said two load buffers is active and changing to the idle state when the V flags of both of said two load buffers are inactive.

24. The data processing device according to claim 23, wherein said data load buffer turns from the first-data-in state to a load buffer wait state when the V flag of one of said two load buffers has turned active and a prefetch signal indicating the software prefetch instruction is active; and stores, in said data cache memory, valid data stored in and transmitted from the one of said two load buffers when the WM and WL flags have turned active while receiving the prefetched data following the first transmission data.

25. The data processing device according to claim 24, wherein in the load buffer wait state, said data load buffer turns to a high write state when a load buffer access signal indicating a hit as a result of an access determination in which only lower order bits of addresses of the prefetched data following the first transmission data are compared, has turned active, and continues storing in said data cache memory the valid data stored in the one of said two load buffers while receiving new prefetched data.

26. The data processing device according to claim 25, wherein in said high write state said data load buffer turns from the data-in state to the idle state when a load buffer valid flag indicates 0.

27. The data processing device according to claim 23, wherein said data load buffer changes from the first-data-in state to a load-buffer-wait-with-software-prefetch-state when the valid flag of the one of said two load buffers has changed to active and a load buffer prefetch signal indicating a process in response to the software prefetch instruction is active, receives the prefetched data following the first transmission data and stores, while changing the WM and WL flags to an active state, the valid data stored in and transmitted from the one of said load buffers into said data cache memory when no other operations are being performed by said data cache memory.

28. The data processing device according to claim 27, wherein in the load-buffer-wait-with-software-prefetch-state, said data load buffer turns to a high write state when a hit determination is made on prefetched data stored in the one of said two load buffers as a result of a subsequent request to fetch data accepted after a preceding request to fetch the first transmission data, or when a cache miss has been detected with the subsequent request to fetch data; and stores valid data stored in the one of said load buffers in said data cache memory while receiving new prefetched data.

29. The data processing device according to claim 28, wherein said data load buffer turns from the data-in state to the idle state if a load buffer valid flag indicates 0.

30. The data processing device according to claim 1, wherein during a period from a moment when the necessary instruction is requested to be transmitted from the lower order storage unit to a moment the necessary instruction has been stored by said first transmit instruction data storage means in the instruction cache memory, the instruction cache memory can be accessed by processes not associated with transmission of the necessary instruction.

31. The data processing device according to claim 13, wherein during a period from a moment the necessary data are requested to be transmitted from the lower order storage unit to a moment the necessary data have been stored by said transmit data storage means in the data cache memory, the data cache memory can be accessed by processes not associated with the transmission of the necessary data.

32. The data processing device according to claim 13, wherein when the necessary and prefetched data are transmitted from the lower order storage unit to said transmission data storing means, only the address of the necessary data requested by the instruction/arithmetic operation unit to be transmitted by the lower order storage unit is notified to the lower order storage unit, thereby reducing communication with the lower order storage unit.

33. The data processing device according to claim 11, wherein in the load buffer primary valid with fetch state of the data-in state, said instruction load buffer changes from the data-in state to the idle state when valid flags in the load buffer primary and the load buffer secondary are inactive.

* * * * *